United States Patent
McBride et al.

(10) Patent No.: US 12,461,099 B2
(45) Date of Patent: Nov. 4, 2025

(54) IMMUNOREACTIVE POLYPEPTIDES

(71) Applicant: Research Development Foundation, Carson City, NV (US)

(72) Inventors: Jere McBride, Galveston, TX (US); David H. Walker, Galveston, TX (US)

(73) Assignee: Research Development Foundation, Carson City, NV (US)

( * ) Notice: Subject to any disclaimer, the term of this patent is extended or adjusted under 35 U.S.C. 154(b) by 1165 days.

(21) Appl. No.: 17/053,539

(22) PCT Filed: May 7, 2019

(86) PCT No.: PCT/US2019/031137
§ 371 (c)(1),
(2) Date: Nov. 6, 2020

(87) PCT Pub. No.: WO2019/217435
PCT Pub. Date: Nov. 14, 2019

(65) Prior Publication Data
US 2021/0239695 A1    Aug. 5, 2021

Related U.S. Application Data

(60) Provisional application No. 62/667,925, filed on May 7, 2018.

(51) Int. Cl.
*G01N 33/569* (2006.01)
*A61K 31/65* (2006.01)
*C07K 14/29* (2006.01)
*G01N 33/543* (2006.01)

(52) U.S. Cl.
CPC ........ *G01N 33/56911* (2013.01); *A61K 31/65* (2013.01); *C07K 14/29* (2013.01); *G01N 33/54346* (2013.01); *G01N 2333/29* (2013.01); *G01N 2469/20* (2013.01)

(58) Field of Classification Search
CPC .......................... G01N 33/56911; C07K 14/29
See application file for complete search history.

(56) References Cited

U.S. PATENT DOCUMENTS

| | | | |
|---|---|---|---|
| 2010/0273194 A1 | 10/2010 | McBride et al. | |
| 2017/0166628 A1* | 6/2017 | McBride | C07K 17/00 |
| 2024/0018195 A1* | 1/2024 | McBride | C07K 14/29 |

FOREIGN PATENT DOCUMENTS

| | | | |
|---|---|---|---|
| WO | WO 2001/082862 | | 11/2001 |
| WO | WO 2003/038061 | | 5/2003 |
| WO | WO 2006/138509 | | 12/2006 |
| WO | WO 2010/126993 A1 * | | 11/2010 |
| WO | WO 2015/116907 | | 8/2015 |

OTHER PUBLICATIONS

Luo et al., npj Vaccines, 2020; 5(85):1-12 (Year: 2020).*
Barbour et al., "A genome-wide proteome array reveals a limited set of immunogens in natural infections of humans and white-footed mice with Borrelia burgdorferi," *Infect Immun*, 76:3374-3389, 2008.
Chen et al., "Identification of the antigenic constituents of Ehrlichia chaffeensis," *AmJTropMedHyg*, 50:52-58, 1994.
Cruz-Fisher et al., "Identification of immunodominant antigens by probing a whole Chlamydia trachomatis open reading frame proteome microarray using sera from immunized mice," *Infect Immun*, 79:246-257, 2011.
Doyle et al., "An immunoreactive 38-kilodalton protein of Ehrlichia canis shares structural homology and iron-binding capacity with the ferric ion-binding protein family," *Infect Immun*, 73:62-69, 2005.
Doyle et al., "Differentially expressed and secreted major immunoreactive protein orthologs of Ehrlichia canis and E. chaffeensis elicit early antibody responses to epitopes on glycosylated tandem repeats," *Infection and Immunity*, 74(1):711-720, 2006.
Doytchinova et al., "VaxiJen: a server for prediction of protective antigens, tumour antigens and subunit vaccines," *BMC Bioinformatics*, 8:4, 2007.
Dumler et al., "Ehrlichioses in humans: epidemiology, clinical presentation, diagnosis, and treatment," *ClinInfectDis*, 45 Suppl 1:S45-S51, 2007.
Dunning Hotopp et al., "Comparative genomics of emerging human ehrlichiosis agents," *PLoS Genet.*, 2(2):0208-0223, 2006.
Dunphy et al., "Ehrlichia moonlighting effectors and interkingdom interactions with the mononuclear phagocyte," *Microbes Infect*, 15:1005-1016, 2013.
Extended European Search Report issued in European Application No. 19799337.1, mailed Feb. 7, 2022.
Feng et al., "Mechanisms of immunity to Ehrlichia muris: a model of monocytotropic ehrlichiosis," *InfectImmun*, 72:966-971, 2004.
Fishbein et al., "Human ehrlichiosis in the United States, 1985 to 1990," *AnnInternMed*, 120:736-743, 1994.
He et al., "Vaxign: the first web-based vaccine design program for reverse vaccinology and applications for vaccine development," *J Biomed Biotechnol*, 2010:297505, 2010.
Kuriakose et al., "Ehrlichia chaffeensis transcriptome in mammalian and arthropod hosts reveals differential gene expression and post transcriptional regulation," *PLoS One*, 6(9):e24136, 2011.
Kuriakose et al., "Molecular basis of antibody mediated immunity against Ehrlichia chaffeensis involves species-specific linear epitopes in tandem repeat proteins," *Microbes Infect*, 14:1054-1063, 2012.
Li et al., "Antibodies highly effective in SCID mice during infection by the intracellular bacterium Ehrlichia chaffeensis are of picomolar affinity and exhibit preferential epitope and isotype utilization," *JImmunol*, 169:1419-1425, 2002.
Li et al., "Outer membrane protein-specific monoclonal antibodies protect SCID mice from fatal infection by the obligate intracellular bacterial pathogen Ehrlichia chaffeensis," *JImmunol*, 166:1855-1862, 2001.

(Continued)

Primary Examiner — Brian Gangle
Assistant Examiner — Lakia J Jackson-Tongue
(74) Attorney, Agent, or Firm — pH IP LAW

(57) ABSTRACT

Methods and compositions for diagnosing and vaccinating against *Ehrlichia chaffeensis* are provided.

8 Claims, 8 Drawing Sheets

Specification includes a Sequence Listing.

(56) References Cited

OTHER PUBLICATIONS

Li et al., "Survival, replication, and antibody susceptibility of Ehrlichia chaffeensis outside of host cells," *InfectImmun*, 71:4229-4237, 2003.

Liang et al., "Immune profiling with a *Salmonella typhi* antigen microarray identifies new diagnostic biomarkers of human typhoid," *SciRep*, 3:1043, 2013.

Lin et al., "Global proteomic analysis of two tick-borne emerging zoonotic agents: Anaplasma phagocytophilum and Ehrlichia chaffeensis," *Front Microbiol*, 2:24, 2011.

Luo et al., "A variable-length PCR target protein of Ehrlichia chaffeensis contains major species-specific antibody epitopes in acidic serine-rich tandem repeats," *Infect Immun*, 76:1572-1580, 2008.

Luo et al., "Major species-specific antibody epitopes of the Ehrlichia chaffeensis p120 and E. canis p140 orthologs in surface-exposed tandem repeat regions," *Clin Vaccine Immunol*, 16:982-990, 2009.

Luo et al., "Molecular characterization of antibody epitopes of Ehrlichia chaffeensis ankyrin protein 200 and tandem repeat protein 47 and evaluation of synthetic immunodeterminants for serodiagnosis of human monocytotropic ehrlichiosis," *Clin Vaccine Immunol*, 17:87-97, 2010.

Magnan et al., "High-throughput prediction of protein antigenicity using protein microarray data," *Bioinformatics*, 26(23):2936-2943, 2010.

McBride et al., "Identification and functional analysis of an immunoreactive DsbA-like thio-disulfide oxidoreductase of *Ehrlichia* spp," *Infect Immun*, 70:2700-2703, 2002.

McBride et al., "Identification of a glycosylated Ehrlichia canis 19-kilodalton major immunoreactive protein with a species-specific serine-rich glycopeptide epitope," *Infect Immun*, 75:74-82, 2007.

McBride et al., "Kinetics of antibody response to Ehrlichia canis immunoreactive proteins," *Infect Immun*, 71:2516-2524, 2003.

McBride et al., "Progress and obstacles in vaccine development for the ehrlichioses," *Expert Rev Vaccines*, 9:1071-1082, 2010.

Nandi et al., "CD4 T-cell epitopes associated with protective immunity induced following vaccination of mice with an ehrlichial variable outer membrane protein," *InfectImmun*, 75:5453-5459, 2007.

Nethery et al., "Ehrlichia canis gp200 contains dominant species-specific antibody epitopes in terminal acidic domains," *Infect Immun*, 75:4900-4908, 2007.

Ohashi et al., "Immunodominant major outer membrane proteins of Ehrlichia chaffeensis are encoded by a polymorphic multigene family," *InfectImmun*, 66:132-139, 1998.

Olano et al., "Human monocytotropic ehrlichiosis, Missouri," *EmergInfectDis*, 9:1579-1586, 2003.

Paparone et al., "Ehrlichiosis with pancytopenia and ARDS," *New Jersey Med*, 92:381-385, 1995.

PCT International Search Report and Written Opinion issued in International Application No. PCT/US2019/031137, mailed Oct. 9, 2019.

Racine et al., "IgM production by bone marrow plasmablasts contributes to long-term protection against intracellular bacterial infection," *J Immunol*, 186:1011-1021, 2011.

Sotomayor et al., "Animal model of fatal human monocytotropic ehrlichiosis," *AmJPath*, 158:757-769, 2001.

UniProtKB—Q2GHK1, last modified Mar. 21, 2006, retrieved from https://www.uniprot.org/uniprot/Q2GHK1 on Aug. 27, 2019.

Vigil et al., "Defining the humoral immune response to infectious agents using high-density protein microarrays," *Future Microbiol*, 5:241-251, 2010.

Vigil et al., "Identification of the feline humoral immune response to Bartonella henselae infection by protein microarray," *PLoS One*, 5:e11447, 2010.

Vigil et al., "Profiling the humoral immune response of acute and chronic Q fever by protein microarray," *Mol Cell Proteomics*, 10:M110 006304, 2011.

Walker et al., "Ehrlichia chaffeensis: a prevalent, life-threatening, emerging pathogen," *Trans Am Clin Climatol Assoc*, 115:375-382; discussion 382-384, 2004.

Walker et al., "Human monocytic and granulocytic ehrlichioses. Discovery and diagnosis of emerging tick-borne infections and the critical role of the pathologist," *Archives of Pathology & Laboratory Medicine*, 121:785-791, 1997.

Winslow et al., "Antibody-mediated elimination of the obligate intracellular bacterial pathogen Ehrlichia chaffeensis during active infection," *InfectImmun*, 68:2187-2195, 2000.

Winslow et al., "Infection of the laboratory mouse with the intracellular pathogen Ehrlichia chaffeensis," *InfectImmun*, 66:3892-3899, 1998.

Winslow et al., "Mechanisms of humoral immunity during Ehrlichia chaffeensis infection," *Ann. NY Acad. Sci.*, 990:435-443, 2003.

Yager et al., "Essential role for humoral immunity during Ehrlichia infection in immunocompetent mice," *Infect Immun*, 73:8009-8016, 2005.

\* cited by examiner

FIGS. 4A-B

SEQUENCE LISTING

```
<160> NUMBER OF SEQ ID NOS: 28

<210> SEQ ID NO 1
<211> LENGTH: 264
<212> TYPE: PRT
<213> ORGANISM: Ehrlichia chaffeensis

<400> SEQUENCE: 1

Met Pro Thr Thr Leu Gly Thr Val Ala Ser Ser Ile Leu Asn Thr Thr
1               5                   10                  15

Ser Asn Thr Thr Asn Gly Thr Ile Thr Ala Thr Ala Glu Ser Thr Ser
            20                  25                  30

Ser Ile Leu Glu Ser Thr Thr Asn Thr Ala Ser Asn Ile Tyr Asn Thr
        35                  40                  45

Thr Thr Ser Ala Val Thr Ser Ala Ile Glu Thr Thr Ala Ser Asn Ala
    50                  55                  60

Phe Asn Asn Val Thr Asn Ile Thr Asn Ser Ile Ile Thr Thr Ser Thr
65                  70                  75                  80

Glu Ser Ile Ser Ser Phe Ile Glu Ser Ala Thr Ser Thr Ala Asn Asn
                85                  90                  95

Ile His Asn Thr Ile Phe Ser Gly Ile Thr Ser Pro Thr Gly Asn Ile
            100                 105                 110

Thr Asn Thr Thr Ser Ile Thr Asn Thr Thr Ser Asn Asp Asn Lys Gln
        115                 120                 125

Glu Thr Thr Leu Ala Leu Ile Gly Ile Phe Phe Phe Ser Leu Leu Leu
    130                 135                 140

Leu Ala Phe Ile Ile Cys Ile His Ser Lys His Thr Arg Ala Asn Gln
145                 150                 155                 160

Arg His Gln Asp Glu Glu Ile Pro Leu Thr Glu Glu Asn Ser Asp Lys
                165                 170                 175

Lys Lys Gly Tyr Lys Lys His Gly Asp Val Ile Arg Phe Asp Asp Gly
            180                 185                 190

Ser Val Leu Pro Val Ser Val Arg Cys Asp Glu Asn Thr Asp Val Arg
        195                 200                 205

His Gly Arg Ser Pro Arg Val Ile Glu Thr Asn Asp Ser Val Thr Pro
    210                 215                 220

Val Tyr Asn Phe Ser Asn Gly Pro Ser Ser Arg Leu Thr Asp Leu Leu
225                 230                 235                 240

Asp Asp Phe Val Gln Ser Val Asp Tyr Gly Ile Ala His Ala Arg Gln
                245                 250                 255

Ala Cys Gly Arg Phe Phe Arg Arg
            260

<210> SEQ ID NO 2
<211> LENGTH: 338
<212> TYPE: PRT
<213> ORGANISM: Ehrlichia chaffeensis
```

<400> SEQUENCE: 2

Met Asn Ser Thr Thr Ser Ser Ala Thr Val Thr Thr Ser Ser Thr Asn
1 5 10 15

Ser Thr Leu Leu Ser Ser Thr Ile Asn Ala Val Ser Ser Ser Thr Gln
20 25 30

Ser Ile Met Asn Asn Thr Thr Ser Ala Ile Ser Glu Thr Ala Gln Ala
35 40 45

Ile Ala Asp Thr Thr Ser Asn Ile Ala Ser Thr Ile Thr Ser Thr Ile
50 55 60

Thr Asn Thr Thr Asn Asn Ile Arg Glu Gly Val Asn Tyr Thr Leu Asn
65 70 75 80

Thr Ile Ser Asn Ser Ile Ile Asn Thr Thr Ile Glu Thr Thr Thr Ala
85 90 95

Ser Thr Thr Asn Ser Thr Thr Pro Leu Thr Ser Asn Thr Thr Tyr Pro
100 105 110

Thr Thr Asn Ser Thr Asn Ser Thr Leu Thr Leu Asn Thr Thr Ser Asn
115 120 125

Thr Ser Tyr Leu Phe Lys Glu Pro Ser Asp Tyr Phe Lys Thr Gly Leu
130 135 140

Met Ser Phe Leu Cys Phe Val Ser Ile Val Phe Val Leu Tyr Val Leu
145 150 155 160

Leu Ser Ala Leu Phe Asn Asn Asn Gln Gln Gln Ile Arg Gln Asn Pro
165 170 175

Ser Ile Asp Glu Gly Tyr Val Ser Cys Asn Ser Ser Ala Leu Ala Ser
180 185 190

Asn Asn Ser Thr Ser His Ser Ser Asn Leu Asp Ser Glu Asn Asn Glu
195 200 205

Asn Asp Ala His Ser Thr Ser Gly Glu Asp Asp Glu Glu Ala Ser Ile
210 215 220

Asn Leu Ser Leu Leu Ala Asn Asn Ser Val Gln Phe His Asn Glu Asn
225 230 235 240

Asp Ala His Ser Thr Ser Asp Glu Glu Asn Glu Glu Ala Ser Ile Asn
245 250 255

Leu Ser Leu Leu Thr Ser Asn Ser Val Gln Phe His Asn Glu Asn Asp
260 265 270

Ala His Pro Thr Ser Asp Glu Glu Asn Glu Glu Ala Ser Ile Asn Leu
275 280 285

Ser Leu Leu Thr Ser Asn Ser Val Gln Phe His Asn Glu Asn Asp Ala
290 295 300

His Ser Thr Ser Asp Glu Glu Asn Glu Glu Val Ser Thr Asn Leu Ser
305 310 315 320

Leu Leu Ala Ser Asn Ala Val Gln Ser His Gly Asp Asn Gln Val Thr
325 330 335

Lys Leu

<210> SEQ ID NO 3
<211> LENGTH: 190
<212> TYPE: PRT
<213> ORGANISM: Ehrlichia chaffeensis

<400> SEQUENCE: 3

Met Ala Lys Tyr His Asp Thr Ile Ile Asn Cys Ser Ser Leu Ile Ala
1 5 10 15

Ile Val Gly Ala Ile Val Gly Leu Thr Leu Cys Cys Thr Ser Lys Val

```
            20                  25                  30

Arg His Gly Gln Ala Tyr Val Gly Val Phe Val Leu Ile Leu Ile Ala
        35                  40                  45

Thr Leu Ala Leu Leu Cys Ala Asn Tyr Lys Lys Ser Ile Ser Glu Lys
    50                  55                  60

Tyr Thr Gln Leu Asn Asn Tyr Leu Thr Lys Phe Ser Ser Glu Pro Asn
65                  70                  75                  80

Ser Ser Pro Asn Tyr Tyr Asn Pro Asp Thr Gly Leu Ser Thr Asp Tyr
                85                  90                  95

Tyr Phe Asp Ser Ser Val Arg Pro Val Glu Met Pro Arg Asp Glu Gln
            100                 105                 110

Val Tyr Phe Tyr Tyr Glu Glu Pro Gln Phe His Arg Val Cys Gly Met
        115                 120                 125

Thr Thr Tyr Tyr Asp Asp Ala Val Gly Asn Ser Val Gly Met Lys Thr
    130                 135                 140

Phe Ser Gly Ile Asn Asp Glu Val Gly Lys Thr Asn Ile Ala Gln Gly
145                 150                 155                 160

Ile Ala Glu Glu Ser Val Gly Gln Ile Val Thr Asp Ser Asp Val Glu
                165                 170                 175

Glu Val Thr Thr Leu Glu Lys Glu Gln Ser Lys Val Arg Asn
            180                 185                 190

<210> SEQ ID NO 4
<211> LENGTH: 186
<212> TYPE: PRT
<213> ORGANISM: Ehrlichia chaffeensis

<400> SEQUENCE: 4

Met Glu Gly Asn Glu Ser Gly Gly Ile Asn Val Ser Ala Leu Gln Ser
1               5                   10                  15

Tyr Leu His Gln Gln Asn Thr Gly Ser Gly Gly Ala Pro Glu Asp Glu
            20                  25                  30

Glu Thr Val Phe Ser Val Phe Val Phe Leu Ala Trp Phe Tyr Lys Asn
        35                  40                  45

Val Pro Cys Phe Leu Asp Ser Ala Thr Gly Asn Val Ile Ala Ser Thr
    50                  55                  60

Thr Cys Leu Gly Ala Asn Leu Pro Thr Thr Val Val Phe Gly Ser Glu
65                  70                  75                  80

Met Thr Lys Asn Ile Phe Gly Leu Pro Lys Leu Leu Pro Asp Ser Gln
                85                  90                  95

Ser Gly Asp Ala Ser Gly Glu Gly Gly Gly Glu Asp Ala Ala Ala Ala
            100                 105                 110

Ser Gly Glu Asn Asp Gly Glu Gly Ile Gln Ala Ala His Pro Asp Asp
        115                 120                 125

Pro Tyr Ala His Asp Asp Tyr Pro His Ala Asn Gln Glu Val Ala Glu
    130                 135                 140

Ala Thr Gly Asn Gly Leu Asn Asn Val Asn His Glu Leu Gln Gln Glu
145                 150                 155                 160

Pro Glu Tyr His His Asp Arg Ser Pro Ser Pro Thr Pro Thr Thr His
                165                 170                 175

Gln Pro Ser Gln Tyr Asp His Asp Phe His
            180                 185

<210> SEQ ID NO 5
<211> LENGTH: 205
```

<212> TYPE: PRT
<213> ORGANISM: Ehrlichia chaffeensis

<400> SEQUENCE: 5

```
Met Arg Asp Lys Val Lys Asp Leu Ser Asn Asn Asn Ser Arg Asn
1               5                   10                  15

Ser Asn Pro Ile Trp Asn Ile Leu Arg Ser Ile Phe Thr Thr Leu Gly
                20                  25                  30

Asn Trp Gly Asn Met Leu Ala Asn Val Leu Pro Arg Ile Leu Ile Ser
            35                  40                  45

Gly Ile Val Pro Pro Ile Ile Pro Thr Asn Ala Thr Asn Asn Asn Pro
        50                  55                  60

Gln His Asn Glu Asn Ser Ser Thr Thr His Ser Asn Glu Asn Thr Gln
65                  70                  75                  80

Ser Ser Asp His Asn Asn Met Glu Gln His Thr Ser Gln Ser Glu Ile
                85                  90                  95

Pro Val Leu Gln Ser Ser Ala Asn Leu Asp Ser Leu Ser Asp Ile Glu
                100                 105                 110

Glu Thr Pro Arg Arg Asn Asn Glu Asp Glu Ile Pro Val Trp Glu Ser
                115                 120                 125

Ser Thr Asp Ser Asp Gly Ile Ser Asp Thr Glu Asn Met Pro Ile Asp
        130                 135                 140

Ser His Glu Gln His Asp Ser Asp Thr Val Ser Asn Asp Thr Asn Ser
145                 150                 155                 160

Asp Ile Glu Phe Ile Ser Glu Glu Asp Val Leu Glu Ala Ser Gly Phe
                165                 170                 175

Phe Ile Val Asp Ile Cys Asp Asn Pro Asn Ser Ser Val Thr His Ile
                180                 185                 190

Asp Leu Gln Ser Gly Ser Gln Asp Met Val Tyr Arg Pro
                195                 200                 205
```

<210> SEQ ID NO 6
<211> LENGTH: 118
<212> TYPE: PRT
<213> ORGANISM: Ehrlichia chaffeensis

<400> SEQUENCE: 6

```
Met Met Thr Gln Ser Ile Asn Leu Lys Phe Asp Leu Val Met His Asn
1               5                   10                  15

Gln Ala His Lys Glu Ile Thr Val Asn Glu Ala Leu Ile Lys Ile Asp
                20                  25                  30

Met Leu Met Asn Asn Cys Ile Leu Glu Leu Gln Cys Asn Thr Pro Ile
            35                  40                  45

Lys Glu Ile Ser Ser Gly Asp Met Tyr Ile Ile Gly Pro Thr Pro Ala
        50                  55                  60

Ile Gln Glu Trp Gln Asn Lys Gln Asn Asn Val Thr Tyr Tyr Ile
65                  70                  75                  80

Asn Gln Trp Tyr Phe Ile Gln Pro Asn Thr Gly Leu Thr Leu Trp Val
                85                  90                  95

Lys Ser Lys Asn Gln Leu Tyr Thr Tyr Asn Asn Thr Gln Trp Val Pro
                100                 105                 110

Ser Tyr Asn Asn Tyr Lys
                115
```

<210> SEQ ID NO 7
<211> LENGTH: 380

<212> TYPE: PRT
<213> ORGANISM: Ehrlichia chaffeensis

<400> SEQUENCE: 7

```
Met Leu Thr Phe Leu Lys Lys Gly Ala Asn Val Val Ile Lys Ala Ala
1               5                   10                  15

Ile Thr Pro Thr Thr Ser Lys Leu Pro His Gln Glu Ser Val Gly Lys
            20                  25                  30

Tyr Leu Gly Gly Met Leu Lys Ser Ile Ile Pro Gly Gln Lys Asp Pro
        35                  40                  45

Ala Glu Lys His Phe Asp Leu Arg Met His Asn Arg Thr His Lys Leu
    50                  55                  60

Gly Val Glu Leu Pro Ala Arg Thr Arg Ile Asp Gly His Glu Gln Glu
65                  70                  75                  80

Val Ala Leu Lys Val Pro Ser Tyr Lys Leu Pro Tyr Gln Thr Leu Gln
                85                  90                  95

Lys Phe Ala Ala Trp Gln Glu Gln Asp Lys Glu Gly Glu Val Glu Glu
            100                 105                 110

Thr Lys Lys Asp Thr Leu Thr Ser Leu Ile Asn Pro Val Ser Ala Thr
        115                 120                 125

Gln Glu Phe Ile Arg Ser Asn Thr Ala Asp Lys Tyr Phe Glu Lys Leu
    130                 135                 140

Lys Ala Leu Asp Gln Gln Leu Lys Glu Ile Gly Gly Lys Val Thr Val
145                 150                 155                 160

Asn Ser Thr Pro Gly Arg Tyr Lys Gln Gly Leu Thr Ile Glu Leu Asp
                165                 170                 175

Val Ser Asn Lys Ser Arg Ile Ala Ile Glu Lys Asp Val Arg Leu Val
            180                 185                 190

Leu Glu Gly Leu Gly Ile Asn Asp Glu Glu Leu Val Lys Thr Phe Thr
        195                 200                 205

Lys Arg Leu Tyr Lys Ser Ser Thr Asp Lys Lys Met Ser Ser Ala Asp
    210                 215                 220

Ile His Thr Glu Lys Thr Ser Ser Asn Thr Asp Ser Lys Asp Asn Ser
225                 230                 235                 240

Asn Asn Gln Asp His Asp Ile Val Ser Pro Ala Lys Arg His Gly Ser
                245                 250                 255

Asp Thr Val Ser Ala Val Gln Arg Gln Gly Asp Asp Ile Leu Ser Ser
            260                 265                 270

Ser Gln Glu Gln Ser Ser Lys Thr Gly Ser Pro Thr Asn Ser Thr Gly
        275                 280                 285

Ile Ser Asn Ser Asp Phe Ser Leu Thr Asn Pro Gln Asn Met Pro Tyr
    290                 295                 300

Ser Arg Thr Pro Met Gln Ser Ser Gln Met Leu Gln Gln Leu Gln Asn
305                 310                 315                 320

Gln Ile Leu Met Gln Gln Lys Pro Glu Arg Ile Phe Ser Gln Ala Met
                325                 330                 335

Pro Thr Val Met Gln Gln Glu Ile Asp Glu Ile Ala Glu Asp Leu Cys
            340                 345                 350

Gln Gly Leu Asn Glu Gly Pro Thr Gln Gly Asn Ser Asn Asn Ile Gly
        355                 360                 365

Lys His Phe Ser Asn Pro Gly Lys Val His Ala Arg
    370                 375                 380
```

<210> SEQ ID NO 8

```
<211> LENGTH: 285
<212> TYPE: PRT
<213> ORGANISM: Ehrlichia chaffeensis

<400> SEQUENCE: 8

Met Gln Val Asp Val Gly Ser Glu Pro Asp His Gly Tyr His Ile Leu
1               5                   10                  15

Phe Lys Asn Asn Gly His Val Ile Ser Asp Phe Arg Gly Val Gln Ala
                20                  25                  30

Glu Asn Phe Val Phe Asp Ile Lys Asn His Asn Leu Arg Ala Ser Phe
            35                  40                  45

Leu Val Asp Pro Met Ala Pro Phe Thr Glu Leu Asp Asn Ser Gln His
50                  55                  60

Pro His Phe Val Val Asn Met His Thr Ala Asn Glu Cys Gly Ser Asp
65                  70                  75                  80

Cys Val His His Asn Glu His Asp His Asp Ala His Gly Arg Gly Ala
                85                  90                  95

Ala Ser Ser Val Ala Glu Gly Val Gly Ser Ala Ile Ser Gln Ile Leu
            100                 105                 110

Ser Leu Ser Asp Ser Ile Val Val Pro Val Leu Glu Gly Asn Ala Ser
        115                 120                 125

Val Ser Glu Gly Asp Ala Val Val Asn Ala Val Ser Gln Glu Ala Pro
130                 135                 140

Ala Ala Ser Val Ser Glu Gly Asp Ala Val Val Asn Ala Val Ser Gln
145                 150                 155                 160

Glu Thr Pro Ala Ala Ser Val Ser Glu Gly Asp Ala Val Val Asn Ala
                165                 170                 175

Val Ser Gln Glu Thr Pro Ala Ala Ser Val Ser Glu Gly Asp Ala Val
            180                 185                 190

Val Asn Ala Val Ser Gln Glu Thr Pro Ala Ala Ser Val Ser Glu Gly
        195                 200                 205

Asp Ala Val Val Asn Ala Val Ser Gln Glu Thr Pro Ala Ala Ser Val
    210                 215                 220

Ser Glu Gly Asp Ala Val Val Asn Ala Val Ser Gln Glu Thr Pro Ala
225                 230                 235                 240

Ala Ser Val Ser Glu Gly Asp Ala Val Val Asn Ala Val Ser Gln Glu
                245                 250                 255

Thr Pro Ala Thr Gln Pro Gln Ser Arg Asp Ser Leu Leu Asn Glu Glu
            260                 265                 270

Asp Met Ala Ala Gln Phe Gly Asn Arg Tyr Phe Tyr Phe
        275                 280                 285

<210> SEQ ID NO 9
<211> LENGTH: 364
<212> TYPE: PRT
<213> ORGANISM: Ehrlichia chaffeensis

<400> SEQUENCE: 9

Met Arg Ser Ile Thr Asp Pro Arg Ile Val Val Gln Gln Glu Ala Asp
1               5                   10                  15

Gln Gln Gln Glu Val Gln Gln Ala Asp Gln Gln Ala Asp Gln
                20                  25                  30

Gln Gln Glu Val Gln Gln Glu Val Gln Gln Glu Val Gln Gln
            35                  40                  45

Gln Glu Ala Ala Gln Gln Gln Ala Ala Ala Gln Gln Gln Ala Ala Leu
        50                  55                  60
```

```
Leu Gln Gln Ala Leu Gln Gln Glu Glu Met Leu Arg Gln Gln Ala Glu
65                  70                  75                  80

Arg Gln Glu Val Ile Leu Gln Gln Gln Glu Ala Glu Gln Gln Gln Gly
                85                  90                  95

Gly Ser Pro Val Pro Gly Gly Arg Pro Ser Thr Val Phe Ser Arg His
            100                 105                 110

Ala Lys Asn Leu Lys Arg Ala Ile Leu Asn Gln Cys Leu Met Leu Val
        115                 120                 125

Thr Asp Leu Tyr Leu Ile Leu Phe Val Pro Val Ile Val Val Gly Ile
    130                 135                 140

Val Val Met Met Leu Arg Gln Phe Met Met Ile Phe Asn Glu Thr Phe
145                 150                 155                 160

Ile Leu Pro Trp Ala Leu Ser Cys Asn Tyr Ala Arg Ser Thr Asn Gln
                165                 170                 175

Glu Pro Leu Pro Glu Glu Pro Glu Tyr Asp Asp Ile Ser Val Tyr Gly
            180                 185                 190

Asp Ser Asp Val Ile Phe Pro Ser Pro Ser Val Arg Asn Pro Phe Arg
        195                 200                 205

Arg Leu Ser Asp Ser Ala Arg Asn His Leu Gln Tyr Val Ser Lys Lys
    210                 215                 220

Leu Ser Ala Ala Ala Leu Cys Phe Val Ile Ile Met Leu Ser Pro Ile
225                 230                 235                 240

Phe Ile Gly Ile Leu Ala Cys Thr Met Val Tyr Arg Leu Ala Thr Ile
                245                 250                 255

Leu Ile Asn Ile Val Ala Phe Leu Phe Ala Lys Cys Cys Ser Cys Ile
            260                 265                 270

Ala Asp Ala Tyr Asn Ser Arg Gln Gln Gln Gln Tyr Ile Pro Val Pro
        275                 280                 285

Gln Glu Glu Thr Cys Asp Ser Thr Ser His Gly Glu Glu Cys Ser Ser
    290                 295                 300

Ser Asp Thr Tyr Ala Thr Pro Ser Glu Gly His Ser Ser Gly Ser Gln
305                 310                 315                 320

Glu Ala Thr Thr Ser Pro His Pro Thr Glu Gln Pro Glu Pro Leu Ser
                325                 330                 335

Thr Leu Ile Thr Gln His Gly Pro Val Glu Ser Leu Ile Leu Asn Ala
            340                 345                 350

Ala Glu Ile Ala His Ser Arg Arg Ile Ile Tyr Pro
        355                 360
```

<210> SEQ ID NO 10
<211> LENGTH: 165
<212> TYPE: PRT
<213> ORGANISM: Ehrlichia chaffeensis

<400> SEQUENCE: 10

```
Met Leu Thr Ser Ile Lys Asn Lys Tyr Asn Pro Tyr Asn Lys Val Asn
1               5                   10                  15

Gln Pro Asn Ile Asn Leu Ser Phe Thr Ile Leu His Lys Asn Asp Thr
            20                  25                  30

Lys Gly Thr Ile Asp Gln Glu Tyr Gly Asn Asn Ile Thr His Asn Thr
        35                  40                  45

Phe Ser Asn Gly Leu Gly Thr Thr Ser Ile Asn Leu Leu Asp Lys Pro
    50                  55                  60

Thr Ile Lys Glu Glu Ile Leu Ser Gln Asp Asn Asn Asn Cys Tyr Asp
```

```
65                  70                  75                  80

Val Thr Thr Gln Gln Tyr Asp Thr Asn Asn Ile Thr Leu His Ser Glu
                85                  90                  95

Glu Ile Ser Tyr Glu Met Ala Tyr Ser Leu Leu Asp Leu Val Asn
                100                 105                 110

Asn Asp Ile Glu Leu Leu Glu Val Leu Leu Ile Ala Lys Ile Leu
                115                 120                 125

Ile Lys Glu Gly Val Leu Val Ala Pro Glu Ser Lys Ile Lys Lys Asp
130                 135                 140

Ile Ala Gln Ile Val Leu His Asn Ile Ser Lys Gln Thr Thr Gln Asn
145                 150                 155                 160

Ser Gly Tyr Ser Arg
                165

<210> SEQ ID NO 11
<211> LENGTH: 158
<212> TYPE: PRT
<213> ORGANISM: Ehrlichia chaffeensis

<400> SEQUENCE: 11

Met Leu Asn Asn Phe Asn Ala Ser Ile Leu His Val Gly Arg Asn Val
1               5                   10                  15

Ser Asn His Ser Val Phe Asp Gly Ile Phe Asp His Ser Asp Asp Phe
                20                  25                  30

Thr Gly Asn Asp Thr Leu Ile Pro Lys Gly Phe Asn Asn Ile Gly Thr
                35                  40                  45

Gly Arg Asp Asp Leu Leu Ala Ala Gly Val Ile Ala Phe Tyr Val Leu
            50                  55                  60

Val Val Val Val Gly Gly Leu Ile Tyr Trp Ile Gly Asn Arg Asp
65                  70                  75                  80

Leu Met Arg Gln Asn Gly Tyr Thr Lys Cys Thr Ser Lys Ala Ser Ile
                85                  90                  95

Met Leu Glu Asn Thr Asp Ser Ser Asp Ser His Val Glu Glu Lys Ile
                100                 105                 110

Ser Leu Leu Ile Val Ser Asp Asp Ile Asn Pro Gln Glu Ser Lys Glu
                115                 120                 125

Glu Ser Glu Cys Ile Pro Lys Val Leu Asp Gln Gln His Val Ala Ser
130                 135                 140

Ile Gln Ser Lys Glu Cys Ser Leu His Tyr Ser His Val Val
145                 150                 155

<210> SEQ ID NO 12
<211> LENGTH: 294
<212> TYPE: PRT
<213> ORGANISM: Ehrlichia chaffeensis

<400> SEQUENCE: 12

Met Asn His Phe Val Val Ala Arg Arg Ser Asp Asp Ser Val Ile Ser
1               5                   10                  15

Val Gln Gln Asn Asn Thr Leu Gln Asn Leu Thr Ile Ser Asn Leu Asn
                20                  25                  30

Lys Pro Ala Glu Ile Leu Leu Glu Tyr Thr Val Glu Glu Leu Ser Asn
                35                  40                  45

Lys Pro Leu Ser Thr Ile Leu His Lys Asn Ile Val Glu Asn Ile Asn
50                  55                  60

Ser Tyr Leu Glu Tyr Thr Ser Asp Gly Thr Asp Leu Phe Asp Ile Leu
```

```
65                  70                  75                  80

Ser Lys Thr Arg Asn Cys Ser Phe Ile Gly Lys Asn Asn Lys Ala Ile
                85                  90                  95

Pro Val Thr Pro Lys Val Phe Arg Val Ile Ala Ser Asn Gln Asp Ile
            100                 105                 110

Ile Asn Tyr Glu Ile Leu Ile Arg Asp Ile Ser Ile Ser Gln Lys Leu
        115                 120                 125

Asp Ile Phe Lys Glu Ser Val Ile Phe Asn Thr Lys Tyr Asn Met His
    130                 135                 140

Pro Thr Phe Asn Ile Met Asp Glu Ala Ser Thr Lys Thr Glu Val Gln
145                 150                 155                 160

Ile Ile Leu Asp Phe Leu His Lys Tyr Asn Thr His Ala Val Ile Ser
                165                 170                 175

Met Ile Gln Leu Asp Pro Pro His Asn Ser Ser Asn Ile Asp Ser Leu
            180                 185                 190

Thr Gln Gln Thr Ile Asn Leu Leu His Lys Asn Ile Arg Glu Ser Asp
        195                 200                 205

Ile Ile Gly Tyr Ile Gly Asn His Lys Ile Ile Cys Ile Leu Leu Gly
    210                 215                 220

Cys Lys Ser Glu His Ala Tyr Ser Ala Ile Ser Arg Ile His Lys Asn
225                 230                 235                 240

Ile Asn Asn Asn Leu Gln Asp Ser His Ala Lys Ile Ser Val Gly Tyr
                245                 250                 255

Ala Gln Met Tyr Asn Glu Ile Asp Ser Val Gln Leu Leu Thr Asn Ile
            260                 265                 270

Ser Asn Val Leu Phe Ile Ala Gln Gln Glu Ala Gly Gly Gly Thr Ile
        275                 280                 285

Lys Ser Thr Asn Ile Ser
    290

<210> SEQ ID NO 13
<211> LENGTH: 322
<212> TYPE: PRT
<213> ORGANISM: Ehrlichia chaffeensis

<400> SEQUENCE: 13

Met Asn Leu Thr Leu Leu Lys Leu Lys Thr Gly Lys Tyr Ile Leu Cys
1               5                   10                  15

Asp Ile Tyr Glu Phe His Glu Tyr Asp Leu Asp Ser Asp Phe Thr Asn
            20                  25                  30

Asp His Tyr Thr Leu Asp His Phe Ile Gly Met Lys Phe Glu Asp Cys
        35                  40                  45

Tyr Phe Ile Glu Asn Thr Leu Ser Lys Tyr Tyr Tyr Ala Phe Phe Tyr
    50                  55                  60

Gly Met His Lys Asn Asn Leu Leu Phe Leu Ala Ile Arg Ile Asn Arg
65                  70                  75                  80

Asn Ile Ser Asn Asn Gln Leu Leu Lys Ser Phe Gln Phe Ser Glu Arg
                85                  90                  95

Ser Ile Cys Cys Phe Gly Ile Ala Thr His Ile His Asp Leu Asp Ile
            100                 105                 110

Lys Lys Ser Met His Gln Tyr Tyr His Phe Ile Arg His Glu Asn Pro
        115                 120                 125

Thr Ile Gln Phe Thr Arg Leu Phe Thr Val Val Ala Val Ser His Tyr
    130                 135                 140
```

-continued

```
Ile Lys Cys Ser Met Leu Gln Ser Ile Tyr Asp Asp Asn Asn Gln Asn
145                 150                 155                 160

Ser Thr Tyr Ser Ile Cys Val Tyr Asn Phe Phe Asp Lys Glu Gly Lys
                165                 170                 175

Ile Tyr Tyr Gln Gln Tyr Glu His His Thr Ala Tyr Pro Leu Tyr Ile
            180                 185                 190

Leu Leu Asn Phe Glu Lys Asn Ile Ile Ile Cys Asp Asn Ala Leu Gly
        195                 200                 205

Gly Leu Arg Arg Tyr Lys Asn Tyr Thr Cys His Asn Val Lys Tyr Gly
    210                 215                 220

Gly Gln Cys Lys Gly Asn Ile Gly Tyr Phe Leu Glu Lys Ser Thr Asn
225                 230                 235                 240

Thr Phe Met Cys Val Glu His Asp Asp Ile Leu Glu Ser Asn Gln Leu
                245                 250                 255

Ser Tyr Ser Thr Lys Val Ala Thr Ser Ser Gln Gln Glu Tyr His Pro
                260                 265                 270

Leu Leu Pro Ser Thr Ser Glu Val Glu Val Pro Gln Ile Asn His Asp
            275                 280                 285

Gly Leu Glu Asp Asp Ile Ser Pro Arg Asn Asn Glu Ser Ala Pro Gly
        290                 295                 300

Leu Phe Val His Asn Thr Asp Leu Glu Pro Leu Thr Val Lys Phe Pro
305                 310                 315                 320

Phe Arg

<210> SEQ ID NO 14
<211> LENGTH: 231
<212> TYPE: PRT
<213> ORGANISM: Ehrlichia chaffeensis

<400> SEQUENCE: 14

Met Leu Gly Ile Leu Gly Asn Asn Leu Glu Glu Gln Thr Trp Tyr Asn
1               5                   10                  15

Glu Lys Leu Cys Ala Asp Val Ser Lys Ile Ser Lys Thr Glu Pro Leu
                20                  25                  30

Ile Cys Tyr Arg Ser Tyr Cys Ile Gly Asn Thr Glu Asp Gly Asp Thr
            35                  40                  45

Lys Gln Leu Gln Ile Phe Val Asn Asp Ser Tyr Lys Lys Asn Val His
        50                  55                  60

Lys Cys Phe Pro Ser Gly Lys Ser Met Phe Ile Leu Lys Thr Leu Leu
65                  70                  75                  80

Pro Lys His Leu Ile Lys His His Ser Lys Ile Arg Gln Ala Val Met
                85                  90                  95

Lys Tyr Thr Gln Asp Tyr Asp Pro Ser Phe Cys His Met His Ile Tyr
            100                 105                 110

Leu Leu Val Asn Glu Asp Lys Leu Asn Ile Phe Tyr His Asp Val His
        115                 120                 125

Asn Arg Leu Leu Asn Lys Glu Arg Leu Met Ile Pro Ile Glu Asp Leu
    130                 135                 140

Thr Gln Tyr Gly Thr Met Glu Leu Ile Tyr Ile Pro Tyr Ile Asn Arg
145                 150                 155                 160

Lys Glu Lys Lys Phe Asp Met Glu Tyr Ala Leu Gln Asn Val Ala Gly
                165                 170                 175

Leu Asn Ala Gln Phe Ile Tyr Asp Gln Gln Glu Lys Lys Ser Ser Glu
            180                 185                 190
```

His Asp Glu Thr Asn Ala Gly Ala Val Ser Ser Phe Phe Ser Asn Leu
            195                 200                 205

Arg Ile Thr Ile Thr Lys Lys Ala Ser Thr Asp Glu Asp Lys Glu Pro
        210                 215                 220

Leu Val Ala Asn Thr Arg Met
225                 230

<210> SEQ ID NO 15
<211> LENGTH: 223
<212> TYPE: PRT
<213> ORGANISM: Ehrlichia chaffeensis

<400> SEQUENCE: 15

Met Ile Ser Asn Ile Ile Ser Asp Asn Ser Ser Ile Thr Ile Phe
1               5                   10                  15

Phe Thr Gly Lys Asp Glu Ile Glu Lys Phe Thr Lys Ile Phe Thr Val
            20                  25                  30

Leu Asp Lys Asn Lys Ala Ala Lys Ala Leu Phe Asn His Glu Val Asn
        35                  40                  45

Ile Glu Tyr Gln Asp Asn Arg Ala Ile Leu Thr Ser Ser Thr Asn Phe
    50                  55                  60

Glu Phe Ser Asp Leu Asn Lys Ile Ile Thr His Met Leu Gln His Asp
65                  70                  75                  80

Phe Ile Ile Asn Thr Asn Thr Ile Glu Gln Ser Leu Glu Gln Gly Cys
                85                  90                  95

Asn Thr Leu Lys Thr Asp Asn Leu Val Ile Cys Arg Phe Asn Asp Lys
            100                 105                 110

Pro Leu Tyr Ser Ile Asn Ile Ser Ile Arg Asn Asn Thr Ile Ile Leu
        115                 120                 125

His Pro Ile Ser Thr Lys Tyr Leu Asp Leu Ser Ser Glu Tyr Asn Gln
    130                 135                 140

Lys Leu Met Ser Leu Leu Lys Thr His Thr Ser Thr Ser Asp Ile Thr
145                 150                 155                 160

Ile Asp Asn Lys Gln Asn Ser Ile Leu Leu Ser Ile Asn Thr Ala Ile
                165                 170                 175

Tyr Asp Ile Ile Gln Ser Leu Val Ser Thr Leu Ile Lys Ala Gln Ile
            180                 185                 190

Thr Glu Glu Ser Asp Lys Glu Lys Ile Leu Gln Gln Leu Thr Lys Leu
        195                 200                 205

Ala Phe His Asp Phe Thr Ser Asn Glu Leu Gln Ile Val Lys Thr
    210                 215                 220

<210> SEQ ID NO 16
<211> LENGTH: 171
<212> TYPE: PRT
<213> ORGANISM: Ehrlichia chaffeensis

<400> SEQUENCE: 16

Met Phe Arg Phe Ile Val Thr Ile Leu Leu Thr Leu Phe Ile Asn Thr
1               5                   10                  15

Lys Cys Tyr Ser Ala Asn Leu Ser Asn Arg Val Asn Met Lys Leu Ser
            20                  25                  30

Ile Gly Ser Leu Asp Met Lys Thr Lys Lys Ile Glu Ala Ala Leu Gln
        35                  40                  45

Val Thr Ile Gln Asn Gly Trp His Ile Tyr Tyr Lys Thr Pro Gly Asp
    50                  55                  60

-continued

```
Leu Gly Leu Pro Thr Ala Phe Gln Trp Gln Asp Asn Thr Phe Lys Ser
65                  70                  75                  80

Ile His Val His Trp Pro Lys Pro Leu Glu His Thr Asp Thr Val Gly
                85                  90                  95

Asp Asn Thr Phe His Ser Asn Ile Tyr Lys Asp Ile Val Ile Phe Pro
            100                 105                 110

Ile Ser Leu Val Leu Lys Asp Asn Lys Gln Lys Glu Leu Asn Thr Thr
        115                 120                 125

Leu Arg Ile Arg Tyr Ala Val Cys Lys Asp Val Cys Ile Pro Arg Glu
    130                 135                 140

Lys Val Ile Ile Leu Asn Gln Leu Leu Gln Asp Tyr Gln Asn Gln Gln
145                 150                 155                 160

Thr Met Gln Leu Ile Asn Phe Trp Lys Thr Lys
                165                 170

<210> SEQ ID NO 17
<211> LENGTH: 185
<212> TYPE: PRT
<213> ORGANISM: Ehrlichia chaffeensis

<400> SEQUENCE: 17

Met Ile Phe His Ile Asp Gly Val Asp Ala Asp Lys Ser Lys Leu Leu
1               5                   10                  15

Asn Lys Leu Ile Thr His Lys Asn Tyr Ile Trp Phe Tyr Arg Ser Ile
            20                  25                  30

Cys Ile Gly Ile Ile Thr Thr Asp Asn Lys Phe Val Leu Leu Lys Asp
        35                  40                  45

Glu Ser Ile Pro Phe Tyr Tyr Glu Gln Gln Val Val Pro Ser Tyr Ile
    50                  55                  60

Phe Phe Met Lys Gly Arg Glu Glu Gly Val Lys Val Trp His Cys Val
65                  70                  75                  80

Leu Ile Lys Gly Cys Gln Val Ser Gln Phe Val Asp Lys Thr Ser Ile
                85                  90                  95

Ile Ile Asn Met Glu Lys Glu Arg Asn Pro Ile Gly Ile Ile Val His
            100                 105                 110

Ile Cys Asp Ile Gln Asp Tyr Gly Glu Ile Ile Tyr Ser Gly Ile Gly
        115                 120                 125

Lys Met Ser Met Ser Asn Phe Lys Lys Asn Leu Lys Asp Ile Cys Lys
    130                 135                 140

Ser Ser Ala Asn Pro Gln Leu Ser Thr Val Thr Phe Pro Ile Ser Tyr
145                 150                 155                 160

Trp Ser Lys Leu Val Gln Asn Val Val Glu Ile Ile Pro Met Gln Lys
                165                 170                 175

Ile Asn Tyr Thr Arg Ile Asn Asn Asn
            180                 185

<210> SEQ ID NO 18
<211> LENGTH: 367
<212> TYPE: PRT
<213> ORGANISM: Ehrlichia chaffeensis

<400> SEQUENCE: 18

Met Ala Val Lys Ile Ala Ile Gly Phe Val Ile Ala Ala Leu Ala Val
1               5                   10                  15

Val Val Ala Leu Ser Ile Ala Ser Val Ile Pro Ser Met Ile Ala Leu
            20                  25                  30
```

```
Lys Ile Phe Met Val Ile Ala Ser Thr Leu Leu Val Ser Asn Val Lys
             35                  40                  45

His Ile Thr Ser Lys Ile Ala Glu Trp His Ser Lys Lys Gln Phe Asp
 50                  55                  60

Asp Thr Val Ser Arg Ser Leu Asn Thr Ala Asp Lys Val Leu Asp Ala
 65                  70                  75                  80

Ser Leu Thr Asp Ala Ile Ala Ser Val His Asn Val Glu Lys Pro Lys
                 85                  90                  95

Asn Phe Phe Thr Ser Asp Ser Ser Asn Tyr Val Leu Phe Pro Glu Phe
                100                 105                 110

Asp Lys Asn Phe Asn Asn Ile Leu Asp Lys Leu Leu Ser Asn Asn Val
            115                 120                 125

Val Asn Glu Asp Thr Leu Asp Gln Glu Leu Met Ser Ser Leu Phe Thr
        130                 135                 140

Glu Glu Glu Lys Ile Leu Ala Ile Leu Ser Ala Arg Phe Ile Cys Lys
145                 150                 155                 160

His Pro Ser Met Tyr Ala Met Tyr Ser Ser Asp Ala Arg Lys Cys Ile
                165                 170                 175

Ser Leu Leu Gly Lys Leu Asn Phe Lys Lys Ser Gln His Ala Asn Asn
            180                 185                 190

Ala His Asp Lys Met Lys Ser Leu Val Arg Glu His Ile Ser Val
        195                 200                 205

Lys Asn Lys Asp Glu Phe Asn Lys Met Leu Lys Glu Ala Met Phe Ile
        210                 215                 220

His Thr Gln Asp Ser Val Phe Met Lys Leu Leu His Gly Leu Lys Asp
225                 230                 235                 240

Ile Glu Asn Cys Pro Glu His Val Leu Glu Leu Met Ser Leu Phe Lys
                245                 250                 255

Ser Tyr Lys Tyr Tyr Asp Val Tyr Asn Asp Ser Thr Val Lys Tyr Tyr
            260                 265                 270

Val Asp Leu Ala Ser Lys Gln Leu Asp Lys Val Asn Pro Arg Leu Arg
        275                 280                 285

Ser Gly Ile Ile Ala Asn Gly Ser Asp Asn Ala Ser Lys Asp Lys
    290                 295                 300

Cys Ser Ala Asp Ser Lys Lys Asp Pro Ala Asp Ile Lys Glu Gly Cys
305                 310                 315                 320

His Ser Met Ser Asn Thr Lys Ser Ser Ser Met Gly Ile Tyr Ser Val
                325                 330                 335

His Asp Ile Thr Ser Asp Ile Ala Asn Asp Thr Leu Lys Arg Ser Phe
            340                 345                 350

Val Glu Lys Leu Ala Asn Gly Asn Ser Pro Lys Gly Arg Val Val
        355                 360                 365

<210> SEQ ID NO 19
<211> LENGTH: 1100
<212> TYPE: PRT
<213> ORGANISM: Ehrlichia chaffeensis

<400> SEQUENCE: 19

Met Leu Asp Phe Glu Leu Thr Val Gln Asn Leu Tyr Arg Glu Gly
 1               5                  10                  15

Leu Val Lys Leu Asp Asn Leu Phe Leu Ser Tyr Leu Gln Ser Asn Asn
                20                  25                  30

Gln Asp Leu Tyr Glu Ile Leu Ile Lys Glu Arg Gln Asn Asn Thr Lys
             35                  40                  45
```

Ala Asp Asn Thr Pro Tyr Ile Ile Glu Leu Ser Tyr Ile Leu Glu His
50                      55                      60

Phe Ile Thr Gln Leu Phe Lys Ile Glu Asp Glu Ile Ile Ile Gln Arg
65                      70                      75                      80

Asn Lys His Lys Glu Phe Ser Glu Ile Tyr Lys Cys Lys Arg Leu Phe
                85                      90                      95

Ile Gln Arg Tyr Ala Leu Lys Lys Tyr Pro Asp Ile Asn Ser Leu Asn
                100                     105                     110

Ile Ser Glu Thr Ile Gln Gln Ile Ser Gln Leu Phe Gln Leu Pro Ile
                115                     120                     125

Gln Glu Lys Lys Phe Ala Gln Gln Val Leu Leu Trp Phe Glu Asp Gln
130                     135                     140

Glu Lys Tyr Ser Glu Asn Leu Asp Ile Thr Ala Lys Tyr Ala Ala Tyr
145                     150                     155                     160

Met Val His Ser Lys Ser Asn Ser Ile Leu Phe Asn Ile Pro Asn Lys
                165                     170                     175

Ile Asp Phe Ser Asn Leu Val His Thr Thr Thr Thr Ile Asn Asn
                180                     185                     190

Asp Thr Thr Ala Met Met Ser Glu His Ile Lys Arg Arg Asp Gly Phe
                195                     200                     205

Asn Leu Thr His Thr Gln Pro Thr Leu Tyr Gln Ala Leu Asn Asn Cys
210                     215                     220

His Tyr Cys Ile Phe Cys His Lys Gln Asn Lys Asp Ser Cys Ser Lys
225                     230                     235                     240

Gly Leu Leu Glu Asn Asn Asn Thr Phe Lys Lys Ser Ile Leu Ser Thr
                245                     250                     255

Glu Leu His Gly Cys Pro Leu Glu Glu Lys Ile Ser Glu Met Asn Leu
                260                     265                     270

Val Lys Ser Gln Gly Tyr Thr Ile Ala Ala Leu Ala Ile Ala Met Ile
                275                     280                     285

Asp Asn Pro Leu Cys Val Leu Thr Gly Tyr His Ile Cys Asn Asp Cys
290                     295                     300

Thr Lys Ser Cys Ile Tyr Gln Lys Gln Asp Pro Val Asn Ile Pro Met
305                     310                     315                     320

Val Glu Thr Gln Ile Val Asn Asn Val Leu Ala Leu Ser Tyr Gly Phe
                325                     330                     335

Glu Ile Tyr Ser Leu Leu Thr Arg Trp Asn Pro Ile Asn Phe Glu Arg
                340                     345                     350

His Leu Pro Gln Ile Ser Thr Asn Lys Asn Val Leu Val Ile Gly Leu
                355                     360                     365

Gly Pro Ala Gly Ile Asn Leu Ser His His Leu Leu Asn Asp Gly His
                370                     375                     380

Thr Val Val Ala Ile Asp Gly Leu Lys Ile Glu Pro Leu Pro Gln His
385                     390                     395                     400

Ile Ser Gly Val Thr Gln Phe Gly Glu Lys Thr Glu Phe Lys Leu Ile
                405                     410                     415

Lys Asn Val Glu Thr Glu Leu Tyr Glu Asn Leu Ser Glu Arg Ile Pro
                420                     425                     430

His Gly Phe Gly Gly Val Ser Glu Tyr Gly Ile Thr Ala Arg Trp Asp
                435                     440                     445

Lys Asn Tyr Leu Lys Ile Ala Arg Leu Ile Leu Glu Arg Arg Lys Asn
450                     455                     460

```
Phe Ala Met Tyr Gly Gly Ile Arg Phe Gly Ser Thr Leu Thr Ile Glu
465                 470                 475                 480

Asn Ala Phe Glu Met Gly Phe His His Ile Ala Ile Ala Thr Gly Ser
            485                 490                 495

Gly Ser Pro Asn Met Ile Asn Val His Asn Ser Leu Val Arg Gly Val
            500                 505                 510

Arg Met Ala Ser Asp Phe Leu Met Ser Leu Gln Leu Thr Gly Ala Ala
            515                 520                 525

Arg Thr Asn Ser Ile Ala Asn Leu Gln Ile Arg Leu Pro Ile Ile Ile
            530                 535                 540

Ile Gly Gly Leu Thr Ala Ile Asp Thr Ala Thr Glu Ala Leu Ala
545                 550                 555                 560

Tyr Tyr Pro Leu Gln Val Glu Lys Phe Leu Thr Arg Tyr Glu Thr Leu
            565                 570                 575

Ile Gln Ile Tyr Gly Lys Ser Tyr Ile Glu Lys Asn Trp Thr Glu Glu
            580                 585                 590

Glu Lys Leu Ile Ala Asn Glu Phe Leu Asn His Ala Ile Gln Ile Arg
    595                 600                 605

Glu Glu Lys Ile Leu Ala Lys Thr Glu Asn Arg Glu Ala Lys Ile Ile
    610                 615                 620

Glu Leu Leu Gln Leu Trp Gly Val Thr Ile Val Tyr Arg Asn Lys
625                 630                 635                 640

Leu Ser Asp Ala Pro Ser Tyr Lys Leu Asn Ser Asp Glu Ile Asn Asn
            645                 650                 655

Ala Leu Ala Glu Gly Ile Tyr Phe Ile Glu Asn Leu Gln Pro Tyr Glu
            660                 665                 670

Ile Asn Ile Asp Gln Tyr Asn His Val Ser Asn Ile Thr Leu Ile Asp
            675                 680                 685

Gln Tyr Asn Asn Lys Lys Thr Leu Phe Thr Lys Thr Ile Ile Ile Ala
            690                 695                 700

Ala Gly Thr Lys Pro Asn Leu Val Ser Ile Lys Glu Asn Gln Gln Phe
705                 710                 715                 720

Arg Val Leu Gly Gln Asp Phe Thr His Thr Phe Asp Leu Gln Gly Asn
            725                 730                 735

Asn Ile Glu Ile Thr Thr Ser Pro Lys Pro Thr Lys Lys Asp Ser Ile
            740                 745                 750

Phe Ile Ser Pro Asp Lys Lys Ile Ser Ile Phe Gly Asp Leu His Leu
            755                 760                 765

Pro Tyr Arg Gly Ser Val Val Lys Ala Met Ala Ser Ala Lys Asn Gly
            770                 775                 780

Tyr Pro Ile Ile Thr Gln Ala Leu Lys Gln Cys Leu Pro Ile Lys Asp
785                 790                 795                 800

Asn Leu Ser Leu Thr Lys Leu Asn His Lys Leu Ile Ala His Ile Val
            805                 810                 815

Asp Ile Lys His Ile Thr Lys Thr Ile Thr Lys Leu Thr Ile Ser Ala
            820                 825                 830

Pro Leu Ala Ala Ala Asn Phe Lys Pro Gly Gln Phe Tyr Arg Leu Gln
            835                 840                 845

Asn Phe Glu Cys Asn Ser Leu Asn Ile Glu Asn Thr Gln Phe Ala Ile
            850                 855                 860

Glu Ser Leu Ala Leu Thr Gly Val Ser Val Asp Lys Asn Lys Gly Leu
865                 870                 875                 880

Ile Ser Thr Ile Val Leu Asn Thr Gly Gly Ser Ser His Leu Cys Asn
```

```
                885                 890                 895

Tyr Leu Lys Lys Asn Glu Pro Ile Ile Phe Met Gly Pro Thr Gly Ala
            900                 905                 910

Pro Thr Glu Ile Pro His Asn Gln Asn Ile Ile Leu Ile Gly Gly Gly
        915                 920                 925

Val Gly Asn Ala Val Leu Phe Ser Ile Gly Lys Ala Leu Leu Ser Asn
    930                 935                 940

Asn Cys Lys Val Leu Tyr Phe Ala Gly Tyr Lys Lys Leu Glu Asp Val
945                 950                 955                 960

Phe Glu Pro Ser Ser Ile Glu Glu Ser Ser Ser Thr Val Val Trp Cys
                965                 970                 975

Cys Asp Glu Lys Arg Ile Glu Pro Lys Arg Thr Gln Asp Lys Ser Tyr
            980                 985                 990

Arg Gly Asn Ile Ile Asp Ala Ile  Ile Gln Tyr Asn Asn  His Leu Ser
        995                 1000                1005

Gln Asp  Val Asp Ile Pro Leu  Tyr Ser Ile Asp Arg  Ile Leu Ile
    1010                1015                1020

Ile Gly  Ser Ser His Met Met  Asp Ala Val Ser His  Ala Ile Phe
    1025                1030                1035

Asn Gln  Leu Arg Thr Phe Phe  Lys Lys Glu Ile Lys  Val Ile Ala
    1040                1045                1050

Ser Ile  Asn Ser Pro Met Gln  Cys Met Met Lys Glu  Ile Cys Ala
    1055                1060                1065

Gln Cys  Leu Gln Lys His Ile  Asp Pro Ile Thr Lys  Gln Glu Asn
    1070                1075                1080

Phe Val  Tyr Ser Cys Asn Asn  Gln Asp Gln Tyr Ala  Asn Tyr Val
    1085                1090                1095

Asp Phe
    1100

<210> SEQ ID NO 20
<211> LENGTH: 121
<212> TYPE: PRT
<213> ORGANISM: Ehrlichia chaffeensis

<400> SEQUENCE: 20

Met Asn Asn Ser Asn Pro Gln Val Ile Glu Ile Thr Val Arg Asn Asn
1               5                   10                  15

Thr Tyr Arg Val Ala Cys Asn Lys Thr Glu Glu Pro His Leu Arg Asn
            20                  25                  30

Leu Val Asp Lys Phe Asn Ala Leu Val Asn Ser Ile Ser Ser Ala Glu
        35                  40                  45

Lys Gly Lys Gly Ser Asp Ala Leu Ile Phe Leu Leu Ala Gly Leu Thr
    50                  55                  60

Leu Glu Asp Glu Lys His Glu Leu Lys Thr Gln Leu Lys Lys Thr Lys
65                  70                  75                  80

Asp Glu Met Leu Thr Tyr Lys Lys Tyr Phe Asp Asp Tyr Leu Lys Ile
                85                  90                  95

Lys Asn Glu Val Ser Asn Ile Leu Ser His Thr Leu Leu Arg Ile Glu
            100                 105                 110

Lys Leu Ile His Asn Leu Glu Lys Ser
        115                 120

<210> SEQ ID NO 21
<211> LENGTH: 293
```

<212> TYPE: PRT
<213> ORGANISM: Ehrlichia chaffeensis

<400> SEQUENCE: 21

```
Met Lys Arg Leu Phe Leu Phe Val Met Ile Ile Ser Phe Ile Asn Ala
1               5                   10                  15

Thr Val Gly Phe Ala Arg Ser Leu Arg Ala Asp Gly Asn Val Tyr Thr
            20                  25                  30

Ala Gly Ile Gly Asp Val Asp Glu Asp Glu Ser Ser Asp Asn Gly Glu
        35                  40                  45

Gln Tyr Asp Glu Asp Gly Glu Tyr Asp Leu Asp Asp Ile Tyr Tyr Glu
    50                  55                  60

Asp Glu Ile Ile Asp Ile Gln Glu Asn Val Asp Asp Ala Ile Tyr Thr
65                  70                  75                  80

Ala Arg Met Glu Asp Ile Glu Asp Ser Tyr Glu Glu Glu Phe Leu Asp
                85                  90                  95

Asp Asp Glu Gln Tyr Asp Leu Asp Asp Ile Tyr Tyr Glu Asp Glu Ile
            100                 105                 110

Ile Asp Ile Gln Glu Asn Val Asp Gly Ala Ile Tyr Thr Ala Arg Met
        115                 120                 125

Glu Asp Ile Glu Asp Ser Tyr Glu Glu Glu Phe Leu Asp Asp Asp Glu
    130                 135                 140

Gln Tyr Asp Leu Asp Asp Ile Tyr Tyr Glu Asp Glu Ile Ile Asp Ile
145                 150                 155                 160

Gln Glu Asn Val Asp Gly Ala Ile Tyr Thr Ala Arg Met Glu Asp Ile
                165                 170                 175

Glu Asp Ser Tyr Glu Glu Phe Ser Asp Glu Asp Glu Gln Tyr Asp
            180                 185                 190

Asp Asn Glu Gln Tyr Asp Pro Asp Glu Glu Glu Asp Tyr Asp Asp
            195                 200                 205

Ile Leu Tyr Glu Glu Asp Asp Tyr Gly Gln Val Asp Gly Asp Glu Leu
        210                 215                 220

Leu Asp Asp Glu Ser Leu Asp Glu Gly Lys Asn Val Phe Leu Glu Glu
225                 230                 235                 240

Tyr Asp Val Pro Gln Tyr Gly Gln Asp Val Ala Asp Gln Asn Gln Glu
                245                 250                 255

Val Asp Asp Lys Thr Leu Leu Lys Ser Gly Asn Ala Lys Asp Gln Gln
            260                 265                 270

Leu Lys Ala Pro Asp Lys Asn Ala Thr Asn Glu Thr Asp Gly Lys Lys
        275                 280                 285

Lys Leu Leu Lys Tyr
    290
```

<210> SEQ ID NO 22
<211> LENGTH: 193
<212> TYPE: PRT
<213> ORGANISM: Ehrlichia chaffeensis

<400> SEQUENCE: 22

```
Met Lys Thr Lys Ile Ala Tyr Ile Tyr Phe Phe Ile Val Tyr Phe Val
1               5                   10                  15

Ser Ile His Ala Tyr Ser Thr Glu Thr Ile Lys Glu Glu Leu Leu Ser
            20                  25                  30

Tyr Phe Ser Ala Ile His Ser Phe Lys Ala Glu Phe Val Gln Thr Ser
        35                  40                  45
```

-continued

```
Ser Ala Asn Asn Asp Ile Gln His Gly Met Val Phe Met Lys Lys Pro
    50                  55                  60
Gly Leu Leu Lys Trp Asp Tyr Tyr Pro Pro Thr Pro Ala Ser Ile Ile
 65                 70                  75                  80
Met His Gly Arg Thr Ile Ser Tyr Tyr Asp Lys Glu Leu Glu Tyr
                85                  90                  95
Ser Tyr Ser Ile Ile Asn Asn Pro Ile Ile Asn Leu Leu Ser Ser Asp
            100                 105                 110
Ile Lys Asp Ile Lys Asp Ile Ile Phe Leu Asn Thr Ser Thr Thr Asp
        115                 120                 125
Ser Lys Lys Val Ile Thr Ile Gln Asp Gln Lys Thr Ala Leu Leu Ala
    130                 135                 140
Asp Ile Ile Phe Asn Thr Asn Pro Ile Thr Ile Val Gly Leu Asn Ile
145                 150                 155                 160
Ala Ser Pro Asp Ser Ile Thr Tyr Ile Lys Phe Tyr Asn Ile Gln Asn
                165                 170                 175
Asn Ile Thr Ile Lys Asp Thr Glu Phe Lys His Ser Ser Tyr Tyr
            180                 185                 190
Asn
```

<210> SEQ ID NO 23
<211> LENGTH: 120
<212> TYPE: PRT
<213> ORGANISM: Ehrlichia canis

<400> SEQUENCE: 23

```
Met Asp Met Ile Asn Ile Phe Asp Asn Thr Glu Asp Asp Ala Phe Ser
 1               5                  10                  15
Val Ser Asn Phe Ile Asn Gln Asn Phe Ile Ser Gln Phe Thr Ile Thr
                20                  25                  30
Ile Leu Pro Pro Ser Val Pro Leu Tyr His Asp Gln His Ile Asp Glu
            35                  40                  45
Gly Met Tyr Ser Val Val Phe Ser Tyr Lys Lys Tyr Glu Ala Gln Gln
    50                  55                  60
Pro Tyr Gly Leu Val Glu His Lys Ser Gly Lys Phe Glu Ala Ser Leu
 65                 70                  75                  80
Asp His Ser Asp His Arg Leu Tyr Leu Asn Lys Asp Asp Ile Ser Ile
                85                  90                  95
Val Leu Asn Glu Asp Met Leu Asn Leu Cys Leu Ser Cys Thr Lys Val
            100                 105                 110
Ile Asp Asn Lys Asp Ser Ala Gln
        115                 120
```

<210> SEQ ID NO 24
<211> LENGTH: 92
<212> TYPE: PRT
<213> ORGANISM: Ehrlichia canis

<400> SEQUENCE: 24

```
Met Thr Glu Glu Leu Ser Leu Asp Ser Ser Leu Glu Ser Ala Met Ser
 1               5                  10                  15
Tyr Val Glu Lys Gly Tyr Asn Thr Lys Ile Asp Ser Lys Met Lys Glu
                20                  25                  30
Cys Ile Lys Asn Glu Val Lys Gln Ala Ile Pro Glu Leu Asn Lys Val
            35                  40                  45
Leu Thr Pro Leu Ile Asn Ser Ala Ile Ser Ser Glu Gln Gln Thr Leu
```

```
                50                  55                  60
Ser Gln Asn Gln Gln Ala Asp Leu Val Lys Lys Leu Ile Glu Ile Met
 65                  70                  75                  80

Met Pro His Met Gln Lys Ile Ile Thr Ala Ser Glu
                 85                  90

<210> SEQ ID NO 25
<211> LENGTH: 425
<212> TYPE: PRT
<213> ORGANISM: Ehrlichia canis

<400> SEQUENCE: 25

Met Leu Gly Lys Asp Tyr Phe Ser Asp Leu Asp Lys Arg Leu Val Ala
  1               5                  10                  15

Phe Ala Lys Leu Asn Asn Gly Lys Gln Arg Ser Ser Lys Tyr His Phe
                 20                  25                  30

Met Leu Ser Ser Cys Ile Leu Ile Thr Ala Ile Ile Thr Val Leu Ser
             35                  40                  45

Leu Ile Val Leu Tyr Ser Asp Lys Gln Tyr Phe Ser Ser Met Phe Lys
         50                  55                  60

Gly Gly Phe Lys Leu Phe Ser Ser Asp Thr Ile Pro Phe Ser Met Ala
 65                  70                  75                  80

Leu Ile Ala Ile Ile Pro Ser Leu Leu Leu Leu Phe Phe Leu Ile Tyr
                 85                  90                  95

Lys Val Cys Ala Phe His Asp Leu Asn Arg Lys Leu Asn Asn Glu Ser
            100                 105                 110

Ile Asp Ile Leu Gly Lys Leu Glu Glu Trp Gln Tyr Phe Leu His Leu
        115                 120                 125

Gln Leu Glu Tyr Asn Thr Asn Lys Ile Glu Asn Ile Asp Glu Val Leu
    130                 135                 140

Lys Leu Phe Lys Lys Tyr Ser Ser Phe Val Lys Gln Cys Ser Asp
145                 150                 155                 160

Gly Phe Ala Lys Leu Glu Glu Gln Cys Lys Ser Val Leu Ala Ala Val
                165                 170                 175

Asn Ser Thr Thr His Gly Val Asn Ala Gly Ile Ser Lys Ile Asn Cys
            180                 185                 190

Val Val Glu Asp Val Lys Leu Gln Leu Asn Gly Leu Ser Ala Gly Cys
        195                 200                 205

Gln Lys Phe Ser Glu Ser Ser Asn Leu Leu Ser Ala Ile Glu Ser
    210                 215                 220

Ala Ile Lys Thr Glu Gly Val Asn Val Asp Asp Arg Ile Ala Phe Leu
225                 230                 235                 240

Gln Asn Leu Gln Ala Asn Leu Ala Ser Asp Val Asp Leu Gly Leu Ile
                245                 250                 255

Gln Asn Arg Val Gln Asn Phe Val Ala Arg Val Arg Ser Ile Leu Val
            260                 265                 270

Glu Lys Pro Ser Ile Val Lys Pro Ala Val Leu Arg Glu Leu Trp Cys
        275                 280                 285

Leu Gln Glu Ser Phe Asn Val Ile Ile Met Lys Val His Lys Thr Asp
    290                 295                 300

Gln Cys Ala Leu Glu Phe Leu Gln Leu Ile Gln Asn Leu Glu Gln Glu
305                 310                 315                 320

Ile Ser Lys Phe Ser Leu Ser Ala Ser Lys Lys Ile Ala Ser Tyr Asn
                325                 330                 335
```

```
Gly Asn Asn Arg Asn Leu Leu Glu Lys Met Ile Lys Leu Glu Leu Pro
                340                 345                 350

Leu Leu His Ile Asn Ile Leu Arg Phe Leu Thr Ala Lys Arg Ala Ala
            355                 360                 365

Phe Ile Thr Asn Thr Ser Ala Asp Ile Thr Gln Phe Ile Gln Glu Tyr
        370                 375                 380

Ala Ser Gly Asp Leu Gln Arg Leu Ser Asp Ser Thr Ser Asp Ser Met
385                 390                 395                 400

Leu Ser Ile Ser Ser Phe Leu Ser Leu Gln Asp Thr Asn Val Ser Asp
                405                 410                 415

Lys Val Ser Asn Asp Ile Asn Pro Gln
            420                 425

<210> SEQ ID NO 26
<211> LENGTH: 293
<212> TYPE: PRT
<213> ORGANISM: Ehrlichia canis

<400> SEQUENCE: 26

Met Asn Gln Phe Val Ala Arg Arg Ala Asp Asp Ser Val Ile Ser
1               5                   10                  15

Val Gln Gln Asn Asn Thr Leu Gln Asn Leu Met Ile Ser Asn Leu Asn
                20                  25                  30

Glu Ser Ala Glu Thr Leu Leu Glu Tyr Lys Ala Ala Glu Leu Thr Asn
            35                  40                  45

Lys Pro Leu Ser Thr Ile Leu His Lys Asn Val Thr Glu Asn Ile Asn
    50                  55                  60

Asn Tyr Leu Glu Tyr Ser Ser Asp Gly Thr Asp Leu Phe Asp Ile Leu
65                  70                  75                  80

Ser Lys Thr Ile Asn Cys Ser Leu Ile Gly Lys Asn Asn Lys Val Ile
                85                  90                  95

Pro Ile Lys Pro Lys Val Phe Arg Thr Thr Ala Tyr Asn Gln Asp Ile
            100                 105                 110

Ile Asn Tyr Glu Ile Leu Val Arg Asp Ala Ser Met Ser Gln Lys Leu
        115                 120                 125

Asp Ile Phe Arg Gln Ser Val Leu Pro Asn Thr Lys His Asn Met His
130                 135                 140

Pro Phe Phe Asn Ile Met Asp Glu Ala Ser Thr Asn Lys Glu Ile Lys
145                 150                 155                 160

Ile Val Leu Asp Phe Leu His Lys Tyr Asn Ile His Ala Val Ile Gly
                165                 170                 175

Ile Ile Gln Ile Asp Pro Pro His Asn Ser Ser Asn Ile Asp Thr Leu
            180                 185                 190

Thr Gln Tyr Thr Ile Asn Leu Leu His Lys Asn Val Arg Glu Ser Asp
        195                 200                 205

Ile Val Gly Tyr Ile Gly Asp His Lys Ile Ile Cys Leu Leu Leu Gly
    210                 215                 220

Cys Lys Ser Glu Tyr Ala His Thr Ala Ile Ser Arg Ile His Lys Asn
225                 230                 235                 240

Ile Asn Asn Asn Leu Gln Asn Leu His Val Lys Ala Ser Ile Gly Tyr
                245                 250                 255

Ala Gln Met Tyr Asn Glu Thr Asp Thr Thr Gln Ile Leu Thr Asn Leu
            260                 265                 270

Asn Asn Met Leu Phe Ile Ala Gln Gln Glu Ala Gly Gly Thr Ile
        275                 280                 285
```

```
Lys Ser Thr Asn Ile
    290

<210> SEQ ID NO 27
<211> LENGTH: 305
<212> TYPE: PRT
<213> ORGANISM: Ehrlichia canis

<400> SEQUENCE: 27

Met Val Ile Gln Asn Ile Leu Ile Gly Asp Asn Ser Asn Ile Thr Ile
1               5                   10                  15

Phe Phe Thr Glu Lys Asn Glu Ile Glu Asn Phe Thr Lys Ile Phe Thr
            20                  25                  30

Val Leu Asp Lys Asn Lys Ala Ala Lys Thr Leu Phe Asn Asn Glu Val
        35                  40                  45

Asn Ile Gln Tyr Gln Asp Met Ser Ala Thr Leu Thr Ser Ser Thr His
    50                  55                  60

Phe Glu Phe Ser Asp Leu Asn Lys Ile Ile Thr His Met Leu Gln His
65                  70                  75                  80

Asn Phe Thr Ile Ser Thr Asn Ile Ile Ala Gln Ser Leu Glu Gln Gly
                85                  90                  95

Cys Asn Ile Leu Lys Thr Ser Asn Leu Val Ile Cys Arg Phe Asn Asn
            100                 105                 110

Gln Pro Leu Tyr Cys Ile Asn Val Ser Ile Arg Asn Asn Thr Ile Ile
        115                 120                 125

Leu His Pro Ile Ser Thr Gln Tyr Ser Asp Leu Ser Ser Glu Asp Asn
    130                 135                 140

Lys Lys Leu Ile Asn Ala Leu Gln Thr His Thr Asn Thr Asn Asp Ile
145                 150                 155                 160

Thr Thr Asp Asn Lys Gln His Ala Ile Leu Ile Ser Ile Asn Thr Val
                165                 170                 175

Ile Tyr Glu Val Leu Gln Ser Leu Val Asn Ile Leu Ile Lys Val Gln
            180                 185                 190

Ile Ile Glu Glu Asn Asp Lys Glu Lys Thr Leu Gln Gln Leu Thr Lys
        195                 200                 205

Leu Ala Phe His Asp Phe Thr Ser Asn Glu Leu Gln Ile Val Lys Asn
    210                 215                 220

Ile Ala Gln Tyr Pro Thr Asp His Pro Leu Ser Lys Tyr Lys Asn Ile
225                 230                 235                 240

Ala Lys Asn Val Glu Asn Ile Phe Ser His Leu Ala Ser Thr Gln Ser
                245                 250                 255

Leu Asp Ser Ser Ser Ala Lys Leu Leu Gln Asp Ala Ile Asn Asn Thr
            260                 265                 270

Gly Glu Phe Ser Thr Ala Pro His Ile Ile Met Arg Ser Phe Asn Lys
        275                 280                 285

Leu Asn Lys Asn Phe His Asp Gln Ile Gln Asn Ile Ile Asn Gln Ser
    290                 295                 300

Glu
305

<210> SEQ ID NO 28
<211> LENGTH: 192
<212> TYPE: PRT
<213> ORGANISM: Ehrlichia chaffeensis

<400> SEQUENCE: 28
```

```
Met Ile Ser Ser Ile Lys Ser Thr Ile Ile Thr Leu Gln Asn His Val
1               5                   10                  15

Leu Pro Ser Leu Leu Ile Thr Phe Ser Ser Thr Glu Ile Phe Cys
            20                  25                  30

Asn Thr Val Ile Thr Ser Phe Thr Ile Gly Gly Thr Ser Phe Phe
        35                  40                  45

Phe Gly Cys Leu Ala Ala Ile Pro Ser Pro Pro Thr Ala Pro Asn Phe
    50                  55                  60

Asp Ser Ser Cys Val Asn Ile Pro Pro Ser Lys Ser Ser Val Gly Thr
65                  70              75                      80

Ser Phe Ile Ser Arg Cys Leu Pro Thr Thr Leu Ser Pro Pro Thr Ala
                85                  90                  95

Pro Asn Phe Asp Ser Pro Cys Val Asn Ile Pro Pro Ser Lys Ser Ser
            100                 105                 110

Val Gly Thr Ser Phe Ile Ser Arg Cys Leu Pro Thr Ile Pro Ser Pro
            115                 120                 125

Pro Thr Ala Pro Asn Ser Asp Pro Ser Ile Val Asp Arg Thr Ile Thr
            130             135                 140

Phe Phe Leu Leu Asp Ser Lys Pro Leu Ile Ser Cys Cys Thr Val Lys
145                 150                 155                 160

Phe Ala Phe Asn Trp Ala Thr Phe Ala Lys Ala Ser Asn Ser Ser Lys
                165                 170                 175

Ser Leu Ser Phe Asp Ala Val Arg Thr Leu Ala Tyr Thr Asn Phe Pro
                180                 185                 190
```

IMMUNOREACTIVE POLYPEPTIDES

This application is a national phase application under 35 U.S.C. § 371 of International Application No. PCT/US2019/031137, filed May 7, 2019, which claims the benefit of U.S. Provisional Application Ser. No. 62/667,925, filed May 7, 2018, the entirety of each of which is hereby incorporated by reference.

BACKGROUND OF THE INVENTION

1. Field of the Invention

Pursuant to 37 C.F.R. 1.821(c), a sequence listing is submitted herewith as an ASCII compliant text file named "CLFRP0436US_ST25.txt", created on Nov. 5, 2020 and having a size of ~66 kilobytes. The content of the aforementioned file is hereby incorporated by reference in its entirety.

The present invention relates generally to the field of molecular biology and medicine. More particularly, it concerns diagnostic methods and vaccine compositions for *Echrlichia*.

2. Description of Related Art

Human monocytotropic ehrlichiosis (HME) is a group 1 NIAID emerging disease, and the etiologic agent, *E. chaffeensis*, is classified as a Category C priority pathogen. HME is an undifferentiated febrile illness that is life-threatening, clinical diagnosis is difficult, and definitive diagnosis is most often retrospective (Walker and Dumler, 1997; Walker et al., 2004; Dumler et al., 2007). Although well over 8,000 cases have been reported to the Centers for Disease Control as of 2012, this number likely underestimates the actual number of cases by 100-fold (Olano et al., 2003). The disease is often undiagnosed due to the non-specific symptoms associated with the onset, but it results in patient hospitalization in 43-62% of cases (Fishbein et al., 1994). Progression of the disease can result in a fatal outcome and often involves multisystem failure, with acute respiratory distress syndrome (ARDS) and meningoencephalitis being common in many fatal cases (Fishbein et al., 1994; Paparone et al., 1995). The threat to public health is increasing with newly emerging ehrlichial agents, yet vaccines for human ehrlichioses are not available, and therapeutic options are limited. New information and bioinformatics prediction tools have been recently developed that make a genome-wide identification of protective immunodiagnostic/vaccine candidates feasible (He et al., 2010; Magnan et al., 2010)

Prospects for development of effective subunit vaccines and immunodiagnostics for *Ehrlichia* have been limited due to many factors, not the least of which is the small repertoire of immunoreactive/protective proteins that have been molecularly defined (McBride and Walker, 2010). The gaps in knowledge required to address this problem for *Ehrlichia chaffeensis* have been narrowed by recent progress in understanding of protective/pathologic immune mechanisms (Feng and Walker 2004; Nandi et al., 2007; Winslow et al., 2000), immunomolecular characterization of some vaccine/diagnostic antigens (Kuriakose et al., 2012; Li et al., 2002), genome, transcriptome and proteome profiles (Kuriakose et al., 2011; Lin et al., 2011), new animal models (Winslow et al., 1998; Sotomay et al., 2001), and other technological advances. Studies utilizing low throughput approaches to define antigenic components of *E. chaffeensis* have yielded a small group of protective antigens that include a major outer membrane protein (OMP), and a family of secreted tandem repeat protein (TRP) effectors with major protective linear antibody epitopes (Kuriakose et al., 2012; Li et al., 2001). Nevertheless, these antigens likely represent a significant, but incomplete repertoire of immunoreactive/protective proteins. In addition, it is well established that antibody-mediated immunity is necessary for protection against *E. chaffeensis* infection (Winslow et al., 2000; Li et al., 2002; Kuriakose et al., 2012; Li et al., 2001; Racine et al., 2011; Yager et al., 2005), and antibodies are the cornerstone of the most effective vaccines for humans. Elimination of *E. chaffeensis* occurs, at least in part, during the extracellular stage of infection (Li and Winslow 2003); however, intracellular immune mechanisms may also be important, and defining the characteristics of antigens/antibodies that are protective in both environments is critical for effective vaccine development.

While some *E. chaffeensis* immunoreactive proteins have been identified, it is presently unclear which, if any, of the many untested *E. Chaffeensis* proteins produced by the *E. chaffeensis* genome might display immunoreactivity or be important for immune responses against *E. chaffeensis*. About ~45% of the *E. chaffeensis* genome ORFs encode proteins <20 kDa (Kuriakose et al., 2011; Dunning Hotopp et al., 2006), and many of these small molecular mass proteins have not been studied. Clearly, there is a need for new and improved methods for diagnosing and vaccinating against *E. chaffeensis*.

SUMMARY OF THE INVENTION

The present invention, in some aspects, overcomes limitations in the prior art by providing new and improved methods for diagnosing and vaccinating against *Ehrlichia chaffeensis* or *Ehrlichia canis*.

As shown in the below examples, highly immunoreactive *E. chaffeensis* proteins were identified, and the in vivo important of these immunoreactive proteins was verified using ELISA tests on human monocytotropic ehrlichiosis (HME) positive sera obtained from patients. ELISA testing using positive HME sera obtained from patients revealed that the following proteins elicited significant responses, indicating that the following proteins can be used for example in diagnostic methods to detect infection by *E. chaffeensis* or may be used to induce an immune response in a subject against *E. chaffeensis*:

TABLE 1

| Immunoreactive Proteins |
|---|
| A4 (Ech_0261; SEQ ID NO: 1), |
| A5 (Ech_0255; SEQ ID NO: 2), |
| A9 (Ech_0722; SEQ ID NO: 3), |
| A14 (Ech_0535; SEQ ID NO: 4), |
| A15 (Ech_0251; SEQ ID NO: 5), |
| A19 (Ech_0745; SEQ ID NO: 6), |
| A21 (Ech_0825; SEQ ID NO: 7), |
| A23 (Ech_0166; SEQ ID NO: 8), |
| A34 (Ech_0252; SEQ ID NO: 9), |
| A38 (Ech_0763; SEQ ID NO: 10), |

TABLE 1-continued

Immunoreactive Proteins

A42 (Ech_0240; SEQ ID NO: 11),

A47 (Ech_0345; SEQ ID NO: 12),

A50 (Ech_0700; SEQ ID NO: 28)

A51 (Ech_0607; SEQ ID NO: 13),

A54 (Ech_0614; SEQ ID NO: 14),

A55 (Ech_1103; SEQ ID NO: 15),

A56 (Ech_0846; SEQ ID NO: 16),

A62 (Ech_0578; SEQ ID NO: 17),

A63 (Ech_0716; SEQ ID NO: 18),

A64 IN (Ech_0778; SEQ ID NO: 19),

A66 (Ech_0398; SEQ ID NO: 20),

A75 (Ech_0388; SEQ ID NO: 21),

A77 (Ech_1053; SEQ ID NO: 22).

As shown in the below examples, all of the polypeptides listed in Table 1 demonstrated reactivity with sera used for screening. As shown in the below results, the proteins listed in Table 1 displayed an optical density (OD) of at least 0.3 or greater. In some embodiments, the protein is a protein of Table 2:

TABLE 2

Medium Immunoreactivity Proteins

A14 (Ech_0535; SEQ ID NO: 5),

A19 (Ech_0745; SEQ ID NO: 6),

A38 (Ech_0763; SEQ ID NO: 10),

A42 (Ech_0240; SEQ ID NO: 11),

A47 (Ech_0345; SEQ ID NO: 12),

A55 (Ech_1103; SEQ ID NO: 15),

A62 (Ech_0578; SEQ ID NO: 17).

As shown in the below examples, the proteins in Table 2 showed 100% reactivity to all the tested sera, and showed ELISA OD values between 0.2 to 0.5. Even more preferably, the immunoreactive protein is a protein as shown in Table 3:

TABLE 3

Highly Immunoreactive Proteins

A4 (Ech_0261; SEQ ID NO: 1),

A5 (Ech_0255; SEQ ID NO: 2),

A51 (Ech_0607; SEQ ID NO: 13),

A56 (Ech_0846; SEQ ID NO: 16),

A63 (Ech_0716; SEQ ID NO: 18),

A77 (Ech_1053; SEQ ID NO: 22).

As shown in the below examples, the proteins in Table 3 displayed 100% reactivity to all the sera tested and had an optical density of ≥0.5 with least 4 sera. In some embodiments, it is anticipated that a protein having at least 90%, more preferably at least 95%, 97.5%, or at least 99% sequence identity to a protein in Table 1 or Table 2, or more preferably Table 3, that retains at least some of its immunoreactivity may be used in various embodiments as described herein (e.g., in a diagnostic test, or to induce an immune response against *Ehrlichia* in a subject, for inclusion in a vaccine composition). In some embodiments, the protein may be used to generate an antibody that selectively binds the protein, and the antibody may be used, e.g., in a diagnostic assay; for example, in some embodiments, the antibody is labelled or attached to a solid substrate (e.g., in a lateral-flow test). In some embodiments, the protein is A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11).

An aspect of the present invention relates to method of detecting antibodies that specifically bind an *Ehrlichia* organism in a test sample, comprising: (a) contacting an isolated polypeptide of Table 1, Table 2, or Table 3 or a polypeptide having at least 95% sequence identity thereto, with the test sample, under conditions that allow peptide-antibody complexes to form; (b) detecting the peptide-antibody complexes; wherein the detection of the peptide-antibody complexes is an indication that antibodies specific for an *Ehrlichia* organism are present in the test sample, and wherein the absence of the peptide-antibody complexes is an indication that antibodies specific an *Ehrlichia* organism are not present in the test sample. In some embodiments, the isolated polypeptide may comprise or consist of an isolated peptide of Table 1, Table 2, or Table 3. In some embodiments, the polypeptide is selected from the group consisting of a polypeptide Table 2 or Table 3. In some embodiments, the isolated polypeptide comprises, consists of, or is A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11). In some embodiments, the *Ehrlichia* organism is an *Ehrlichia chaffeensis* organism. The step of detecting may comprise performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay (e.g., a Bio-Plex® suspension array assay), a mass spectrometry assay, or a particulate-based assay. In some embodiments, the step of detecting comprises a lateral flow assay or an enzyme-linked immunoassay, wherein the enzyme-linked immunoassay is an ELISA.

Another aspect of the present invention relates to a method of identifying an *Ehrlichia* infection in a mammalian subject comprising: (a) contacting a biological sample from the subject with an isolated polypeptide of Table 1, Table 2, or Table 3 under conditions that allow peptide-antibody complexes to form; and (b) detecting the peptide-antibody complexes; wherein the detection of the peptide-antibody complexes is an indication that the subject has an *Ehrlichia* infection. In some embodiments, the polypeptide is selected from Table 2 or Table 3. In some embodiments, the isolated polypeptide may comprise or consist of an isolated peptide of Table 1, Table 2, or Table 3. In some embodiments, the isolated polypeptide is A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11). The step of detecting may comprise performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay (e.g., a Bio-Plex® suspension array assay), a dipstick test, or a particulate-based assay. In some embodiments, the subject is a human. In some embodiments, the subject is a dog.

Yet another aspect of the present invention relates to an isolated polypeptide comprising a sequence of Table 1, Table 2, or Table 3, wherein the isolated peptide is immobilized on a surface of a support substrate. In some embodiments, the polypeptide is selected from the group consisting of Table 2. In some embodiments, the polypeptide is selected from the group consisting of Table 3. In some embodiments, the isolated polypeptide may comprise or consist of an isolated peptide of Table 1, Table 2, or Table 3. In some embodiments, the isolated polypeptide is A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11). In some embodiments, the support substrate comprises latex, polystyrene, nylon, nitrocellulose, cellulose, silica, agarose, or magnetic resin. In some embodiments, the support substrate is a reaction chamber, a well, a membrane, a filter, a paper, an emulsion, a bead, a microbead, a dipstick, a card, a glass slide, a lateral flow apparatus, a microchip, a comb, a silica particle, a magnetic particle, a nanoparticle, or a self-assembling monolayer. The peptide may be comprised in a kit. In some embodiments, the peptide is produced via peptide synthesis or in vitro transcription and translation (IVTT). In some embodiments, the peptide is recombinantly produced.

Another aspect of the present invention relates to an isolated polypeptide comprising a sequence of Table1, Table 2, or Table 3, wherein the isolated peptide is covalently attached to a detectable label. In some embodiments, the polypeptide is selected from the group consisting of Table 2. In some embodiments, the polypeptide is selected from the group consisting of Table 3. In some embodiments, the isolated polypeptide may comprise or consist of an isolated peptide of Table 1, Table 2, or Table 3. In some embodiments, the polypeptide comprises or consists of A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11). In some embodiments, the detectable label a fluorescent label, a radioactive label, an enzyme label, or a luminescent nanoparticle. In some embodiments, the luminescent nanoparticle is a luminescent rare earth nanoparticle, a luminous nanoparticle, or a strontium aluminate nanoparticle. The polypeptide may be comprised in a kit. In some embodiments, the polypeptide is produced via peptide synthesis or in vitro transcription and translation (IVTT). In some embodiments, the polypeptide is recombinantly produced.

Yet another aspect of the present invention relates to a kit comprising: (a) the isolated polypeptide of the present embodiments or as described above, (b) an anti-dog or anti-human secondary antibody linked to a reporter molecule; and, (c) an appropriate reagent for detection of the reporter molecule. In some embodiments, the peptide is immobilized on a membrane or a microtiter plate. In some embodiments, the reporter molecule is selected from the group consisting of luciferase, horseradish peroxidase, a luminous nanoparticle, P-galactosidase, and a fluorescent label. In some embodiments, the luminous nanoparticle is a strontium aluminate nanoparticle. The kit may further comprises a dilution buffer for dog or human serum. The kit may comprise a lateral flow immunoassay or a lateral flow immunochromatographic assay. In some embodiments, the kit comprises an enzyme-linked immunosorbent assay (ELISA).

Another aspect of the present invention relates to a method of inducing an immune response in a mammalian subject comprising administering to the subject an effective amount of a pharmaceutical preparation comprising a polypeptide of Table 1, Table 2, or Table 3. In some embodiments, the polypeptide is selected from the group consisting of Table 2 and Table 3. In some embodiments, the isolated polypeptide may comprise or consist of an isolated peptide of Table 1, Table 2, or Table 3. In some embodiments, the polypeptide comprises or consists of A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11). The subject may be a human. In some embodiments, the pharmaceutical preparation is administered subcutaneously, intramuscularly, nasally, via inhalation or aerosol delivery, or intradermally.

Yet another aspect of the present invention relates to a method of treating an *Ehrlichia chaffeensis* infection in a subject comprising: (a) contacting a biological sample from the subject with an isolated polypeptide of Table1, Table 2, or Table 3 under conditions that allow peptide-antibody complexes to form; (b) detecting the peptide-antibody complexes; wherein the detection of the peptide-antibody complexes is an indication that the subject has an *Ehrlichia chaffeensis* infection; and (c) and administering a therapeutic compound to treat *Ehrlichia* infection in the subject. In some embodiments, the polypeptide is selected from the group consisting of Table 2. In some embodiments, the polypeptide is selected from the group consisting of Table 3. In some embodiments, the isolated polypeptide may comprise or consist of an isolated peptide of Table 1, Table 2, or Table 3. In some embodiments, the polypeptide is A77 (SEQ ID NO:22), A62 (SEQ ID NO:17), A56 (SEQ ID NO:16), A19 (SEQ ID NO:6), A50 (Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech_0240; SEQ ID NO:11). The step of detecting may comprise performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay (e.g., a Bio-Plex® suspension array assay), a dipstick test, or a particulate-based assay. In some embodiments, the subject is a dog or a human. The therapeutic compound may be an antibiotic such as, e.g., doxycycline.

Another aspect of the present invention relates to a method of detecting antibodies that specifically bind an *Ehrlichia* organism in a test sample, comprising: (a) contacting an isolated polypeptide of: Ecaj_0919, Ecaj_0073, Ecaj_0104, Ecaj 0663, or Ecaj_0881, more preferably Ecaj_0919, Ecaj_0073, Ecaj_0104, or Ecaj_0663, even more preferably Ecaj_0919, Ecaj_0073, Ecaj_0104, even more preferably Ecaj_0919 or Ecaj_0073; or a polypeptide having at least 95% sequence identity thereto, with the test sample, under conditions that allow peptide-antibody complexes to form; (b) detecting the peptide-antibody complexes; wherein the detection of the peptide-antibody complexes is an indication that antibodies specific for an *Ehrlichia* organism are present in the test sample, and wherein the absence of the peptide-antibody complexes is an indication that antibodies specific an *Ehrlichia* organism are not present in the test sample. The step of detecting may comprise performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay, a mass spectrometry assay, or a particulate-based assay. In some embodiments, the step of detecting comprises a lateral flow assay or an enzyme-linked immunoassay, wherein the enzyme-linked immunoassay is an ELISA.

Yet another aspect of the present invention relates to a method of identifying an *Ehrlichia* infection in a mammalian subject comprising: (a) contacting a biological sample from the subject with an isolated polypeptide of Ecaj_0919, Ecaj_0073, Ecaj_0104, Ecaj_0663, or Ecaj_0881, more preferably Ecaj_0919, Ecaj_0073, Ecaj_0104, or Ecaj_0663, even more preferably Ecaj_0919, Ecaj_0073, Ecaj_0104, even more preferably Ecaj_0919 or Ecaj_0073, under conditions that allow peptide-antibody complexes to form; and (b) detecting the peptide-antibody complexes; wherein the detection of the peptide-antibody complexes is an indication that the subject has an *Ehrlichia* infection. The step of detecting may comprise performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay, a dipstick test, or a particulate-based assay. In some embodiments, the subject is a dog.

Another aspect of the present invention relates to an isolated polypeptide comprising a sequence of Ecaj_0919, Ecaj_0073, Ecaj_0104, Ecaj_0663, or Ecaj_0881, more preferably Ecaj_0919, Ecaj_0073, Ecaj_0104, or Ecaj_0663, even more preferably Ecaj_0919, Ecaj_0073, Ecaj_0104, even more preferably Ecaj_0919 or Ecaj_0073, wherein the isolated peptide is immobilized on a surface of a support substrate. The support substrate may comprise or consist of latex, polystyrene, nylon, nitrocellulose, cellulose, silica, agarose, or magnetic resin. In some embodiments, the support substrate is a reaction chamber, a well, a membrane, a filter, a paper, an emulsion, a bead, a microbead, a dipstick, a card, a glass slide, a lateral flow apparatus, a microchip, a comb, a silica particle, a magnetic particle, a nanoparticle, or a self-assembling monolayer. In some embodiments, the peptide is comprised in a kit. The peptide may be produced via peptide synthesis or in vitro transcription and translation (IVTT). In some embodiments, the peptide is recombinantly produced.

Yet another aspect of the present invention relates to an isolated polypeptide comprising a sequence of or consisting of Ecaj_0919, Ecaj_0073, Ecaj_0104, Ecaj_0663, or Ecaj_0881, more preferably Ecaj_0919, Ecaj_0073, Ecaj_0104, or Ecaj_0663, even more preferably Ecaj_0919, Ecaj_0073, Ecaj_0104, even more preferably Ecaj_0919 or Ecaj_0073, wherein the isolated peptide is covalently attached to a detectable label. The detectable label may be a fluorescent label, a radioactive label, an enzyme label, or a luminescent nanoparticle. The luminescent nanoparticle may be a luminescent rare earth nanoparticle, a luminous nanoparticle, or a strontium aluminate nanoparticle. The polypeptide may be comprised in a kit. In some embodiments, the polypeptide is produced via peptide synthesis or in vitro transcription and translation (IVTT). In some embodiments, the polypeptide is recombinantly produced.

Another aspect of the present invention relates to a kit comprising: (a) an isolated polypeptide disclosed herein or listed above, (b) an anti-dog or anti-human secondary antibody linked to a reporter molecule; and, (c) an appropriate reagent for detection of the reporter molecule. The peptide may be immobilized on a membrane or a microtiter plate. In some embodiments, the reporter molecule is selected from the group consisting of luciferase, horseradish peroxidase, a luminous nanoparticle, P-galactosidase, and a fluorescent label. The luminous nanoparticle may be a strontium aluminate nanoparticle. The kit may further comprise a dilution buffer for dog or human serum. The kit may comprise a lateral flow immunoassay or a lateral flow immunochromatographic assay. In some embodiments, the kit comprises an enzyme-linked immunosorbent assay (ELISA).

Yet another aspect of the present invention relates to a method of inducing an immune response in a mammalian subject comprising administering to the subject an effective amount of a pharmaceutical preparation comprising a polypeptide of Ecaj_0919, Ecaj_0073, Ecaj_0104, Ecaj_0663, or Ecaj_0881, more preferably Ecaj_0919, Ecaj_0073, Ecaj_0104, or Ecaj_0663, even more preferably Ecaj_0919, Ecaj_0073, Ecaj_0104, even more preferably Ecaj_0919 or Ecaj_0073. In some embodiments, the subject is a human. In some embodiments, the pharmaceutical preparation is administered subcutaneously, intramuscularly, nasally, via inhalation or aerosol delivery, or intradermally.

Another aspect of the present invention relates to a method of treating an *Ehrlichia canis* infection in a mammalian subject comprising: (a) contacting a biological sample from the subject with an isolated polypeptide of Ecaj_0919, Ecaj_0073, Ecaj_0104, Ecaj_0663, or Ecaj_0881, more preferably Ecaj_0919, Ecaj_0073, Ecaj_0104, or Ecaj_0663, even more preferably Ecaj_0919, Ecaj_0073, Ecaj_0104, even more preferably Ecaj 0919 or Ecaj_0073, under conditions that allow peptide-antibody complexes to form; (b) detecting the peptide-antibody complexes; wherein the detection of the peptide-antibody complexes is an indication that the subject has an *Ehrlichia canis* infection; and (c) administering a therapeutic compound to treat *Ehrlichia* infection in the subject. In some embodiments, the step of detecting comprises performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay, a dipstick test, or a particulate-based assay. The subject may be a dog. In some embodiments, the therapeutic compound is an antibiotic (e.g., doxycycline).

As used herein, the term "polypeptide" encompasses amino acid chains comprising at least 50 amino acid residues, and more preferably at least 100 amino acid residues, wherein the amino acid residues are linked by covalent peptide bonds. As used herein, an "antigenic polypeptide" or an "immunoreactive polypeptide" is a polypeptide which, when introduced into a vertebrate, can stimulate the production of antibodies in the vertebrate, i.e., is antigenic, and wherein the antibody can selectively recognize and/or bind the antigenic polypeptide. An antigenic polypeptide may comprise or consist of an immunoreactive sequence derived from an immunoreactive *Ehrlichia* protein as described herein (e.g., as shown in Table 1, Table 2, Table 3, Ecaj_0919, Ecaj_0073, Ecaj_0104, and/or Ecaj 0663), and the polypeptide may comprise one or more additional sequences. In some embodiments, the additional sequences may be derived from a native *Ehrlichia* antigen and may be heterologous, and such sequences may (but need not) be immunogenic. In some embodiments, the antigenic polypeptide or immunoreactive polypeptide may be covalently bound to a solid substrate, e.g., in an immunoassay such as a lateral flow test, etc.

*Ehrlichia* immunoreactive polypeptides as described herein may be a recombinant polypeptide, synthetic polypeptide, purified polypeptide, immobilized polypeptide, detectably labeled polypeptide, encapsulated polypeptide, or a vector-expressed polypeptide. In various embodiments, the *Ehrlichia* immunoreactive polypeptides provided herein may be truncated or may comprise a deletion mutation, without eliminating the immunoreactivity of the resulting peptide or polypeptide. An immunoreactive peptide or polypeptide disclosed herein may also be comprised in a pharmaceutical composition such as, e.g., a vaccine composition that is formulated for administration to a human or canine subject.

As used herein the specification, "a" or "an" may mean one or more. As used herein in the claim(s), when used in conjunction with the word "comprising", the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

(FIG. 4A) Recombinant expression of 17 hypothetical proteins of *E. chaffeensis* by IVTT was detected by dot blot with anti-His tag antibody. CTL, the negative control. (FIG. 4B) Immunoreactivity screening of recombinant *E. chaffeensis* hypothetical proteins by ELISA with an HME patient serum (no. Sandra). The patient serum did not recognize the control protein.

(FIG. 6A) Immunoreactivity comparison of the denaturing recombinant hypothetical proteins and TRPs detected by ELISA with a panel of sera from 10 HME patients. (FIG. 6B) Immunoreactivity of overlapping synthetic peptides spanning 3 hypothetical proteins of *E. chaffeensis* as determined by ELISA with a HME patient serum (no. Sandra).

DESCRIPTION OF ILLUSTRATIVE EMBODIMENTS

Figure 1:
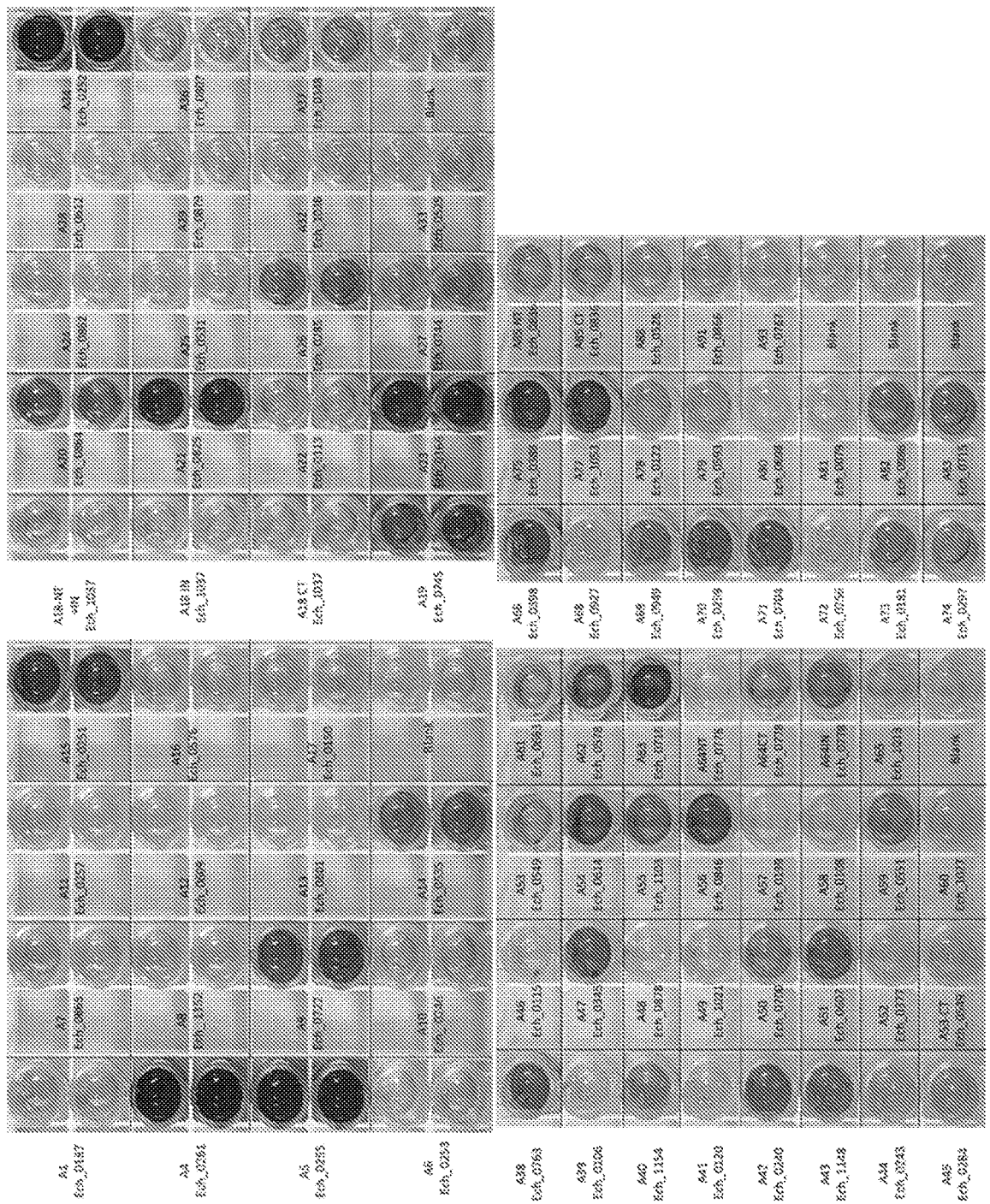
FIG. 1: *E. chaffeensis* hypothetical proteins screened by ELISA method.

In some embodiments, an immunoreactive polypeptide (e.g., in Table 1, Table 2, Table 3, Ecaj_0919, Ecaj_0073, Ecaj_0104, and/or Ecaj_0663) described herein may be used as diagnostic or prophylactic tools for detection of or immunization against *Ehrlichia* infection. In particular, immunoreactive polypeptides disclosed herein may be useful in solution-phase assays, or in assays in which the isolated immunoreactive polypeptide is immobilized on a surface of a support substrate. Alternatively, an immunoreactive polypeptide described herein may be comprised in a vaccine formulation to induce a protective immune response in a subject, or an immune response against *Ehrlichia chaffeensis* or *Ehrlichia canis*. One or more immunoreactive polypeptides may be immobilized on a surface by covalent attachment, encapsulation, or adsorption using methods generally known in the art, and may include the use of crosslinkers, capture molecules and such like, to which peptides may be coupled, conjugated, or cross-linked.

As shown in the below examples, high-throughput approaches were combined including bioinformatic analysis to predict antigenicity, in vitro transcription and translation to express proteins in native conformation, and ELISA to identify a group of *E. chaffeensis* immunoreactive proteins with unknown function. The entire *E. chaffeensis* proteome (n=1156) was analyzed by the predictor of protein antigenicity, ANTIGENpro, which identified 250 proteins with a high antigenicity score (≥0.695). Hypothetical proteins (n=93; 35 of 93≤22 kDa) present in this highly antigenic group were investigated in this study, and almost half (n=45) reacted at low to high levels with antibodies in an *E. chaffeensis*-infected patient or a dog serum; however, 15 proteins were consistently immunoreactive with a panel of patient sera, including six at a high level comparable to well-defined major immunoreactive TRPs. The majority ($^{10}/_{15}$) of these new immunoreactive proteins were small (≤22 kDa) or contained predicted transmembrane domains. Notably, the immunoreactivity of these proteins was predominately conformation-dependent as denaturation significantly affected antibody recognition. In addition, the *E. canis* orthologs (n=12) also reacted with *E. canis*-infected dog sera, including two proteins with immunoreactivity comparable to the "gold standard" TRP19. These proteins can be used, in various embodiments, to diagnose ehrlichiosis or to generate an immune response against *E. chaffeensis* or *E. Canis* in a mammalian subject, such as a human or a dog.

I. Immobilized Immunoreactive Polypeptides

In some embodiments, an immunoreactive polypeptide provided herein (e.g., in Table 1, Table 2, Table 3, Ecaj_0919, Ecaj_0073, Ecaj_0104, or Ecaj_0663) may be immobilized onto a surface of a support or a solid substrate; for example, the immunoreactive polypeptide may be immobilized directly or indirectly by coupling, cross-linking, adsorption, encapsulation, or by any appropriate method known in the art. By way of non-limiting example, binding of an immunoreactive polypeptide disclosed herein by adsorption to a well in a microtiter plate or to a membrane may be achieved by contacting the peptide, in a suitable buffer, with the well surface for a suitable amount of time. The contact time can vary with temperature, but is typically between about 1 hour and 1 day when using an amount of peptide ranging from about 50 ng to about 1 mg, and preferably about 250-700 ng or about 450-550 ng.

In some embodiments, an immunoreactive polypeptide disclosed herein is covalently attached to a support substrate by first reacting the support with a reagent that will chemically react with both the support and a functional group (i.e., crosslink), such as a hydroxyl or amino group, on the peptide. For example, an immunoreactive polypeptide may be crosslinked to a surface through an amine or carboxylic group on either end of the peptide, and a peptide may be crosslinked through a group on each end of the polypeptide (i.e., head-to-tail crosslinked). Such peptomers (i.e., head-to-tail crosslinked or otherwise immobilized peptides) may be used with both diagnostic and therapeutic methods of the present embodiments.

Numerous support substrates for polypeptide immobilization are known in the art which may be employed with an immunoreactive polypeptide disclosed herein, formed from materials such as, for example, latex, polystyrene, nylon, nitrocellulose, cellulose, silica, agarose, inorganic polymers, lipids, proteins, sugars, or magnetic resin. A person of ordinary skill in the art may select the support substrate that is appropriate for a given application. In particular embodiments of the present invention, a support substrate may be a reaction chamber, a microplate well, a membrane, a filter, a paper, an emulsion, a bead, a microbead, a microsphere, a nanocrystal, a nanosphere, a dipstick, a card, a glass slide, a microslide, a lateral flow apparatus, a microchip, a comb, a silica particle, a magnetic particle, a nanoparticle, or a self-assembling monolayer.

II. Detectably-Labeled Immunoreactive Polypeptides

An immunoreactive polypeptide (e.g., in Table 1, Table 2, Table 3, Ecaj_0919, Ecaj_0073, Ecaj_0104, or Ecaj_0663) may be conjugated to or attached to detectable label such as, for example, a radioactive isotope, a non-radioactive isotope, a particulate label, a fluorescent label, a chemiluminescent label, a paramagnetic label, an enzyme label or a colorimetric label. The detectably-labelled polypeptide may be used, e.g., in diagnostic or prophylactic methods and compositions. In certain embodiments, the polypeptide portion of the detectably labeled immunoreactive polypeptide may be immobilized on a surface of a support substrate. In other embodiments, the detectable label may be used to immobilize the detectably labeled immunoreactive peptide to the surface of a support substrate.

As used herein, "detectable label" is a compound and/or element that can be detected due to its specific functional properties, and/or chemical characteristics, the use of which allows the peptide to which it is attached be detected, and/or further quantified if desired.

In some embodiments, the detectable label is a photoluminescent probe, such as a fluorophore or a nanoparticle, such as for example a strontium aluminate nanoparticle (e.g., see Paterson et al., 2014). Exemplary labels include, but are not limited to, a particulate label such as colloidal gold, a radioactive isotope such as astatine$^{211}$, $^{14}$carbon, $^{51}$chromium, $^{36}$chlorine, $^{57}$cobalt, $^{58}$cobalt, copper$^{67}$, $^{152}$Eu, gallium$^{67}$, $^{3}$hydrogen, iodine$^{123}$, iodine$^{125}$, iodine$^{31}$, indium$^{111}$, $^{59}$iron, 32phosphorus, rhenium186, rhenium188, $^{75}$selenium, $^{35}$sulphur, technicium-99, technicium-99m or yttrium$^{90}$, a colorimetric label such as dinitrobenzene, dansyl chloride, dabsyl chloride, any of the azo, cyanin or triazine dyes, or chromophores disclosed in U.S. Pat. Nos. 5,470,932, 5,543,504, or 6,372,445, all of which are incorporated herein by reference; a paramagnetic label such as chromium (III), manganese (II), iron (III), iron (II), cobalt (II), nickel (II), copper (II), neodymium (III), samarium (III), ytterbium (III), gadolinium (III), vanadium (II), terbium (III), dysprosium (III), holmium (III) or erbium (III), a fluorescent label such as Alexa 350, Alexa 430, AMCA, BODIPY 630/650, BODIPY 650/665, BODIPY-FL, BODIPY-R6G, BODIPY-TMR, BODIPY-TRX, Cascade Blue, Cy3, Cy5,6-FAM, Fluorescein Isothiocyanate, HEX, 6-JOE, Oregon Green 488, Oregon Green 500, Oregon Green 514, Pacific Blue, REG, Rhodamine Green, Rhodamine Red, Renographin, ROX, TAMRA, TET, Tetramethylrhodamine, and/or Texas Red, or Lucifer Yellow, an enzyme label such as urease, luciferase, alkaline phosphatase, (horseradish) hydrogen peroxidase, or glucose oxidase, or a chemiluminescent label such as luminol, phthalazinedione, and others disclosed in any of U.S. Pat. Nos. 4,373,932, 4,220,450, 5,470,723, and U.S. Patent Application 2007/0264664, all of which are incorporated herein by reference.

III. Methods of Producing an Immunoreactive Polypeptide

An immunoreactive polypeptide of the present embodiments may be produced using in vitro transcription and translation (IVTT) methods, may be recombinantly produced using a variety of cell types (e.g., bacterial cells, mammalian cells, *E. coli*, yeast, and insect cells, etc.), or in some instances may be synthesized (e.g., using solid-phase synthesis). In some embodiments, IVTT and synthetic methods can provide certain advantages over recombinant approaches, since the resulting polypeptides can produced highly pure forms without contaminating bacterial or other proteins that might result in false positive reactions when utilizing recombinant proteins. Thus, IVTT and synthetic methods have an advantage of lacking many of the costly and laborious purification procedures often associated with recombinant methodologies.

A variety of IVTT approaches are known in the art and may be used in various embodiments. IVTT generally involves cell-free methods for production or synthesis of a protein from DNA. The cell-free system for protein production may use, e.g., *E. coli* extract, protozoan extracts, yeast extracts, human cell extract, wheat germ extract, mammalian extracts, extracts from cultured human cell lines, rabbit reticulocyte lysate, insect cell extract, or reconstituted and purified *E. coli* components. A variety of kits are commercially available including, e.g., RTS (FivePrime, San Francisco, CA), Expressway™ (Life Technologies); S30 T7 high yield (Promega), ONE-STEP HUMAN IVT (Thermo Scientific), WEPRO® (CellFree Sciences), TNT® coupled (Promega), RTS CECF (5 PRIME), TNT® Coupled (Promega), Retic lysate IVT™ (Life Technologies); TNT® T7 (Promega), EasyXpress Insect kit(Qiagen/RiN A), PURExpress® (New England Biolabs), and PURESYSTEM® (BioComber). Such methods can be used to incorporate unnatural amino acids into proteins, if desired. Cell-free expression systems that may be used in various embodiments are also described, e.g., in Zemella et al., 2015.

An isolated immunoreactive protein as disclosed herein may be produced in some embodiments using an appropriate method known in the organic chemistry arts. For example, peptides may be produced using one of the established solid-phase peptide synthesis techniques, such as those of Merrifield, Carpino, or Atherton [Atherton and Sheppard, 1989]. In some embodiments, peptides may be synthesized using equipment for automated peptide synthesis that is widely available from commercial suppliers such as Perkin Elmer (Foster City, CA), or the peptide may be chemically synthesized using solution-phase techniques such as those described in Carpino et al., 2003 or U.S. Patent Application 2009/0005535. In some embodiments, the peptides or shorter proteins may be synthesized, e.g., using solid-phase peptide synthesis (SPPS), t-Boc solid-phase peptide synthesis, or Fmoc solid-phase peptide synthesis.

In some embodiments, an immunoreactive protein as described herein can be recombinantly prepared from a nucleic acid encoding the peptide. Such a nucleic acid may be operably linked to an expression vector. By way of nonlimiting example, an immunoreactive protein may be expressed from a vector and isolated from the growth media of a host cell comprising the vector. In some embodiments, the immunoreactive protein may be produced in a cell-free system from a nucleic acid encoding the peptide.

An immobilized immunoreactive protein as disclosed herein may be conjugated, crosslinked, or adsorbed, either directly or indirectly onto a surface of a support substrate. In some embodiments, an immobilized immunoreactive protein or peptide may be synthesized onto a support substrate.

It is anticipated that virtually any method of protein or peptide immobilization known in the art which would not impact the structure or function of the disclosed peptides may be used to immobilize an immunoreactive protein or peptide as disclosed herein. For example, peptide immobilization may be accomplished using a crosslinking or conjugation agent such as methyl-p-hydroxybenzimidate, N-succinimidyl-3-(4-hydroxyphenyl)propionate, using sulfosuccinimidyl 4-(N-maleimidomethyl)cyclohexane-1-carboxylate (sSMCC), N-[maleimidocaproyloxy]sulfosuccinimide ester (sEMCS), N-maleimidobenzoyl-N-hydroxysuccinimide ester (MBS), glutaraldehyde, 1-ethyl-3-(3-dimethylaminopropyl) carbodiimide (EDCI), Bis-diazobenzidine (BDB), or N-acetyl homocysteine thiolactone (NAHT), and others disclosed in any of U.S. Pat. Nos. 5,853,744, 5,891,506, 6,210,708, 6,617,142, 6,875,750, 6,951,765, 7,163,677, and 7,282,194, each incorporated herein by reference. Immunoreactive proteins may be conjugated directly or indirectly to any of the commercially available support substrates having a surface coatings comprising crosslinkers, coupling agents, thiol or hydroxyl derivatizing agents, carboxyl- or amine-reactive groups such as of maleic anhydride (e.g., Pierce Immunotechnology Catalog and Handbook, at A12-A13, 1991).

In some embodiments, a protein of the invention may also be immobilized using metal chelate complexation, employing, for example, an organic chelating agent such a diethylenetriaminepentaacetic acid anhydride (DTPA); EDTA; N-chloro-p-toluenesulfonamide; and/or tetrachloro-3α-6 α-diphenylglycouril-3 attached to the antibody (U.S. Pat. Nos. 4,472,509 and 4,938,948, each incorporated herein by reference). Proteins and peptides can also be immobilized by coupling to other peptides or to condensation groups immobilized on a surface or present in an immobilization buffer such as glutaraldehyde or periodate. Conjugates with fluorescence markers may also prepared in the presence of such agents or by reaction with an isothiocyanate. A peptide may be attached to a surface by conjugation, crosslinking or binding to an affinity binding agent such as biotin, streptavidin, a polysaccharide such as an alginate, a lectin, and the like.

In general, regardless of the method of preparation or immobilization status, the immunoreactive proteins disclosed herein are preferably prepared in a substantially pure form. Preferably, the immunoreactive proteins are at least about 80% pure, more preferably at least about 90% pure and most preferably at least about 99% pure.

IV. Biological Functional Equivalents

Preferred immunoreactive polypeptides or analogs thereof specifically or preferentially bind an *Ehrlichia chaffeensis* or *Ehrlichia canis* specific antibody. Determining whether or to what degree a particular immunoreactive polypeptide, or an analog thereof, can bind an *E. chaffeensis* specific antibody can be assessed using an in vitro assay such as, for example, an enzyme-linked immunosorbent assay (ELISA), immunoblotting, immunoprecipitation, radioimmunoassay (RIA), immunostaining, latex agglutination, indirect hemagglutination assay (IHA), complement fixation, indirect immnunofluorescent assay (FA), nephelometry, flow cytometry assay, chemiluminescence assay, lateral flow immunoassay, u-capture assay, mass spectrometry assay, particle-based assay, inhibition assay and/or an avidity assay.

An immunoreactive polypeptide of the present embodiments may be modified to contain amino acid substitutions, insertions and/or deletions that do not alter their respective interactions with anti-*Ehrlichia* antibody binding regions. Such a biologically functional equivalent of an immunoreactive polypeptide derived from an *Ehrlichia* protein could be a molecule having like or otherwise desirable characteristics, i.e., binding of *Ehrlichia* specific antibodies. As a nonlimiting example, certain amino acids may be substituted for other amino acids in an immunoreactive polypeptide disclosed herein without appreciable loss of interactive capacity, as demonstrated by detectably unchanged antibody binding. It is thus contemplated that an immunoreactive polypeptide disclosed herein (or a nucleic acid encoding such a polypeptide) which is modified in sequence and/or structure, but which is unchanged in biological utility or activity, remains within the scope of the present embodiments. The immunoreactive polypeptide may have, e.g., at least 90%, 95%, or 99% sequence identity with a wild-type *E. chaffeensis* polypeptide, and in some embodiments the immunoreactive protein may have 1, 2, 3, 4, 5, or more amino acid substitutions, insertions and/or deletions as compared with the corresponding wild-type *E. chaffeensis* or *E. canis* polypeptide.

It is also well understood by the skilled artisan that, inherent in the definition of a biologically functional equivalent peptide, is the concept that there is a limit to the number of changes that may be made within a defined portion of the molecule while still maintaining an acceptable level of equivalent biological activity. Biologically functional equivalent polypeptides are thus defined herein as those peptides in which certain, not most or all, of the amino acids may be substituted. Of course, a plurality of distinct peptides with different substitutions may easily be made and used in accordance with the invention.

The skilled artisan is also aware that where certain residues are shown to be particularly important to the biological or structural properties of a peptide, e.g., residues in specific epitopes, such residues may not generally be exchanged. It is anticipated that a mutation in an immunoreactive peptide or polypeptide disclosed herein could result in a loss of species-specificity and in turn, reduce the utility of the resulting peptide for use in methods of the present embodiments. Thus, polypeptides which are antigenic (i.e., bind anti-*Ehrlichia* antibodies specifically) and comprise conservative amino acid substitutions are understood to be included in the present embodiments. Conservative substitutions are least likely to drastically alter the activity of a protein. A "conservative amino acid substitution" refers to replacement of amino acid with a chemically similar amino acid, i.e., replacing nonpolar amino acids with other nonpolar amino acids; substitution of polar amino acids with other polar amino acids, acidic residues with other acidic amino acids, etc.

Amino acid substitutions, such as those which might be employed in modifying an immunoreactive polypeptide disclosed herein are generally based on the relative similarity of the amino acid side-chain substituents, for example, their hydrophobicity, hydrophilicity, charge, size, and the like. An analysis of the size, shape and type of the amino acid side-chain substituents reveals that arginine, lysine and histidine are all positively charged residues; that alanine, glycine and serine are all a similar size; and that phenylalanine, tryptophan and tyrosine all have a generally similar shape. Therefore, based upon these considerations, arginine, lysine and histidine; alanine, glycine and serine; and phenylalanine, tryptophan and tyrosine; are defined herein as biologically functional equivalents.

The invention also contemplates isoforms of the *E. chaffeensis* immunoreactive polypeptides disclosed herein. An isoform contains the same number and kinds of amino acids as an *E. chaffeensis* polypeptide as disclosed herein, but the isoform has a different molecular structure. The isoforms contemplated by the present embodiments are those having the same properties as a polypeptide as described herein.

Nonstandard amino acids may be incorporated into proteins by chemical modification of existing amino acids or by de novo synthesis of a polypeptide disclosed herein. A nonstandard amino acid refers to an amino acid that differs in chemical structure from the twenty standard amino acids encoded by the genetic code, and a variety of nonstandard amino acids are well known in the art.

In select embodiments, the present invention contemplates a chemical derivative of an immunoreactive polypeptide disclosed herein. "Chemical derivative" refers to a peptide having one or more residues chemically derivatized by reaction of a functional side group, and retaining biological activity and utility. Such derivatized polypeptides include, for example, those in which free amino groups have been derivatized to form specific salts or derivatized by alkylation and/or acylation, p-toluene sulfonyl groups, carbobenzoxy groups, t-butylocycarbonyl groups, chloroacetyl groups, formyl or acetyl groups among others. Free carboxyl groups may be derivatized to form organic or inorganic salts, methyl and ethyl esters or other types of esters or hydrazides and preferably amides (primary or secondary). Chemical derivatives may include polypeptides that comprise one or more naturally occurring amino acids derivatives of the twenty standard amino acids. For example, 4-hydroxyproline may be substituted for serine; and ornithine may be substituted for lysine.

It should be noted that all amino-acid residue sequences are represented herein by formulae whose left and right orientation is in the conventional direction of amino-terminus to carboxy-terminus. Furthermore, it should be noted that a dash at the beginning or end of an amino acid residue sequence indicates a peptide bond to a further sequence of one or more amino-acid residues. The amino acids described herein are preferred to be in the "L" isomeric form. However, residues in the "D" isomeric form can be substituted for any L-amino acid residue, as long as the desired functional properties set forth herein are retained by the protein. In keeping with standard protein nomenclature, abbreviations for amino acid residues are known in the art.

In addition to the biological functional equivalents discussed above, it is contemplated that structurally similar compounds may be formulated to mimic the key portions of an immunoreactive peptide disclosed herein. Such compounds, which may be termed peptidomimetics, may be used in the same manner as immunoreactive peptides disclosed herein and, hence, also are functional equivalents. Methods for generating specific structures are disclosed, e.g., in Mizuno et al., 2017, as well as in U.S. Pat. Nos. 5,446,128; 5,710,245; 5,840,833; 5,859,184; 5,440,013; 5,618,914; and 5,670,155.

V. Methods of Detecting *Ehrlichia* Infection

Ehrlichiosis in humans generally refers to infections caused by obligate intracellular bacteria in the family Anaplasmataceae, chiefly in the genera *Ehrlichia* and *Anaplasma*. The majority of cases of human ehrlichiosis (HE) are caused by 3 distinct species: *Ehrlichia chaffeensis*, chief among them (Dumler et al., 2007). *Ehrlichia* infections in animals are also referred to as ehrlichiosis, along with a variety of diseases caused by a diverse group of pathogens from genuses *Ehrlichia, Anaplasma, Neorickettsia*, and *Cowdria* (Dumler et al., 2007). *Ehrlichia* infections are sustained mostly in monocytes or granulocytes, and studies have demonstrated that antibodies play an essential role in the immune response to *Ehrlichia* infection (Feng and Walker, 2004; Winslow et al., 2003; Winslow et al., 2000; Yager et al., 2005).

Accordingly, select embodiments of the present invention provide methods of detecting antibodies that specifically bind an *Ehrlichia* organism in a sample. Such a method may involve contacting an isolated ehrlichial immunoreactive polypeptide (e.g., of Table 1, 2, 3, Ecaj_0919, Ecaj_0073, Ecaj_0104, or Ecaj_0663) with the test sample, under conditions that allow peptide-antibody complexes to form, and detecting the peptide-antibody complexes. In these embodiments, the detection of the peptide-antibody complexes is an indication that antibodies specific for an *Ehrlichia* organism are present in the test sample, and the absence of the peptide-antibody complexes is an indication that antibodies specific an *Ehrlichia* organism are not present in the test sample.

In multiple embodiments, the detection of an immunoreactive polypeptide disclosed herein bound to an *Ehrlichia* specific antibody (i.e., a peptide-antibody complex) may be accomplished using an enzyme-linked immunoassay (e.g., a sandwich ELISA, or a competitive ELISA), a radioimmunoassay, an immunoprecipitation, a fluorescence immunoassay, a chemiluminescent assay, an immunoblot assay, a lateral flow assay, a flow cytometry assay, a mass spectrometry assay, latex agglutination, an indirect hemagglutination assay (IHA), complement fixation, an inhibition assay, an avidity assay, a dipstick test, or a particulate-based assay. In some preferred embodiments, peptide-antibody complexes described herein are detected using an enzyme-linked immunoassay, a lateral flow assay, or a particle-based assay.

As used herein, a "sample" is any sample that comprises or is suspected to comprise antibodies. Preferably, the sample is whole blood, sputum, serum, plasma, saliva, cerebrospinal fluid or urine. In some embodiments, the sample is a blood, serum or plasma sample obtained from a subject or patient.

Ehrlichiosis caused by an *Ehrlichia chaffeensis* infection in humans presents with flu-like symptoms of fever, chills, headache, and muscle aches. In more severe cases, nausea, loss of appetite, weight loss, abdominal pain, cough, diarrhea and change in mental status may also be observed. Ehrlichiosis in humans is potentially fatal.

In dogs, ehrlichiosis is most often caused by either *Ehrlichia chaffeensis* or *Ehrlichia canis* bacteria, and progresses in three phases: an acute phase, a subclinical phase, and a chronic phase. The acute phase normally extends weeks after infection and features symptoms similar to those of human ehrlichiosis, such as fever, lethargy, loss of appetite, shortness of breath, joint pain and stiffness, and may also include more severe symptoms such as anemia, depression, bruising, and enlarged lymph nodes, liver, and spleen. The subclinical phase can persist for years and most often presents no symptoms, although antibodies to *Ehrlichia* antigens may be detectable. The chronic phase of *Ehrlichia* infection generally features recurring symptoms of weight loss, anemia, neurological dysfunction, bleeding, ocular inflammation, leg edema, and fever, and presents a blood profile which often leads to a misdiagnosis of leukemia. An *Ehrlichia* infection that progresses to the chronic stage of disease is often fatal.

The nonspecific symptoms of an *Ehrlichia* infection and their resemblance to mild and severe influenza symptoms makes diagnosis of Ehrlichiosis difficult in humans and dogs. Diagnosis can be further hampered by current laboratory testing procedures for *Ehrlichia* infection which are not point-of-care tests, i.e., the tests are not available in most hospitals, clinics, and physician or veterinarian offices where a patient can receive treatment.

Accordingly, select embodiments of the present invention provide methods of identifying an *Ehrlichia* infection in a mammalian subject. Such a method may involve contacting a sample from the subject with an isolated immunoreactive polypeptide disclosed herein (e.g., from Table 1, Table 2, Table 3, Ecaj_0919, Ecaj_0073, Ecaj_0104, or Ecaj_0663) under conditions that allow peptide-antibody complexes to form, and detecting the peptide-antibody complexes. In these embodiments, the detection of the peptide-antibody complexes is an indication that the subject has an *Ehrlichia* infection. The *Ehrlichia* organism may be an *Ehrlichia chaffeensis* organism or an *Ehrlichia canis* organism. In some embodiments, the subject is a human or a dog. As with other methods disclosed herein, the detection step may be accomplished using any appropriate type of assay known in the art, and may be preferrably accomplished using a lateral flow assay or an ELISA.

The terms "subject" and "patient" are used interchangeably herein, and may refer to a mammal, especially a human or a dog. In certain embodiments, a "subject" or "patient" refers to a mammalian *Ehrlichia* host (i.e., animal infected with an *Ehrlichia* organism). An *Ehrlichia* host may be, for example, human or non-human primate, bovine, canine, caprine, cavine, corvine, epine, equine, feline, hircine, lapine, leporine, lupine, murine, ovine, porcine, racine, vulpine, and the like, including livestock, zoological specimens, exotics, as well as companion animals, pets, and any animal under the care of a veterinary practitioner. A subject may be or may not be infected with an *Ehrlichia* organism, and a subject may be a mammal suspected of being infected with an *Ehrlichia* organism.

Without wishing to be bound by theory, the ehrlichial immunoreactive polypeptides disclosed herein each comprise at least a part of a major *Ehrlichia* epitope that accounts for a species-specific immunogenicity in humans and animals. The term "epitope" is used herein to indicate that portion of an immunogenic substance that is specifically identified, recognized, and bound by, an antibody or cell-surface receptor of a host immune system that has mounted an immune response to the immunogenic substance as determined by any method known in the art. (see, for example, Geysen et al., 1984). Thus, an epitope that is "species-specific" is an epitope that can be used to differentiate one species of the *Ehrlichia* genus from another *Ehrlichia* species.

Particular embodiments relate to determining whether a subject has been immunized against *Ehrlichia* or is actively infected with an *Ehrlichia* organism. In these embodiments, the method comprises contacting a sample from the subject with at least one isolated immunoreactive polypeptide (e.g., of Table 1, Table 2, Table 3, Ecaj_0919, Ecaj_0073, Ecaj_0104, or Ecaj_0663) that is not a component of an *Ehrlichia* vaccine, and detecting whether an antibody in the sample specifically binds to the isolated ehrlichial immunoreactive polypeptide. According to the method, if an antibody in the sample specifically binds to the isolated ehrlichial immunoreactive polypeptide, then the subject has an active *Ehrlichia* infection, and if an antibody does not specifically bind to the isolated ehrlichial immunoreactive peptide, then the subject is either previously immunized with an *Ehrlichia* vaccine or is not infected with an *Ehrlichia* organism. An *Ehrlichia* organism may be an *E. chaffeensis* organism or an *E. canis* organism.

An ehrlichial immunoreactive polypeptide (e.g., of Tables 1, 2, 3, Ecaj_0919, Ecaj_0073, Ecaj_0104, or Ecaj_0663) may be used to bind an *Ehrlichia*-specific or *E. chaffeensis*-specific antibody using a variety of methods or kits. The specific binding between an antibody and an Ehrlichial polypeptide as disclosed herein may therefore be assessed by any appropriate method known in the art including, but not limited to, an enzyme-linked immunosorbent assay (ELISA), a sandwich ELISA, a competitive ELISA, immunoblotting, immunoprecipitation, radioimmunoassay (RIA), immunostaining, latex agglutination, indirect hemagglutination assay (IHA), complement fixation, indirect immnunofluorescent assay (FA), nephelometry, flow cytometry assay, chemiluminescence assay, lateral flow immunoassay, u-capture assay, mass spectrometry assay, particle-based assay, inhibition assay and avidity assay. Exemplary methods of detecting the binding of an *Ehrlichia*-specific antibody to an ehrlichial immunoreactive polypeptide as disclosed herein may include, for example, an ELISA performed in a microplate, a lateral flow test performed using a dipstick or lateral flow device, or a particulate-based suspension array assay performed using the Bio-Plex® system (Bio-Rad Laboratories, Hercules, CA, USA).

A. ELISA

In certain embodiments, the detection of a peptide-antibody complex described herein is accomplished using an enzyme linked immunosorbent assay (ELISA). This assay may be performed by first contacting an ehrlichial immunoreactive polypeptide (e.g., in Table 1, Table 2, Table 3, Ecaj_0919, Ecaj_0073, Ecaj_0104, or Ecaj_0663) that has been immobilized on a solid support, commonly the well of a microtiter plate, with the sample, such that antibodies specific for the peptide within the sample are allowed to bind to the immobilized peptide. Unbound sample is then removed from the immobilized peptide and a detection reagent capable of binding to the immobilized antibody-polypeptide complex is added. The amount of detection reagent that remains bound to the solid support is then determined using a method appropriate for the specific detection reagent.

In some embodiments, the detection reagent contains a binding agent (such as, for example, Protein A, Protein G, immunoglobulin, lectin or free antigen) conjugated or covalently attached to a reporter group or label. Exemplary reporter groups or labels include enzymes (such as horseradish peroxidase), substrates, cofactors, inhibitors, dyes, radionuclides, luminescent groups, fluorescent groups and biotin. The conjugation of binding agent to reporter group or label may be achieved using standard methods known to those of ordinary skill in the art. Common binding agents may also be purchased conjugated to a variety of reporter groups from many commercial sources (e.g., Zymed Laboratories, San Francisco, CA; and Pierce, Rockford, IL.).

In an aspect of the present invention, the presence or absence of *Ehrlichia* specific antibodies may be determined in the sample by comparing the level of a signal detected from a reporter group or label in the sample with the level of a signal that corresponds to a control sample or predetermined cut-off value. In certain embodiments, the cut-off value may be the average mean signal obtained when the immobilized ehrlichial immunoreactive peptide is incubated with samples from an uninfected subject. The cut-off value may be determined using a statistical method or computer program.

B. Lateral Flow Tests

Lateral flow tests may also be referred to as immunochromatographic strip (ICS) tests or simply strip-tests. In general, a lateral flow test is a form of assay in which the test sample flows laterally along a solid substrate via capillary action, or alternatively, under fluidic control. Such tests are often inexpensive, require a very small amount (e.g., one drop) of sample, and can typically be performed reproducibly with minimal training. The economical simplicity and robustness of many lateral flow assay formats makes these types of tests ideal for identifying an *Ehrlichia* (e.g., *E. chaffeensis*) infection at the point of care, which can be particularly important when the subject is, for example, a human or dog exhibiting detectable antibodies during the treatable acute phase of infection.

Exemplary lateral flow device formats include, but are not limited to, a dipstick, a card, a chip, a microslide, and a cassette, and it is widely demonstrated in the art that the choice of format is largely dependent upon the features of a particular assay. Accordingly, lateral flow devices are now ubiquitous in human and veterinarian medicine and quite varied, providing many options to the ordinarily skilled artisan for detecting a peptide-antibody complex in a sample using a lateral flow assay (See any of U.S. Pat. Nos. 7,344,893, 7,371,582, 6,136,610, and U.S. Patent Applications, 2005/0250141 and 2005/0047972, or Koczula et al. (2016) each incorporated herein by reference.) By way of a nonlimiting example, a sample from a subject suspected of having an *Ehrlichia* infection is applied to a lateral flow device comprising at least a sample zone and a binding zone. The sample may be a serum sample, and may be drawn laterally from the sample zone to the binding zone which comprises an ehrlichial immunoreactive polypeptide disclosed herein (e.g., of Table 1, Table 2, Table 3, Ecaj_0919, Ecaj_0073, Ecaj_0104, or Ecaj_0663) immobilized to a surface of the lateral flow device. In this example, the binding of the immobilized ehrlichial immunoreactive polypeptide on the lateral flow device is an indication that *Ehrlichia* specific antibodies are present in the sample from the subject, indicating an *Ehrlichia* infection in the subject, such as an *E. chaffeensis* or *E. canis* infection in the subject.

In related embodiments, an ELISA assay as described above may be performed in a rapid flow-through, lateral flow, or strip test format, wherein the antigen is immobilized on a membrane, such as a nitrocellulose membrane. In this flow-through test, *Ehrlichia* antibodies within the sample bind to the immobilized ehrlichial immunoreactive peptide as the sample passes through the membrane. A detection reagent, such as protein A labeled with gold, a fluorophore, or a chromophore, binds to the peptide-antibody complex as the solution containing the detection reagent flows through the membrane. Peptide-antibody complexes bound to detection reagent may then be detected, as appropriate for the detection reagent used (e.g., based on the presence or absence of a visibly detectable color or fluorescent label, a nanoparticle, a luminescent rare earth nanoparticle, a luminous nanoparticle, a strontium aluminate nanoparticle (e.g., see Paterson et al., 2014; and Wang et al., 2017, etc.).

In an aspect, a flow-through format ELISA may be performed in which one end of the membrane to which an ehrlichial immunoreactive peptide (e.g., from Table 1, 2, or 3) is immobilized may be immersed in a solution containing the sample, or the sample may be added to an area (i.e., a sample zone) at one end of the membrane. The sample migrates along the membrane through a region (i.e., a labeling zone) comprising the detection reagent, and flows to the area (i.e., a binding zone) comprising the immobilized ehrlichial immunoreactive peptide. An accumulation of detection reagent at the binding zone indicates the presence of *Ehrlichia* specific antibodies in the sample.

Typically, a flow-through ELISA may feature a detection reagent applied to a test strip in a pattern, such as a line, that can be read visually. As with other lateral flow tests, the absence of such a pattern typically indicates a negative result. It is within the ability of an ordinarily skilled artisan to select an amount of the ehrlichial immunoreactive polypeptide for immobilization on the membrane that can generate a visually discernible pattern when the biological sample contains a level of antibodies that would be sufficient to generate a positive signal in a standard format ELISA. Preferably, the amount of peptide immobilized on the membrane ranges from about 25 ng to about 1 mg.

C. Particulate-Based Assays

In general, particle-based assays use a capture-binding partner, such as an antibody or an antigen in the case of an immunoassay, coated on the surface of particles, such as microbeads, crystals, chips, or nanoparticles. Particle-based assays may be effectively multi-plexed or modified to assay numerous variables of interest by incorporating fluorescently labeled particles or particles of different sizes in a single assay, each coated or conjugated to one or more labeled capture-binding partners. The use of sensitive detection and amplification technologies with particle-based assay platforms known in the art has resulted in numerous flexible and sensitive assay systems to choose from in performing a method described herein. For example, a multiplex particle-based assay such as the suspension array Bio-Plex® assay system available from Bio-Rad Laboratories, Inc. (Hercules, CA) and Luminex, Inc. (Austin, TX) may be useful in identifying *Ehrlichia* antibodies in a sample.

In an aspect, the present invention contemplates the immobilization of an isolated ehrlichial immunoreactive polypeptide (e.g., in Table 1, Table 2, Table 3, Ecaj_0919, Ecaj_0073, Ecaj_0104, or Ecaj_0663) on a surface of a particle for use in a particle-based immunoassay. As described herein, methods of peptide immobilization onto support surfaces is well known in the art. In a preferred embodiment, a labeled her immunoreactive polypeptide disclosed herein is immobilized onto a surface of a particle and the peptide-particle complex is employed in an ELISA or in a flow cytometry assay according to established protocols.

VI. *Ehrlichia* Vaccine Compositions

Previous work has shown that Ehrlichial proteins that induce antibody responses can provide protective immune responses; thus, in some embodiments an ehrlichial protein provided herein (e.g., in Table 1, Table 2, Table 3, Ecaj_0919, Ecaj_0073, Ecaj 0104, or Ecaj_0663) may be included in a pharmaceutical composition such as a vaccine composition for administration to a mammalian or human subject. For example, protection against *E. chaffeensis* infection has been demonstrated with epitope-specific antibodies directed at OMP and TRPs in in vitro models and in animal models (Kuriakose et al., 2012; Li et al., 2002; Li et al., 2001), demonstrating that ehrlichial proteins that elicit strong antibody responses to linear epitopes are protective.

In select embodiments, it is contemplated that an ehrlichial immunoreactive polypeptide (e.g., of Table 1, Table 2, Table 3, Ecaj_0919, Ecaj_0073, Ecaj_0104, or Ecaj_0663) may be comprised in a vaccine composition and administered to a subject (e.g., a human or dog) to induce a protective immune response in the subject that may substantially prevent or ameliorate infection in the subject by an *Ehrlichia* organism such as *Ehrlichia chaffeensis* or *Ehrlichia canis*. A vaccine composition for pharmaceutical use in a subject may comprise an immunoreactive polypeptide of Table 1, 2, or 3 and a pharmaceutically acceptable carrier.

The phrases "pharmaceutical," "pharmaceutically acceptable," or "pharmacologically acceptable" refers to molecular entities and compositions that do not produce an adverse, allergic or other untoward reaction when administered to an animal, such as, for example, a human, as appropriate. As used herein, "pharmaceutically acceptable carrier" includes any and all solvents, dispersion media, coatings, surfactants, antioxidants, preservatives (e.g., antibacterial agents, antifungal agents), isotonic agents, absorption delaying agents, salts, preservatives, drugs, drug stabilizers, gels, binders, excipients, disintegration agents, lubricants, sweetening agents, flavoring agents, dyes, such like materials and combinations thereof, as would be known to one of ordinary skill in the art (see, for example, Remington's Pharmaceutical Sciences, 18th Ed. Mack Printing Company, 1289-1329, 1990, incorporated herein by reference). Except insofar as any conventional carrier is incompatible with the active ingredient, its use in the vaccine compositions of the present invention is contemplated.

As used herein, a "protective immune response" refers to a response by the immune system of a mammalian host to an *Ehrlichia* antigen which results in increased recognition of the antigen and antibody production by the immune system of the mammalian host upon subsequent exposure to an *Ehrlichia* pathogen. A protective immune response may substantially reduce or prevent symptoms as a result of a subsequent exposure to *Ehrlichia chaffeensis* or *Ehrlichia canis*.

In some embodiments, a vaccine composition of the present invention may comprise an immunoreactive polypeptide (e.g., having a sequence that has at least about 90%, 91%, 92%, 93%, 94%, 95%, 96%, 97%, 98%, 99%, or 100% sequence identity to a polypeptide listed of Table 1 or more preferably of Table 2 or Table 3). In some embodiments, a vaccine composition comprising the immunoreactive polypeptide may be used to induce a protective immune response against *Ehrlichia chaffeensis* or *Ehrlichia canis* (e.g., in a human or dog subject).

A person having ordinary skill in the medical arts will appreciate that the actual dosage amount of a vaccine composition administered to an animal or human patient can be determined by physical and physiological factors such as body weight, severity of condition, the type of disease being treated, previous or concurrent therapeutic interventions, idiopathy of the patient and on the route of administration. The practitioner responsible for administration will, in any event, determine the concentration of active ingredient(s) in a composition and appropriate dose(s) for the individual subject.

In certain embodiments, vaccine compositions may comprise, for example, at least about 0.1% of an ehrlichial immunoreactive polypeptide (e.g., of Table 1, Table 2, Table 3, Ecaj_0919, Ecaj_0073, Ecaj_0104, or Ecaj_0663). In other embodiments, the an active compound may comprise between about 2% to about 75% of the weight of the unit, or between about 25% to about 60%, for example, and any range derivable therein. As with many vaccine compositions, frequency of administration, as well as dosage, will vary among members of a population of animals or humans in ways that are predictable by one skilled in the art of immunology. By way of nonlimiting example, the pharmaceutical compositions and vaccines may be administered by injection (e.g., intracutaneous, intramuscular, intravenous or subcutaneous), intranasally (e.g., by aspiration) or orally. Between 1 and 3 doses may be administered for a 1-36 week period. Preferably, 3 doses are administered, at intervals of 3-4 months, and booster vaccinations may be given periodically thereafter.

In some embodiments, a "suitable dose" is an amount of an immunoreactive polypeptide that, when administered as described above, is capable of raising an immune response in an immunized patient sufficient to protect the subject from an *Ehrlichia* infection in subsequent exposures to *Ehrlichia* organisms. In general, the amount of peptide present in a suitable dose (or produced in situ by the nucleic acid in a dose) may range from about 1 µg to about 500 mg per kg of host, typically from about 10 µg to about 10 mg, preferably from about 100 µg to about 1 mg and more preferably from about 100 µg to about 100 microgram.

A vaccine composition of the present invention may comprise different types of carriers depending on whether it is to be administered in solid, liquid or aerosol form, and whether it needs to be sterile for such routes of administration as injection. A vaccine composition disclosed herein can be administered intramuscularly, intradermally, subcutaneously, intravenously, intraarterially, intraperitoneally, intralesionally, intracranially, intraarticularly, intraprostaticaly, intrapleurally, intratracheally, intranasally, intravitreally, intravaginally, intrarectally, topically, intratumorally, intramuscularly, intraperitoneally, subconjunctivally, intravesicularly, mucosally, intrapericardially, locally, orally, intranasally, or by inhalation, injection, infusion, continuous infusion, lavage, or localized perfusion. A vaccine composition may also be administered to a subject via a catheter, in cremes, in lipid compositions, by ballistic particulate delivery, or by other method or any combination of the forgoing as would be known to one of ordinary skill in the art (see, for example, Remington: The Science and Practice of Pharmacy, 21$^{st}$ Ed. Lippincott Williams and Wilkins, 2005, incorporated herein by reference).

While any suitable carrier known to those of ordinary skill in the art may be employed in the vaccine compositions of this invention, the type of carrier will vary depending on the mode of administration. For parenteral administration, such as subcutaneous injection, the carrier preferably comprises water, saline, alcohol, a fat, a wax or a buffer. For oral administration, any of the above carriers or a solid carrier, such as mannitol, lactose, starch, magnesium stearate, sodium saccharine, talcum, cellulose, glucose, sucrose, and magnesium carbonate, may be employed. Biodegradable microspheres (e.g., polylactic galactide) may also be employed as carriers for the pharmaceutical compositions of this invention. Suitable biodegradable microspheres are disclosed, for example, in U.S. Pat. Nos. 4,897,268 and 5,075, 109.

Of particular interest in an aspect of the present invention is a vaccine composition that may be administered by microstructured transdermal or ballistic particulate delivery. Microstructures as carriers for vaccine formulation are a desirable configuration for vaccine applications and are widely known in the art (e.g., U.S. Pat. Nos. 5,797,898, 5,770,219 and 5,783,208, and U.S. Patent Application 2005/0065463). Such a vaccine composition formulated for ballistic particulate delivery may comprise an isolated immunoreactive polypeptide of Table 1, 2, oe 3 immobilized on a surface of a support substrate. In these embodiments, a support substrate can include, but is not limited to, a microcapsule, a microparticle, a microsphere, a nanocapsule, a nanoparticle, a nanosphere, or a combination thereof.

Microstructures or ballistic particles that serve as a support substrate for an ehrlichial immunoreactive polypeptide disclosed herein may be comprised of biodegradable material and non-biodegradable material, and such support substrates may be comprised of synthetic polymers, silica, lipids, carbohydrates, proteins, lectins, ionic agents, crosslinkers, and other microstructure components available in the art. Protocols and reagents for the immobilization of a peptide of the invention to a support substrate composed of such materials are widely available commercially and in the art.

In other embodiments, a vaccine composition comprises an immobilized or encapsulated immunoreactive polypeptide (e.g., of Table 1, Table 2, Table 3, Ecaj_0919, Ecaj_0073, Ecaj_0104, or Ecaj_0663) and a support substrate. In these embodiments, a support substrate can include, but is not limited to, a lipid microsphere, a lipid nanoparticle, an ethosome, a liposome, a niosome, a phospholipid, a sphingosome, a surfactant, a transferosome, an emulsion, or a combination thereof. The formation and use of liposomes and other lipid nano- and microcarrier formulations is generally known to those of ordinary skill in the art, and the use of liposomes, microparticles, nanocapsules and the like have gained widespread use in delivery of therapeutics (e.g., U.S. Pat. No. 5,741,516, specifically incorporated herein in its entirety by reference). Numerous methods of liposome and liposome-like preparations as potential drug carriers, including encapsulation of peptides, have been reviewed (U.S. Pat. Nos. 5,567,434; 5,552,157; 5,565,213; 5,738,868 and 5,795,587, each of which is specifically incorporated in its entirety by reference).

In addition to the methods of delivery described herein, a number of alternative techniques are also contemplated for administering the disclosed vaccine compositions. By way of nonlimiting example, a vaccine composition may be administered by sonophoresis (i.e., ultrasound) which has been used and described in U.S. Pat. No. 5,656,016 for enhancing the rate and efficacy of drug permeation into and through the circulatory system; intraosseous injection (U.S. Pat. No. 5,779,708), or feedback-controlled delivery (U.S. Pat. No. 5,697,899), and each of the patents in this paragraph is specifically incorporated herein in its entirety by reference.

Any of a variety of adjuvants may be employed in the vaccines of this invention to nonspecifically enhance the immune response. Most adjuvants contain a substance designed to protect the antigen from rapid catabolism, such as aluminum hydroxide or mineral oil, and a nonspecific stimulator of immune responses, such as lipid A, Bortadella pertussis or *Mycobacterium tuberculosis*. Suitable adjuvants are commercially available as, for example, Freund's Incomplete Adjuvant and Freund's Complete Adjuvant (Difco Laboratories, Detroit, Mich.) and Merck Adjuvant 65 (Merck and Company, Inc., Rahway, N.J.). Other suitable adjuvants include alum, biodegradable microspheres, monophosphoryl lipid A and quil A.

A polypeptide may be formulated into a composition in a neutral or salt form. Pharmaceutically acceptable salts include the acid addition salts (formed with the free amino groups of the protein) and which are formed with inorganic acids such as, for example, hydrochloric or phosphoric acids, or such organic acids such as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

In any case, the composition may comprise various antioxidants to retard oxidation of one or more component. Additionally, the prevention of the action of microorganisms can be brought about by preservatives such as various antibacterial and antifungal agents, including but not limited to parabens (e.g., methylparabens, propylparabens), chlorobutanol, phenol, sorbic acid, thimerosal or combinations thereof.

Sterile injectable solutions are prepared by incorporating the active peptides in the required amount in the appropriate solvent with various of the other ingredients enumerated above, as required, followed by filtered sterilization. Generally, dispersions are prepared by incorporating the various sterilized active ingredients into a sterile vehicle that contains the basic dispersion medium and/or the other ingredients. In the case of sterile powders for the preparation of sterile injectable solutions, suspensions or emulsion, the preferred methods of preparation are vacuum-drying or freeze-drying techniques which yield a powder of the active ingredient plus any additional desired ingredient from a previously sterile-filtered liquid medium thereof. The liquid medium should be suitably buffered if necessary and the liquid diluent first rendered isotonic prior to injection with sufficient saline or glucose. The preparation of highly concentrated compositions for direct injection is also contemplated, where the use of DMSO as solvent is envisioned to result in extremely rapid penetration, delivering high concentrations of the active agents to a small area.

The composition must be stable under the conditions of manufacture and storage, and preserved against the contaminating action of microorganisms, such as bacteria and fungi. It will be appreciated that endotoxin contamination should be kept minimally at a safe level, for example, less that 0.5 ng/mg protein.

In particular embodiments, prolonged absorption of an injectable composition can be brought about by the use in the compositions of agents delaying absorption, such as, for example, aluminum monostearate, gelatin or combinations thereof.

Vii. *Ehrlichia* Detection and Vaccination Kits

Various embodiments of the present invention are concerned with kits for the detection of antibodies in a sample that specifically bind an *Ehrlichia* organism, such as *E. chaffeensis* or *E. canis*. The kits may thus be used for the diagnosis or identification of an *Ehrlichia* infection in a subject. In other embodiments, the invention provides kits for determining whether a subject has been immunized against *Ehrlichia* or is actively infected with an *Ehrlichia* organism. In still other embodiments, kits are provided for vaccination of a subject against *Ehrlichia chaffeensis* infection, and in some embodiments it is anticipated that the composition may be used to provide a protective immune response against an *Ehrlichia canis* infection.

In select embodiments, a kit of the present invention may be used to perform a method disclosed herein. For example, a kit may be suitable for detecting *Ehrlichia* antibodies in a sample, for identifying an *Ehrlichia* infection individual, for determining whether a subject has been immunized against *Ehrlichia* or is actively infected with an *Ehrlichia* organism, or for vaccinating a subject against an *Ehrlichia* organism. In these embodiments, one or more immunoreactive peptide (e.g., from Table 1, 2, or 3, or a polypeptide having at least about 95% or more sequence identity with a polypeptide of Table 1, 2, or 3; and/or Ecaj_0919, Ecaj_0073, Ecaj_0104, Ecaj_0663 or a polypeptide having at least about 95% or more sequence identity with Ecaj_0919, Ecaj_0073, Ecaj_0104, Ecaj_0663) may be comprised in the kit. The ehrlichial immunoreactive polypeptide in the kit may be detectably labeled or immobilized on a surface of a support substrate also comprised in the kit. The immunoreactive polypeptide(s) may, for example, be provided in the kit in a suitable form, such as sterile, lyophilized, or both.

The support substrate comprised in a kit of the invention may be selected based on the method to be performed. By way of nonlimiting example, a support substrate may be a multi-well plate or microplate, a membrane, a filter, a paper, an emulsion, a bead, a microbead, a microsphere, a nanobead, a nanosphere, a nanoparticle, an ethosome, a liposome, a niosome, a transferosome, a dipstick, a card, a celluloid strip, a glass slide, a microslide, a biosensor, a lateral flow apparatus, a microchip, a comb, a silica particle, a magnetic particle, or a self-assembling monolayer.

As appropriate to the method being performed, a kit may further comprise one or more apparatuses for delivery of a composition to a subject or for otherwise handling a composition of the invention. By way of nonlimiting example, a kit may include an apparatus that is a syringe, an eye dropper, a ballistic particle applicator (e.g., applicators disclosed in U.S. Pat. Nos. 5,797,898, 5,770,219 and 5,783,208, and U.S. Patent Application 2005/0065463), a scoopula, a microslide cover, a test strip holder or cover, and such like.

A detection reagent for labeling a component of the kit may optionally be comprised in a kit for performing a method of the present invention. In particular embodiments, the labeling or detection reagent is selected from a group comprising reagents used commonly in the art and including, without limitation, radioactive elements, enzymes, molecules which absorb light in the UV range, and fluorophores such as fluorescein, rhodamine, auramine, Texas Red, AMCA blue and Lucifer Yellow. In other embodiments, a kit is provided comprising one or more container means and a BST protein agent already labeled with a detection reagent selected from a group comprising a radioactive element, an enzyme, a molecule which absorbs light in the UV range, and a fluorophore.

In particular embodiments, the present invention provides a kit for detecting anti-*Ehrlichia* antibodies in a sample which may also be used for identification of an *Ehrlichia* infection in a subject, and/or for determining whether a subject has been immunized against *Ehrlichia* or is actively infected with an *Ehrlichia* organism. Such a kit may comprise one or more immunoreactive polypeptides (e.g., from Table 1, 2, or 3, or having at least about 95% or more sequence identity with a polypeptide of Table 1, 2, or 3; Ecaj_0919, Ecaj_0073, Ecaj_0104, or Ecaj_0663), and the peptides may be detectably labeled and immobilized to one or more support substrates comprised in the kit.

In some embodiments, a kit comprises an immunoreactive polypeptide of Table 1, 2, or 3 or having about 95% or more sequence identity with polypeptide of Table 1, 2, or 3. In some embodiments, a kit comprises an immunoreactive polypeptide comprising or consisting of Ecaj_0919, Ecaj_0073, Ecaj_0104, or Ecaj_0663. The peptides may be immobilized to one or more separate lateral flow assay devices, such as a nitrocellulose test strips. In these embodiments, each of the test strips may further comprises a detection reagent, for example, a chromophore-labeled protein A. Such a kit may further comprise one or more containers for sample material, one or more diluents for sample dilution, and one or more control indicator strips for comparison.

When reagents and/or components comprising a kit are provided in a lyophilized form (lyophilisate) or as a dry powder, the lyophilisate or powder can be reconstituted by the addition of a suitable solvent. In particular embodiments, the solvent may be a sterile, pharmaceutically acceptable buffer and/or other diluent. It is envisioned that such a solvent may also be provided as part of a kit.

When the components of a kit are provided in one and/or more liquid solutions, the liquid solution may be, by way of non-limiting example, a sterile, aqueous solution. The compositions may also be formulated into an administrative composition. In this case, the container means may itself be a syringe, pipette, topical applicator or the like, from which the formulation may be applied to an affected area of the body, injected into a subject, and/or applied to or mixed with the other components of the kit.

IV. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Identification and Validation of Immunoreactive Proteins

*Ehrlichia chaffeensis* (Arkansas strain) proteins were first evaluated for antigenicity using a bioinformatic approach using ANTIGENpro (scratch.proteomics.ics.uci.edu). All the proteins were ranked and separated based on their antigenicity score and function. The top 100 hypothetical proteins were cloned in pIVEX2.3d vector containing a His-tag and expressed by an in vitro transcription/translation assay. Expressed proteins were captured on using anti-His antibody coated ELISA plates. Pre-coated His tag antibody plates (GenScript #L00440C) were blocked for 20 mins at room temperature by using blocking buffer (Starting Block (PBS) Blocking Buffer (Thermo, cat #37538)+2% Milk). Blocked plates were incubated over night at 4° C. with his tag attached E. *Chaffeensis* hypothetical proteins diluted in dilution buffer (Dilution Buffer, Starting Block (PBS) Blocking Buffer (Thermo, cat #37538)+2% Milk+0.05% Tween 20). Plates were washed 4 times with washing buffer (Wash Buffer, PBS+0.05% Tween 20) and HME positive sera diluted 1:500 were added to each well (100 ul) followed by gentle agitation at room temperature for 2 hours. Plates were washed 4 times and alkaline phosphate labeled rabbit anti human IgG (H+L) secondary antibody were added to each well (100 ul, 1:10000 dilution) and incubated at room temperature for 1 hour with gentle agitation. Plates were washed 5 times and 100 ul of BluePhos Phosphatase Substrate (KPL, cat #50-88-05 and 50-88-06) was added to each well and incubated in dark for 30 minutes at room temperature with gentle agitation. The optical density were measured at $A_{650}$ in microplate reader (VERSAmax, Molecular Devices). Readings were analyzed in SoftMax Pro 6.5.1 software.

Figure 2:
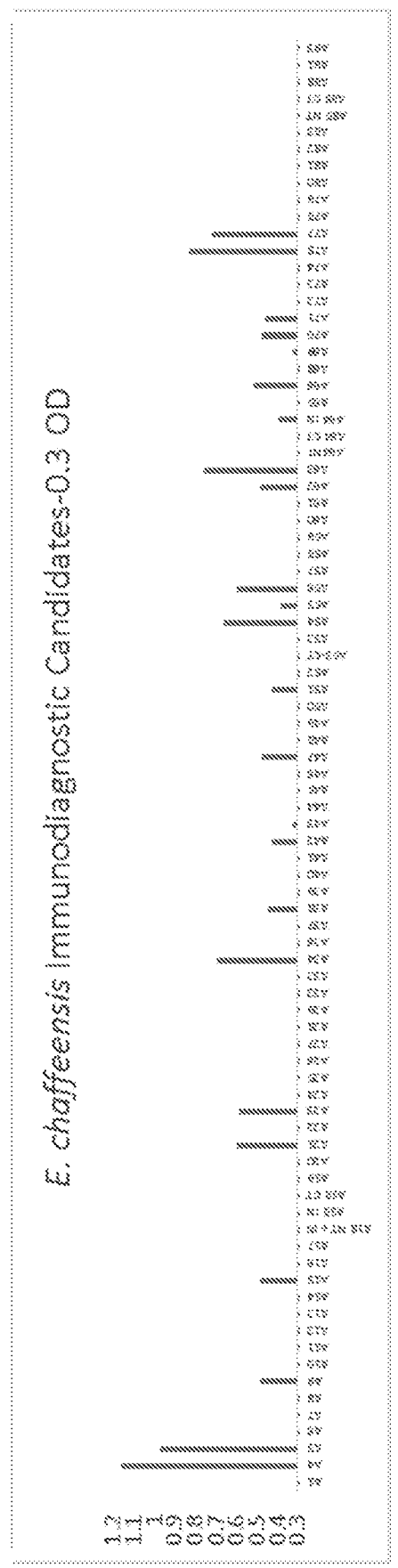
FIG. 2: *E. chaffeensis* Immunodiagnostic Candidates displaying at least 0.3 OD based on ELISA testing.
Figure 3:
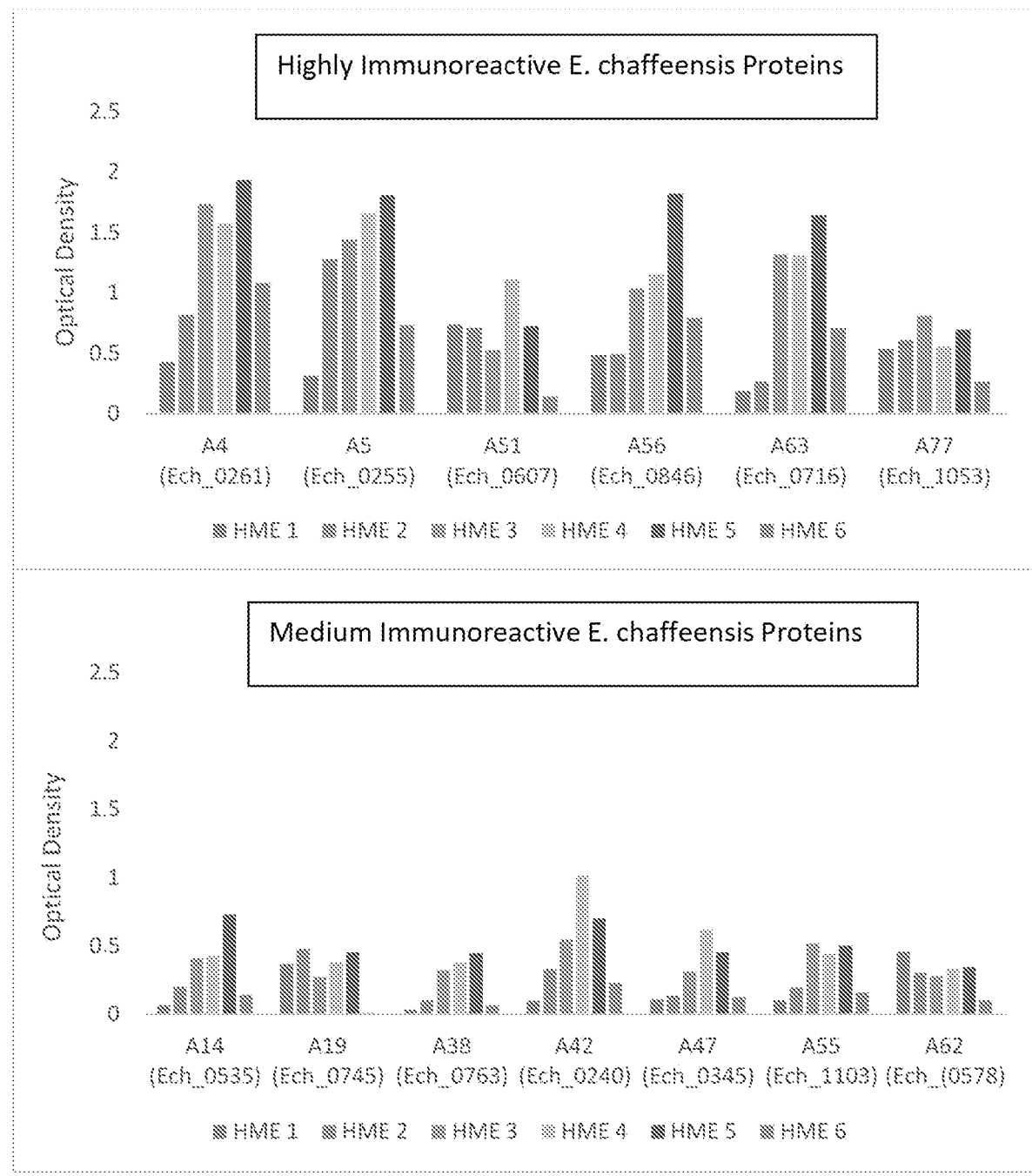
FIG. 3: *E. chaffeensis* hypothetical proteins testing using multiple HME positive sera (total 6 serum samples) per protein.

A total of 100 *E. chaffeensis* hypothetical proteins were screened by ELISA method. Protein which had optical density ≥0.3 by ELISA were subjected to further screening by multiple HME positive sera (total 6 serum samples) (FIG. 1). After screening, proteins which showed ELISA OD≥0.3 with multiple sera were further tested (FIG. 2). Proteins which showed 100% reactivity to all the sera and had an optical density of ≥0.5 with least 4 sera, were designated as highly immunoreactive (FIG. 3). Proteins that showed 100% reactivity to all the tested sera, but ELISA OD values between 0.2 to 0.5, were designated as medium immunoreactivity (FIG. 3). Proteins which did not react to at least 4 HME positive serum samples were excluded.

Example 2

Immunoreactive *Ehrlichia* Proteins that Contain Transmembrane Domains and Conformation-Dependent Antibody Epitopes Materials and Methods Antigenicity prediction of *E. chaffeensis* proteins: Antigenicity of all *E. chaffeensis* proteins were predicted by SCRATCH Protein Predictor ANTIGENpro, which is a sequence-based and alignment-free predictor of protein antigenicity. The predictions are made by a two-stage architecture based on multiple representations of the primary sequence and five machine learning algorithms. A final score (0~1) summarizes the resulting prediction of the antigenic probability, with higher score meaning higher antigenic probability.

PCR amplification of the *Ehrlichia* genes: *E. chaffeensis* (Arkansas strain) or *E. canis* (Jake strain) was propagated and purified as previously described. The fractions containing bacteria were frozen and utilized for DNA preparation. Oligonucleotide primers for the amplification of the *Ehrlichia* gene fragments were designed manually or by PrimerSelect (Lasergene v13.0, DNAStar, Madison, WI) according to the sequences in GenBank and synthesized (Integrated DNA Technologies, Coralville, Iowa). PCRs were performed with PCR HotMaster Mix (Eppendorf, Westbury, NY) using *E. chaffeensis* or *E. canis* genomic DNA as the template. The thermal cycling profile was: 95° C. for 3 min, 30 cycles of 94° C. for 30 s, annealing temperature (1° C. less than the lowest primer $T_m$) for 30 s, and 72° C. for the appropriate extension time (1 min/1000 base pairs) followed by a 72° C. extension for 10 min and a 4° C. hold.

Expression of the recombinant *E. chaffeensis* proteins by in vitro transcription and translation (IVTT): The expression of *E. chaffeensis* proteins were performed using the RTS 100 *E. coli* HY kit (5 PRIME, Germany) or S30 T7 high-yield protein expression system(Promega, Madison, WI), the *E. coli* extract-based cell-free protein synthesis system, which can produce high levels of recombinant proteins within 1 h. Briefly, *E. chaffeensis* DNA sequences were cloned in pIVEX-2.3d or pET-14b vector containing T7 promoter/terminator and a 6His-tag sequence, and the recombinant plasmid was mixed with a *E. coli* extract and a reaction premix that contain all necessary components for transcription and translation, such as T7 RNA polymerase and ribosomal machinery, followed by the incubation at 30° C. for 4 h (for 5 PRIME kit) or 37° C. for 1 h (for Promega kit). The protein expression was confirmed by dot blot using a horseradish peroxidase (HRP)-labeled 6His-tag antibody (Thermo Fisher). The IVTT products were used directly for immunoreactivity analysis or purified using MagneHis protein purification system (Promega).

Expression and purification of the recombinant *E. canis* orthologs: All *E. canis* proteins were cloned and expressed by pBAD/Thio-TOPO expression system (Invitrogen) and purified under native or denaturing conditions using TALON metal affinity resin (Clontech) as previously described.

Synthetic peptides: For *E. chaffeensis* proteins, overlapping peptides were commercially synthesized by Bio-Synthesis (Lewisville, TX) or Biomatik (Wilmington, DE). All peptides were supplied as a lyophilized powder and resuspended in molecular biology grade water (1 mg/ml).

Antisera: Convalescent anti-*E. chaffeensis* dog serum was obtained from an experimentally infected dog (no. 2251). HME patient sera were kind gifts from the Centers for Disease Control and Prevention (Atlanta, GA), Vanderbilt University (Nashville, TN), Washington State University (Pullman, WA) and St. Louis Children's Hospital (St. Louis, MO). Anti-*E. canis* dog sera were obtained from experimentally *E. canis*-infected dogs as described previously or naturally infected dog from Focus Technologies (Cypress, CA).

Gel electrophoresis and Western immunoblotting: Purified recombinant proteins were separated by sodium dodecyl sulfate-polyacrylamide gel electrophoresis (SDS-PAGE) and transferred to nitrocellulose, and Western immunoblotting was performed as previously described, except that primary dog sera were diluted 1:100, human sera were diluted 1:200, and rabbit antisera were diluted 1:1,000.

Enzyme-linked immunosorbent assay (ELISA): The ELISA was performed to determine the immunoreactivity of *Ehrlichia* recombinant proteins and synthetic peptides. For IVTT products, the His tag antibody plate (GenScript, Piscataway, NJ) was used for specific binding of recombinant proteins. Briefly, ELISA plates were blocked with 100 µl StartingBlock blocking buffer (Thermo Fisher) with 2% nonfat milk for 20 min and washed twice with 200 µl phosphate-buffered saline containing 0.05% (v/v) Tween 20 (PBST, pH 7.2). The plates were coated with 50 µl IVTT-expressed *Ehrlichia* proteins diluted (1:50) in the dilution buffer (StartingBlock blocking buffer with 2% milk and 0.05% Tween) each well and incubated overnight at 4° C. The wells were washed five times with PBST. Human sera diluted (1:200) in the dilution buffer were added to each well (50 µl) and incubated for 1 h. ELISA plates were washed five times, and 50 µl alkaline phosphatase-labeled rabbit anti human IgG (H+L) secondary antibody (Abcam, Cambridge, MA) diluted (1:5,000) in the dilution buffer was added and incubated for 1 h. After final washes (5×), BluePhos phosphatase substrate (100 µl; Kirkegaard & Perry Laboratories, Gaithersburg, MD) was added and plates were incubated in the dark for 30 min and color development was determined on a VersaMax microplate reader (Molecular Devices, Sunnyvale, CA) at $A_{650}$ and data analyzed by SoftmaxPro v7.0 (Molecular Devices). All incubations were performed at room temperature with gentle agitation if not specified. For synthetic peptides, the Nunc MaxiSorp plate (Thermo Fisher) was used and ELISA was performed as previously described. Optical density (OD) readings represent the mean OD for three wells (±standard deviations) after subtracting the reading of negative control. Since negative controls generally had raw readings of <0.08 OD, a positive sample threshold was set at ≥0.1 OD after subtracting the reading of negative control, with 0.1-0.5 OD considered as a positive and >0.5 OD as a strong positive.

Indirect fluorescent-antibody assay (IFA): The status of anti-*E. chaffeensis* antibody in HME patient sera and anti-*E. canis* antibody in CME dog sera was determined as described previously. Antigen slides were prepared from THP-1 cells infected with *E. chaffeensis* (Arkansas) or DH82 cells infected with *E. canis* (Jake). Sera were diluted two-fold in PBS, starting at 1:100.

Statistics: Statistical difference between experimental groups were assessed with the two-tailed Student's t-test, and significance was indicated by a P value of <0.05.

Locus tag numbers of *Ehrlichia* genes: Gene locus tag numbers for the *E. chaffeensis* or *E. canis* proteins in this study were previously available in the Integrated Microbial Genomes.

Results

Antigenicity prediction of *E. chaffeensis* proteome by ANTIGENpro: Antigenicity of all 1156 proteins of *E. chaffeensis* (Arkansas strain) were predicted by SCRATCH protein predictor ANTIGENpro. The results showed that the final score of antigenic possibility of all *E. chaffeensis* proteins ranged from 0.01 to 0.969, and top 250 proteins had a score above 0.695. Some known major immunoreactive proteins in the list of top 250 proteins included TRP47 (Ech_0166; rank no. 30; score=0.908), TRP120 (Ech_0039; no. 100; score=0.838) and p28 (Ech_1144; no. 158; score=0.776), indicating the effectiveness and validity of antigenicity prediction by ANTIGENpro. Among these 250 *E. chaffeensis* proteins, 93 proteins including TRP47 were annotated as hypothetical without any putative function by IMG database. This study focused on these 93 hypothetical proteins, which were named as proteins A1-A93 according to the antigenicity score (from high to low), with TRP47 as protein A23 (Table 6).

Figure 4:
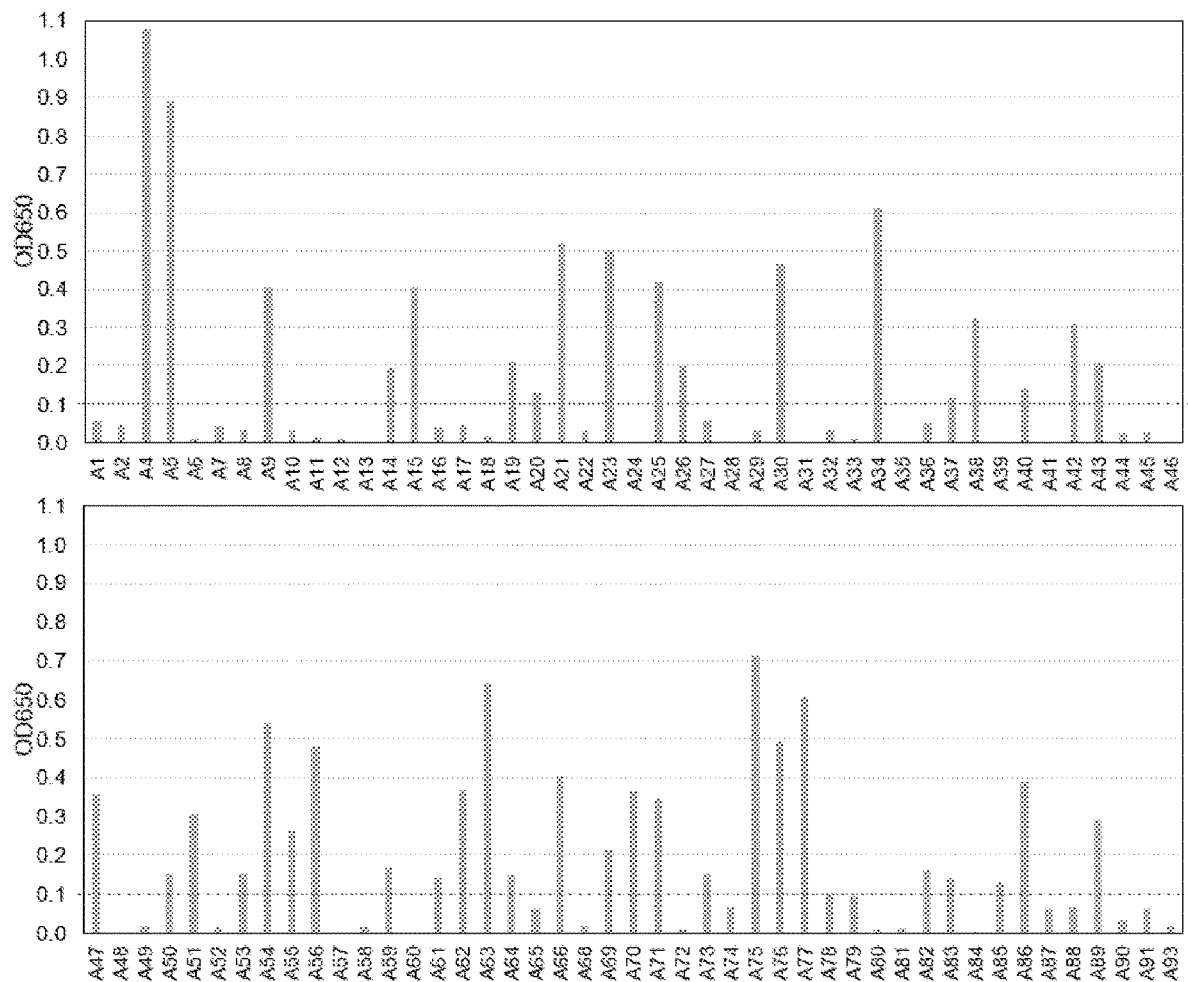
FIGS. 4A-B: Expression and immunoreactivity screening of *E. chaffeensis* hypothetical proteins.

Immunoreactivity screening of *E. chaffeensis* hypothetical proteins: To screen the immunoreactive proteins, we used the in vitro transcription and translation (IVTT) system to express 93 hypothetical proteins (A1-A93) of *E. chaffeensis* that were in the top 250 antigenic proteins according to ANTIGENpro prediction. In total, the gene of 90 proteins were cloned into the vector for IVTT successfully and expressed respectively. To confirm the expression, 17 proteins were randomly selected and detected by dot blot using anti-His tag antibody. The expression of all proteins was detectable, despite differential expression levels with the protein A83 the lowest (FIG. 4A). The negative control protein expressed by IVTT was not detectable. The other three proteins (A3, A67 and A92) were not expressed due to unsuccessful cloning. The immunoreactivity of all 90 expressed proteins was examined by ELISA with the serum from an HME patient (#Sandra), which had the detectable *E. chaffeensis* antibody by IFA (titer 1:1600) and has been effectively used in our previous publication. In total, 45 (50%) proteins reacted with the patient serum (OD>0.1), and nine (10%) proteins reacted strongly with the patient serum (OD>0.5), including A4, A5, A21, A23, A34, A54, A63, A75 and A77 (FIG. 4B). Thus, these 45 proteins were considered to be candidates of new immunoreactive proteins of *E. chaffeensis* and were investigated further. The anti-*E. chaffeensis* patient or dog serum did not recognize the negative control protein expressed by IVTT (raw OD<0.08).

Figure 5:
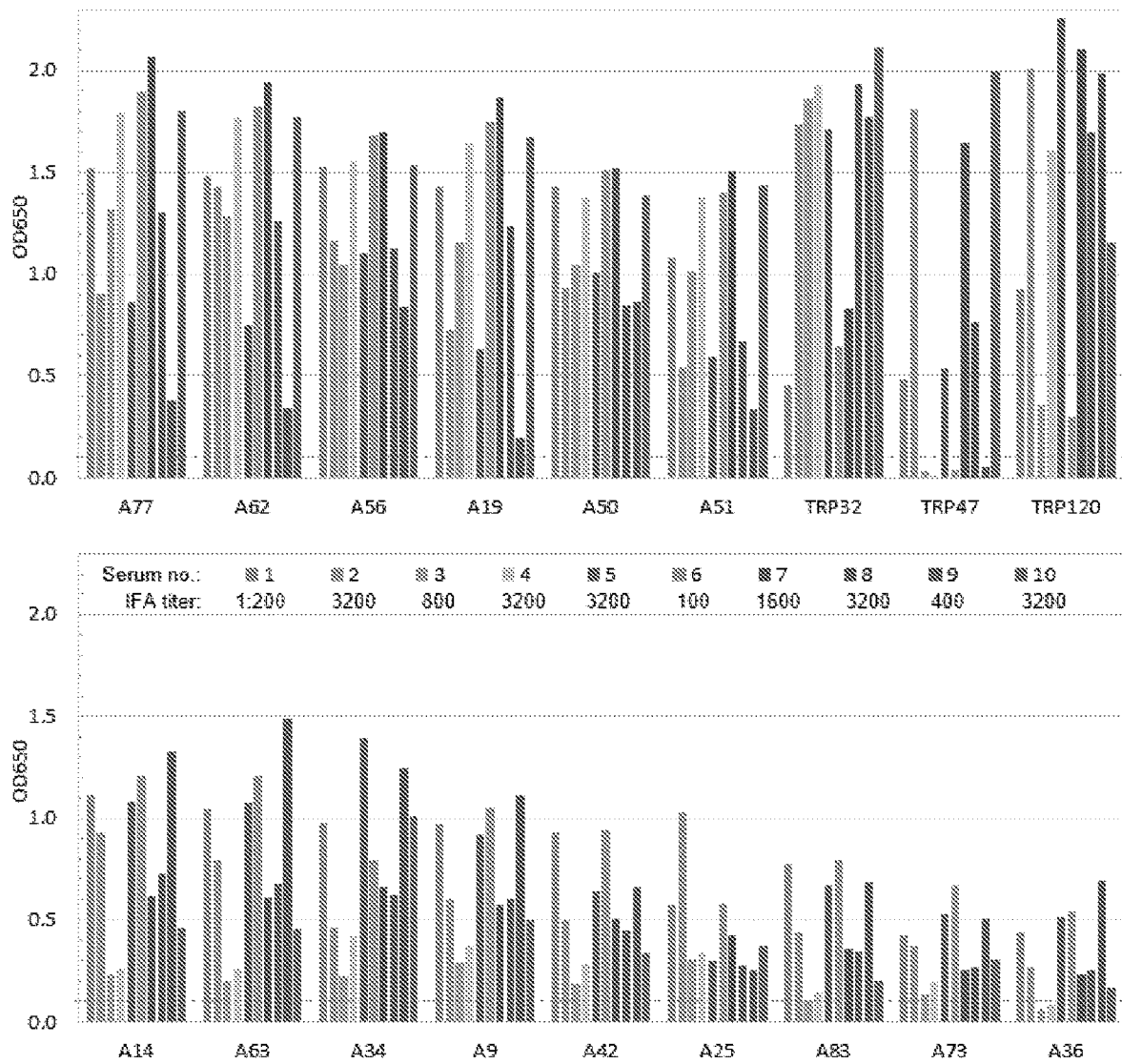
FIG. 5: Immunoreactivity of 15 hypothetical proteins of *E. chaffeensis* and comparison with 3 TRPs by ELISA. The IVTT products reacted with a panel of sera from 10 HME patients. A normal human serum did not recognize these proteins.

Determination of the immunoreactivity of 45 *E. chaffeensis* hypothetical proteins: In order to determine and compare the immunoreactivity of these 45 new immunoreactive proteins of *E. chaffeensis*, ELISA was performed with a panel of 10 HME patient sera that had detectable *E. chaffeensis* antibodies by IFA (titers from 1:100 to 3200). We found that 14 (31%) of 45 proteins were recognized by all 10 patient sera and 15 (33%) proteins were recognized by at least eight sera, while all these 15 proteins reacted strongly with at least three patient sera (OD>0.5) and 11 (24%) proteins reacted strongly with at least six sera, demonstrating that these 15 proteins were new immunoreactive proteins of *E. chaffeensis* (FIG. 5). All patient sera did not recognize the negative control expressed from IVTT (raw OD<0.08). To compare the immunoreactivity of new *E. chaffeensis* immunoreactive proteins with well-defined major immunoreactive TRPs, we also cloned and expressed TRP32, TRP47 and TRP120 by IVTT, and 10 HME patient sera were used to detect the immunoreactivity of TRPs. The results showed that consistent with our previous publications, all three TRPs reacted strongly with most patient sera and particularly TRP32 and TRP120 reacted strongly with nine and eight patient sera, respectively (FIG. 5). Some proteins, such as A56, A62, A77, A50, A19 and A51, reacted strongly with antibodies in most patient sera at a level comparable to TRPs, thus, were considered as major immunoreactive proteins of *E. chaffeensis*. Table 4 shows a list of 15 new immunoreactive proteins of *E. chaffeensis* and their characteristics, with the immunoreactivity rank predicted by the reactions with patient sera. In addition, we found that among these 15 proteins, 10 (67%) were small-sized (≤22 kD), and 10 (67%) were predicted as membrane proteins by TMHMM 2.0 server, suggesting that these novel immunoreactive proteins of *Ehrlichia* are predominately small membrane proteins.

Figure 6A:
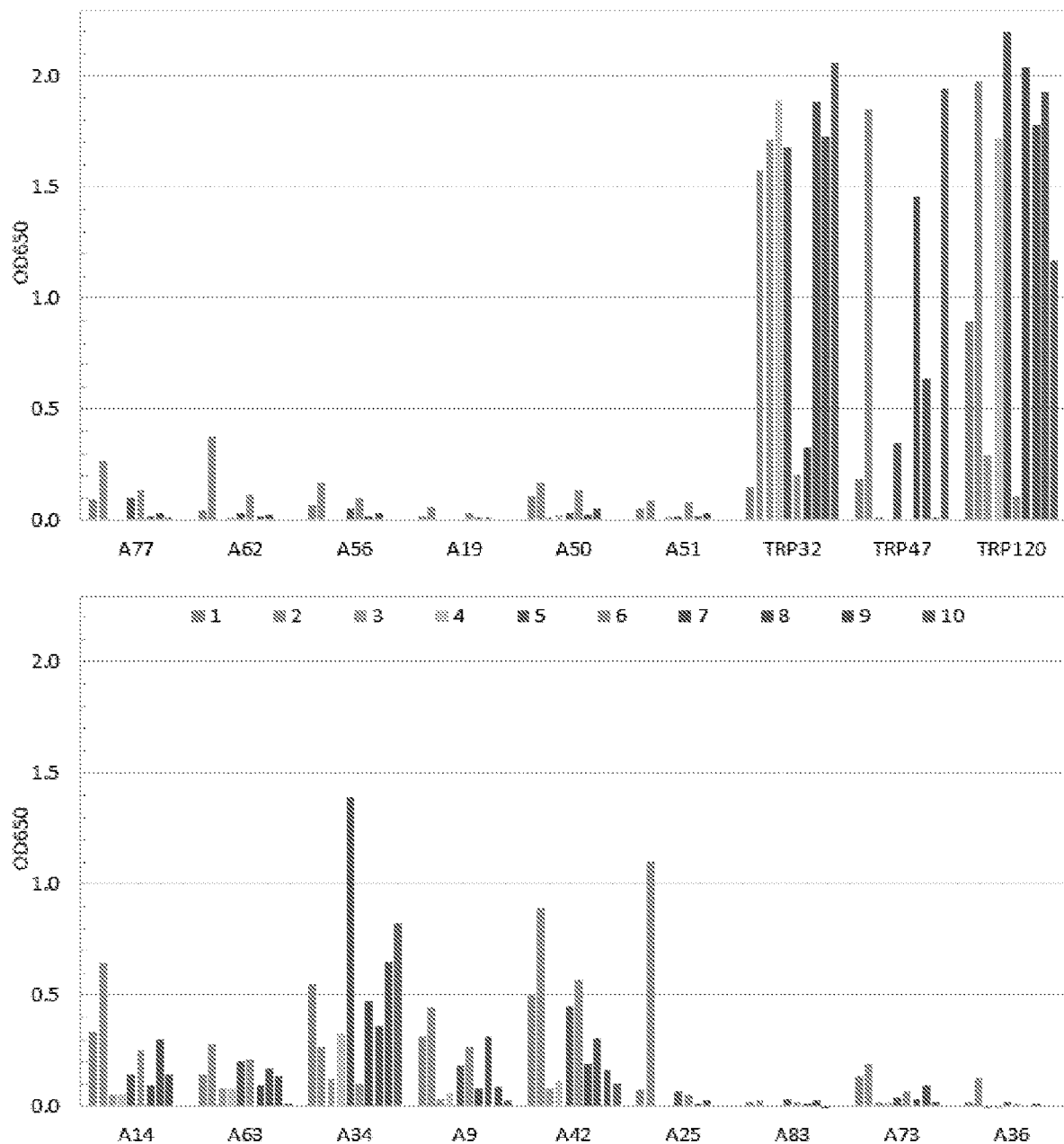
FIGS. 6A-B: Conformational immunoreactivity of recombinant *E. chaffeensis* hypothetical proteins.

Determination of the conformational immunoreactivity of new *E. chaffeensis* immunoreactive proteins: In order to determine the conformation dependence of the immunoreactivity of new *E. chaffeensis* immunoreactive proteins, we compared the immunoreactivity of native proteins (IVTT products) with that of denatured proteins (IVTT products treated by urea) by ELISA with sera from 10 HME patients. After denaturing, three new immunoreactive proteins, including A19, A51 and A83, did not react with any patient serum; six proteins, including A56, A6, A77, A50, A73 and A36, only reacted weakly with 1-3 patient sera; five proteins, including A14, A63, A34, A9 and A42, still reacted with most patient sera but at a substantially lower level compared to native IVTT proteins; protein A25 still reacted strongly with patient sera #2, but did not react with any other serum. However, the immunoreactivity of three well-defined major immunoreactive TRPs, including TRP32, TRP47 and TRP120, were not reduced substantially after denaturing, consistent with our previous conclusion that TRPs contain major continuous epitopes (FIG. 6A). Thus, our result indicated that the immunoreactivity of majority of these new *E. chaffeensis* immunoreactive proteins were conformation-dependent and most epitopes in these proteins were discontinuous.

Figure 6B:
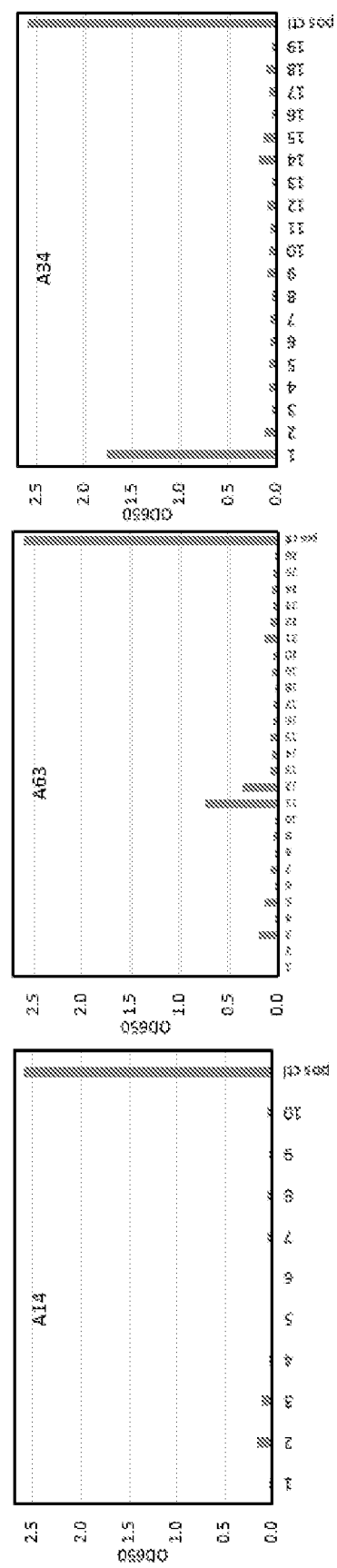

Synthetic peptides were also used to confirm if new *E. chaffeensis* immunoreactive proteins contain the linear epitope. Overlapping polypeptides were synthesized to cover the sequence of all 15 new *E. chaffeensis* immunoreactive proteins except for A83 and A36. All peptides were 20-25 amino-acid long (except the last peptide covering the C-terminus of each protein) and 6 amino-acids overlapped with each other. A patient serum (#Sandra) was used to react with all peptides by ELISA. One peptide (A14-2) for A14 protein reacted weakly with the patient serum, whereas four peptides (A63-3, 5, 12 and 21) for A63 protein reacted weakly and one peptide (A63-11) reacted strongly with the patient serum. Two peptides (A34-14 and 15) for A34 protein reacted weakly and one peptide (A34-1) reacted strongly with the patient serum. All synthetic peptides for other proteins did not react with the patient serum, suggesting that most of these new *E. chaffeensis* immunoreactive proteins contain no linear epitope, consistent with our ELISA data with native and denatured IVTT products (FIG. 6B).

Figure 7:
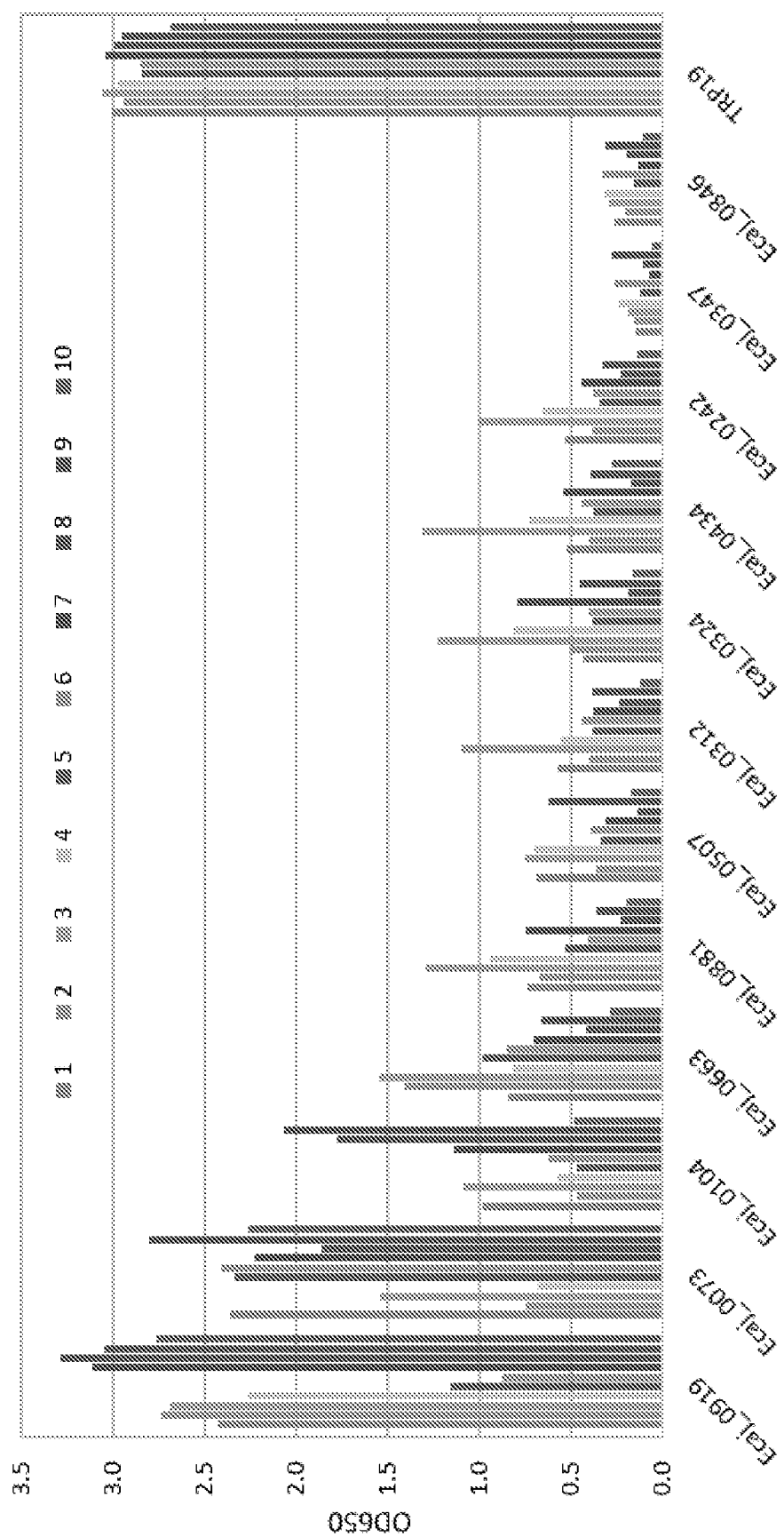
FIG. 7: Immunoreactivity of *E. canis* orthologs of *E. chaffeensis* hypothetical immunoreactive proteins by ELISA. The recombinant proteins reacted with sera from 10 *E. canis*-infected dogs. A normal dog serum did not recognize these proteins. TRP19 was included for comparison of the immunoreactivity.

Immunoreactivity of *E. canis* orthologs of *E. chaffeensis* hypothetical immunoreactive proteins: Since we have found several pairs of *E. chaffeensis/E. canis* orthologs, such as TRP19/TRP32, TRP36/TRP47, TRP75/TRP95 and TRP120/TRP140, are both major immunoreactive proteins of *Ehrlichia*, *E. canis* orthologs of *E. chaffeensis* A1-A93 proteins were analyzed. Totally 25 *E. canis* orthologs of *E. chaffeensis* A-proteins with immunoreactivity as identified in FIG. 1 were found. These *E. canis* orthologs were expressed and purified from *E. coli*, and a Western blot screening showed that 12 select *E. canis* orthologs reacted with an anti-*E. canis* dog serum (no. 2995) (data not shown). The immunoreactivity of 12 *E. canis* orthologs was further determined and compared with TRP19, a well-documented major immunoreactive protein of *E. canis*, by ELISA with a panel of sera from 10 dogs with CME (FIG. 7). We found that Ecaj_0919 and Ecaj_0073 proteins reacted strongly with all 10 dog sera like TRP19, therefore, these 2 proteins were considered as major immunoreactive proteins of *E. canis*. Ecaj_0104, Ecaj_0663 and Ecaj_0881 proteins reacted strongly with most of 10 dog sera, and other 7 proteins also reacted with most dog sera, so all 12 *E. canis* orthologs of *E. chaffeensis* proteins are immunoreactive (FIG. 7). But conserved ortholog pairs of *E. chaffeensis* and *E. canis* do not necessarily have equivalent immunoreactivity (Table 4 and Table 5). Table 5 shows a list of 12 *E. canis* orthologs of *E. chaffeensis* immunoreactive hypothetical proteins, ranked by immunoreactivity detected by ELISA with CME dog sera. Totally 6 of 12 (50%) proteins are small-sized (≤22 kD).

In these experiments, *E. chaffeensis* proteins were identified that exhibited the immunoreactivity with sera from HME patients or CME dogs, including 15 *E. chaffeensis* proteins and 12 *E. canis* orthologs. Notably, many new major immunoreactive proteins of *Ehrlichia* were found to contain transmembrane domains. Previously, major continuous antibody epitopes of TRPs have been mapped to the central TR region in all TRPs, indicating ehrlichial TR domains are targets of the host humoral immune response. The association of these transmembrane domains with the host immune response is interesting and unique and to the inventors knowledge, has not been described with respect to any other pathogen; however, the specific role of these domains in ehrlichial pathobiology or immunity is still unknown.

Interestingly, most of new major immunoreactive proteins of *E. chaffeensis* were found to be small proteins containing conformational epitope. Only a few conformational epitopes have been mapped in TRPs and the host response to the continuous major epitopes in ehrlichial immunodominant proteins is strong, suggesting the absence of dominant conformational epitopes. Without wishing to be bound by any theory, this might be due to the previous methods used for protein identification, such as SDS-PAGE and Western blot, during which small proteins easily run out of regular gel and proteins usually lose conformation after denaturing. Thus, there may be other conformational epitopes associated with previously identified major immunoreactive proteins that were not determined. Similarly, additional identification of *E. canis* ortholog proteins expressed by IVTT could provide more conformational epitopes.

Additionally, the inventors observed that conserved ortholog pairs of *E. chaffeensis* and *E. canis* do not necessarily have equivalent immunoreactivity, suggesting that homologous proteins may play different roles in *Ehrlichia*. Some new ortholog pairs of *E. chaffeensis* and *E. canis* are both major immunoreactive proteins, such as Ech_0846 (A56) and Ecaj_0242, Ech 1053 (A77) and Ecaj_0846. In contrast, Ecaj_0919 and Ecaj_0073 proteins reacted strongly with all 10 dog sera like TRP19, but their orthologs Ech_1147 (A2) and Ech 0122 (A78) are not identified as major immunoreactive proteins. Similarly, Ech_0535 (A14) and Ech_0181 (A73) proteins reacted with all 10 patient sera, but their orthologs Ecaj_0500 and Ecaj_0122 are not identified as major immunoreactive proteins (Table 5 and Table 6). Moreover, some new major immunoreactive proteins of Ech_0700 (A50) and Ech 0578 (A62) proteins of *E. chaffeensis* do not have orthologs in *E. canis*.

TABLE 4

A list of 15 E. chaffeensis hypothetical proteins ranked by immunoreactivity detected by ELISA with HME patient sera.

| Rank | Protein | Ech_tag no. | Antigenicity Score | MW (KD) | Predicted membrane protein | E.canis ortholog (tag no.) |
|---|---|---|---|---|---|---|
| 1 | A77 | 1053 | 0.762 | 22 | + | 0846 |
| 2 | A62 | 0578 | 0.797 | 21 | − | — |
| 3 | A56 | 0846 | 0.828 | 19 | + | 0242 |
| 4 | A19 | 0745 | 0.919 | 13 | − | 0324 |
| 5 | A50 | 0700 | 0.845 | 21 | − | — |
| 6 | A51 | 0607 | 0.811 | 38 | − | 0434 |
| 7 | A14 | 0535 | 0.927 | 21 | − | 0500 |
| 8 | A63 | 0716 | 0.790 | 41 | + | 0347 |
| 9 | A34 | 0252 | 0.874 | 40 | + | — |
| 10 | A9 | 0722 | 0.944 | 21 | + | — |
| 11 | A42 | 0240 | 0.856 | 18 | + | — |
| 12 | A25 | 0531 | 0.904 | 20 | + | — |
| 13 | A83 | 0715 | 0.747 | 61 | + | 0348 |
| 14 | A73 | 0181 | 0.769 | 12 | + | 0122 |
| 15 | A36 | 0807 | 0.864 | 34 | + | 0271 |

TABLE 5

A list of 12 E. canis orthologs of E. chaffeensis immunoreactive hypothetical proteins ranked by immunoreactivity detected by ELISA with CME dog sera.

| Rank | Protein (Ecaj_tag no.) | Antigenicity Score | MW (KD) | Predicted membrane protein | E.chaffeensis ortholog (tag no.) | E.chaffeensis protein |
|---|---|---|---|---|---|---|
| 1 | 0919 | 0.840 | 13 | − | 1147 | A2 |
| 2 | 0073 | 0.887 | 10 | − | 0122 | A78 |
| 3 | 0104 | 0.392 | 48 | + | 0159 | A76 |
| 4 | 0663 | 0.818 | 33 | − | 0345 | A47 |
| 5 | 0881 | 0.904 | 38 | − | 1103 | A55 |
| 6 | 0507 | 0.664 | 55 | − | 0526 | A88 |
| 7 | 0312 | 0.897 | 21 | − | 0763 | A38 |
| 8 | 0324 | 0.921 | 14 | − | 0745 | A19 |
| 9 | 0434 | 0.880 | 26 | − | 0607 | A51 |
| 10 | 0242 | 0.669 | 20 | − | 0846 | A56 |
| 11 | 0347 | 0.756 | 40 | + | 0716 | A63 |
| 12 | 0846 | 0.576 | 22 | + | 1053 | A77 |

TABLE 6

A list of 93 hypothetical proteins of E. chaffeensis (Arkansas) with potential antigenicity predicted by ANTIGENpro (antigenicity score ≥ 0.695).

| No. | Ech_tag no. | Antigenicity score | Size (AA) |
|---|---|---|---|
| 1 | 0187 | 0.969 | 563 |
| 2 | 1147 | 0.964 | 126 |
| 3 | 0247 | 0.958 | 302 |
| 4 | 0261 | 0.956 | 264 |
| 5 | 0255 | 0.950 | 338 |
| 6 | 0253 | 0.950 | 189 |
| 7 | 0865 | 0.949 | 302 |
| 8 | 1152 | 0.949 | 185 |
| 9 | 0722 | 0.945 | 190 |
| 10 | 0246 | 0.944 | 275 |
| 11 | 0257 | 0.943 | 226 |
| 12 | 0609 | 0.935 | 301 |
| 13 | 0601 | 0.929 | 374 |
| 14 | 0535 | 0.928 | 186 |
| 15 | 0251 | 0.928 | 205 |
| 16 | 0576 | 0.924 | 98 |
| 17 | 0150 | 0.923 | 672 |
| 18 | 1037 | 0.920 | 1231 |
| 19 | 0745 | 0.920 | 118 |
| 20 | 0864 | 0.918 | 330 |
| 21 | 0825 | 0.917 | 380 |
| 22 | 0113 | 0.909 | 793 |
| 23 | 0166 (TRP47) | 0.908 | 285 |
| 24 | 0862 | 0.907 | 403 |
| 25 | 0531 | 0.905 | 175 |
| 26 | 0285 | 0.895 | 181 |
| 27 | 0744 | 0.889 | 157 |
| 28 | 0612 | 0.888 | 208 |
| 29 | 0879 | 0.885 | 815 |
| 30 | 0147 | 0.885 | 193 |
| 31 | 0611 | 0.880 | 229 |
| 32 | 1036 | 0.880 | 750 |
| 33 | 0525 | 0.879 | 666 |
| 34 | 0252 | 0.875 | 364 |
| 35 | 0118 | 0.873 | 30 |
| 36 | 0807 | 0.864 | 334 |
| 37 | 0348 | 0.862 | 202 |
| 38 | 0763 | 0.860 | 165 |
| 39 | 0106 | 0.858 | 713 |
| 40 | 1154 | 0.857 | 135 |
| 41 | 0120 | 0.857 | 213 |
| 42 | 0240 | 0.857 | 158 |
| 43 | 1148 | 0.854 | 142 |
| 44 | 0243 | 0.853 | 293 |
| 45 | 0284 | 0.852 | 1016 |
| 46 | 0115 | 0.851 | 203 |
| 47 | 0345 | 0.850 | 294 |
| 48 | 0878 | 0.847 | 409 |
| 49 | 1021 | 0.845 | 219 |
| 50 | 0700 | 0.845 | 192 |
| 51 | 0607 | 0.844 | 322 |
| 52 | 0377 | 0.843 | 104 |
| 53 | 0549 | 0.842 | 195 |
| 54 | 0614 | 0.839 | 231 |
| 55 | 1103 | 0.830 | 223 |
| 56 | 0846 | 0.828 | 171 |
| 57 | 0199 | 0.823 | 213 |
| 58 | 0108 | 0.819 | 825 |
| 59 | 0551 | 0.811 | 191 |
| 60 | 1027 | 0.804 | 34 |
| 61 | 0663 | 0.802 | 202 |
| 62 | 0578 | 0.798 | 185 |
| 63 | 0716 | 0.790 | 367 |
| 64 | 0778 | 0.786 | 1132 |
| 65 | 1013 | 0.785 | 203 |
| 66 | 0398 | 0.781 | 121 |
| 67 | 0991 | 0.779 | 710 |
| 68 | 0927 | 0.775 | 34 |
| 69 | 0949 | 0.773 | 31 |
| 70 | 0259 | 0.773 | 118 |
| 71 | 0704 | 0.771 | 248 |
| 72 | 0256 | 0.770 | 72 |
| 73 | 0181 | 0.769 | 103 |
| 74 | 0297 | 0.769 | 272 |
| 75 | 0388 | 0.768 | 293 |
| 76 | 0159 | 0.767 | 507 |
| 77 | 1053 | 0.763 | 193 |
| 78 | 0122 | 0.758 | 126 |
| 79 | 0593 | 0.758 | 382 |
| 80 | 0698 | 0.758 | 200 |
| 81 | 0079 | 0.756 | 134 |
| 82 | 0986 | 0.752 | 179 |
| 83 | 0715 | 0.748 | 551 |
| 84 | 0279 | 0.747 | 41 |
| 85 | 0836 | 0.737 | 1201 |
| 86 | 0281 | 0.716 | 179 |
| 87 | 0276 | 0.716 | 184 |
| 88 | 0526 | 0.715 | 495 |
| 89 | 0478 | 0.704 | 172 |
| 90 | 0126 | 0.704 | 334 |
| 91 | 0866 | 0.703 | 330 |
| 92 | 0945 | 0.699 | 1349 |
| 93 | 0767 | 0.695 | 621 |

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

U.S. Pat. No. 4,373,932
U.S. Pat. No. 4,220,450
U.S. Pat. No. 4,897,268
U.S. Pat. No. 4,472,509
U.S. Pat. No. 4,938,948
U.S. Pat. No. 5,075,109
U.S. Pat. No. 5,440,013
U.S. Pat. No. 5,446,128
U.S. Pat. No. 5,470,723
U.S. Pat. No. 5,470,932
U.S. Pat. No. 5,543,504
U.S. Pat. No. 5,552,157
U.S. Pat. No. 5,565,213
U.S. Pat. No. 5,567,434
U.S. Pat. No. 5,618,914
U.S. Pat. No. 5,656,016
U.S. Pat. No. 5,670,155
U.S. Pat. No. 5,697,899
U.S. Pat. No. 5,738,868
U.S. Pat. No. 5,741,516
U.S. Pat. No. 5,770,219
U.S. Pat. No. 5,779,708
U.S. Pat. No. 5,783,208
U.S. Pat. No. 5,795,587
U.S. Pat. No. 5,797,898
U.S. Pat. No. 5,840,833
U.S. Pat. No. 5,853,744
U.S. Pat. No. 5,859,184
U.S. Pat. No. 5,891,506
U.S. Pat. No. 5,929,237
U.S. Pat. No. 6,136,610
U.S. Pat. No. 6,210,708
U.S. Pat. No. 6,372,445
U.S. Pat. No. 6,617,142
U.S. Pat. No. 6,875,750
U.S. Pat. No. 6,951,765
U.S. Pat. No. 7,163,677
U.S. Pat. No. 7,282,194
U.S. Pat. No. 7,344,893
U.S. Pat. No. 7,371,582
U.S. Patent Appln. 2005/0047972
U.S. Patent Appln. 2005/0065463
U.S. Patent Appln. 2005/0250141
U.S. Patent Appln. 2007/0264664
U.S. Patent Appln. 2009/0005535

Carpino et al., *Org. Proc. Res. Dev.,* 7(1)28-37, 2003.

Dumler et al., *Clin. Infect. Dis.,* 45:S45-S51, 2007.

Feng and Walker, *Infect. Immun.,* 72:966-971, 2004.

Fishbein et al., Human ehrlichiosis in the United States, 1985 to 1990. AnnInternMed 120:736-743, 1994.

Geysen et al., *Proc. Natl. Acad. Sci. USA,* 81(13):3998-4002, 1984.

He et al., Vaxign: the first web-based vaccine design program for reverse vaccinology and applications for vaccine development. J Biomed Biotechnol 2010:297505, 2010.

Hotopp et al., Comparative genomics of emerging human ehrlichiosis agents. PLoS Genet 2:e21, 2006.

Kuriakose et al., *Ehrlichia chaffeensis* transcriptome in mammalian and arthropod hosts reveals differential gene expression and post transcriptional regulation. PLoS One 6:e24136, 2011.

Kuriakose et al., Molecular basis of antibody mediated immunity against *Ehrlichia chaffeensis* involves species-specific linear epitopes in tandem repeat proteins. Microbes Infect 14:1054-1063, 2012.

Li and Winslow, Survival, replication, and antibody susceptibility of *Ehrlichia chaffeensis* outside of host cells. InfectImmun 71:4229-4237, 2003.

Li et al., Antibodies highly effective in SCID mice during infection by the intracellular bacterium *Ehrlichia chaffeensis* are of picomolar affinity and exhibit preferential epitope and isotype utilization. JImmunol 169:1419-1425, 2002.

Li et al., Outer membrane protein-specific monoclonal antibodies protect SCID mice from fatal infection by the obligate intracellular bacterial pathogen *Ehrlichia chaffeensis*. JImmunol 166:1855-1862, 2001.

Lin et al., Global proteomic analysis of two tick-borne emerging zoonotic agents: *Anaplasma phagocytophilum* and *Ehrlichia chaffeensis*. Front Microbiol 2:24, 2011.

Magnan et al., High-throughput prediction of protein antigenicity using protein microarray data. Bioinformatics 26:2936-2943, 2010.

McBride and Walker, Progress and obstacles in vaccine development for the ehrlichioses. Expert Rev Vaccines 9:1071-1082, 2010.

Mizuno et al., Chemistry. 23(58):14394-14409, Oct. 17, 2017.

Nandi et al., CD4 T-cell epitopes associated with protective immunity induced following vaccination of mice with an ehrlichial variable outer membrane protein. InfectImmun 75:5453-5459., 2007.

Olano et al., Human monocytotropic ehrlichiosis, Missouri. EmergInfectDis 9:1579-1586, 2003.

Paparone et al., Ehrlichiosis with pancytopenia and ARDS. New Jersey Med 92:381-385, 1995.

Paterson et al., Anal Chem. 86(19):9481-8, October 7; 2014.

Pierce Immunotechnology Catalog and Handbook, at A12-A13, 1991

Racine et al., IgM production by bone marrow plasmablasts contributes to long-term protection against intracellular bacterial infection. J Immunol 186:1011-1021, 2011.

Sotomay et al., Animal model of fatal human monocytotropic ehrlichiosis. AmJPath 158:757-769, 2001.

The Science and Practice of Pharmacy, 21$^{st}$ Ed. Lippincott Williams and Wilkins, 2005

Walker and Dumler, Human monocytic and granulocytic ehrlichioses. Discovery and diagnosis of emerging tick-borne infections and the critical role of the pathologist. [Review][50 refs]. Archives of Pathology & Laboratory Medicine 121:785-791, 1997.

Walker et al., *Ehrlichia chaffeensis*: a prevalent, life-threatening, emerging pathogen. Trans Am Clin Climatol Assoc 115:375-382; discussion 382-374, 2004.

Winslow et al., *Ann. NY Acad. Sci.*, 990:435-443, 2003.

Winslow et al., *Infect. Immun.*, 68:2187-2195, 2000.

Winslow et al., Infection of the laboratory mouse with the intracellular pathogen *Ehrlichia chaffeensis*. InfectImmun 66:3892-3899, 1998.

Yager et al., *Infect. Immun.*, 73:8009-8016, 2005.

Zemella et al., Cell-Free Protein Synthesis: Pros and Cons of Prokaryotic and Eukaryotic Systems. *Chembiochem.*; 16(17):2420-2431, 2015.

What is claimed is:

1. A method of detecting antibodies that specifically bind an *Ehrlichia* organism in a test sample, comprising:
   (a) contacting an isolated polypeptide of Ecaj_0919, Ecaj_0073, Ecaj_0104, Ecaj_0663, A77 (SEQ ID NO:22), A62 (SEQ ID NO:17), A56 (SEQ ID NO:16), A19 (SEQ ID NO:6), A50 Ech_0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), A42 (Ech_0240; SEQ ID NO:11), with the test sample, under conditions that allow peptide-antibody complexes to form;
   (b) detecting the peptide-antibody complexes; wherein the detection of the peptide-antibody complexes is an indication that antibodies specific for an *Ehrlichia* organism are present in the test sample, and wherein the absence of the peptide-antibody complexes is an indication that antibodies specific to an *Ehrlichia* organism are not present in the test sample.

2. The method of claim 1, wherein the *Ehrlichia* organism is an *Ehrlichia chaffeensis* organism.

3. The method of claim 1, wherein the step of detecting comprises performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay, a mass spectrometry assay, or a particulate-based assay.

4. The method of claim 3, wherein the step of detecting comprises a lateral flow assay or an enzyme-linked immunoassay, wherein the enzyme-linked immunoassay is an ELISA.

5. A method of identifying an *Ehrlichia* infection in a mammalian subject comprising: (a) contacting a biological sample from the subject with an isolated polypeptide of Ecaj_0919, Ecaj_0073, Ecaj_0104, Ecaj_0663, A77 (SEQ ID NO:22), A62 (SEQ ID NO:17), A56 (SEQ ID NO:16), A19 (SEQ ID NO:6), A50 (Ech 0700; SEQ ID NO: 28), A51 (SEQ ID NO:13), A14 (SEQ ID NO:4), A63 (SEQ ID NO:18), A34 (SEQ ID NO:9), A9 (SEQ ID NO:3), or A42 (Ech 0240; SEQ ID NO:11), under conditions that allow peptide-antibody complexes to form; and (b) detecting the peptide-antibody complexes; wherein the detection of the peptide-antibody complexes is an indication that the subject has an *Ehrlichia* infection.

6. The method of claim 5, wherein the step of detecting comprises performing an enzyme-linked immunoassay, a radioimmunoassay, an immunoprecipitation, a fluorescence immunoassay, a chemiluminescent assay, an immunoblot assay, a lateral flow assay, a flow cytometry assay, a multiplex immunoassay, a dipstick test, or a particulate-based assay.

7. The method of claim 5, wherein the subject is a human.

8. The method of claim 5, wherein the subject is a dog.

* * * * *